United States Patent [19]

Bennett et al.

[11] Patent Number: 4,517,652
[45] Date of Patent: May 14, 1985

[54] HAND-HELD MANIPULATOR APPLICATION MODULE

[75] Inventors: Ross L. Bennett, Round Rock; Robert B. Price, Austin; Clyde H. Springen, Austin; Harlan C. Kilbourn, Austin, all of Tex.

[73] Assignee: Texas Instruments Incorporated, Dallas, Tex.

[21] Appl. No.: 355,288

[22] Filed: Mar. 5, 1982

[51] Int. Cl.³ .......................... B25J 9/00; G06F 15/46
[52] U.S. Cl. .................................... 364/513; 364/191; 364/192; 364/478; 318/568; 901/3
[58] Field of Search ............... 364/191, 192, 193, 513, 364/571, 478; 318/568; 901/3

[56] References Cited

U.S. PATENT DOCUMENTS

| | | | |
|---|---|---|---|
| 3,944,985 | 3/1976 | Brandstaetter et al. | 364/200 |
| 4,130,873 | 12/1978 | Fioretta et al. | 364/513 |
| 4,156,835 | 5/1979 | Whitney et al. | 364/513 |
| 4,221,997 | 9/1980 | Flemming | 364/513 X |
| 4,362,977 | 12/1982 | Evans et al. | 364/513 |
| 4,379,335 | 4/1983 | Kirsch et al. | 364/513 |
| 4,385,358 | 5/1983 | Ito et al. | 364/577 X |
| 4,420,812 | 12/1983 | Ito et al. | 364/513 |

Primary Examiner—Jerry Smith
Assistant Examiner—Allen MacDonald
Attorney, Agent, or Firm—Thomas G. Devine; Leo N. Heiting; Melvin Sharp

[57] ABSTRACT

A hand-held application module directs the operation of a programmable manipulator controlled by digital computing means. The module identifies points to which the end effector of the programmable manipulator shall move, programs the programmable manipulator to direct the precise operations relative to the points, selectively runs to one or more points to debug the entered program and retrieves statements for display in its alpha-numeric display facility. Program statements and parameters may be deleted from the program, and program statements and parameters may be added to the program. Entry of commands is made through a keyboard and data is displayed on an alpha-numeric display.

4 Claims, 53 Drawing Figures

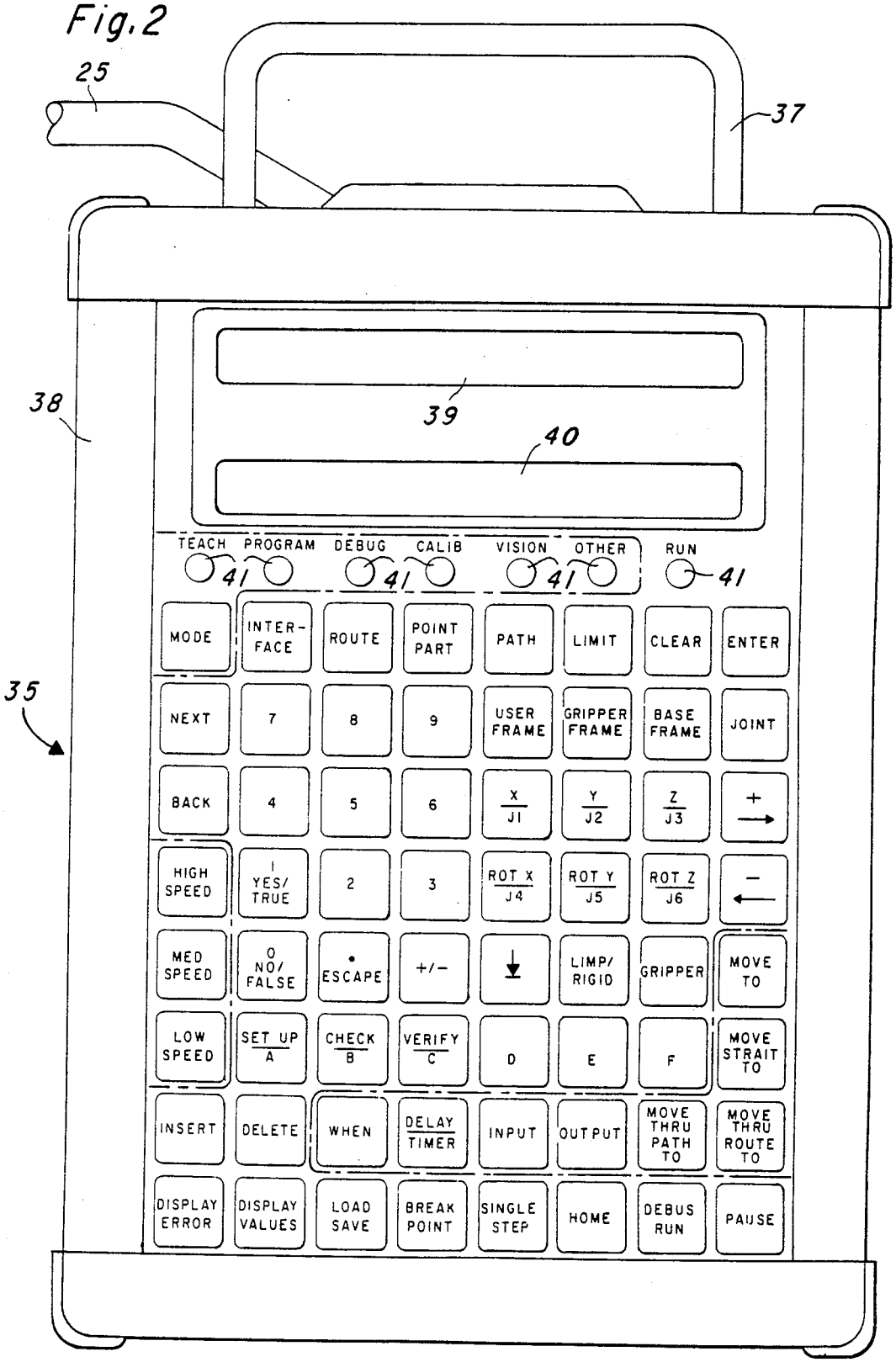

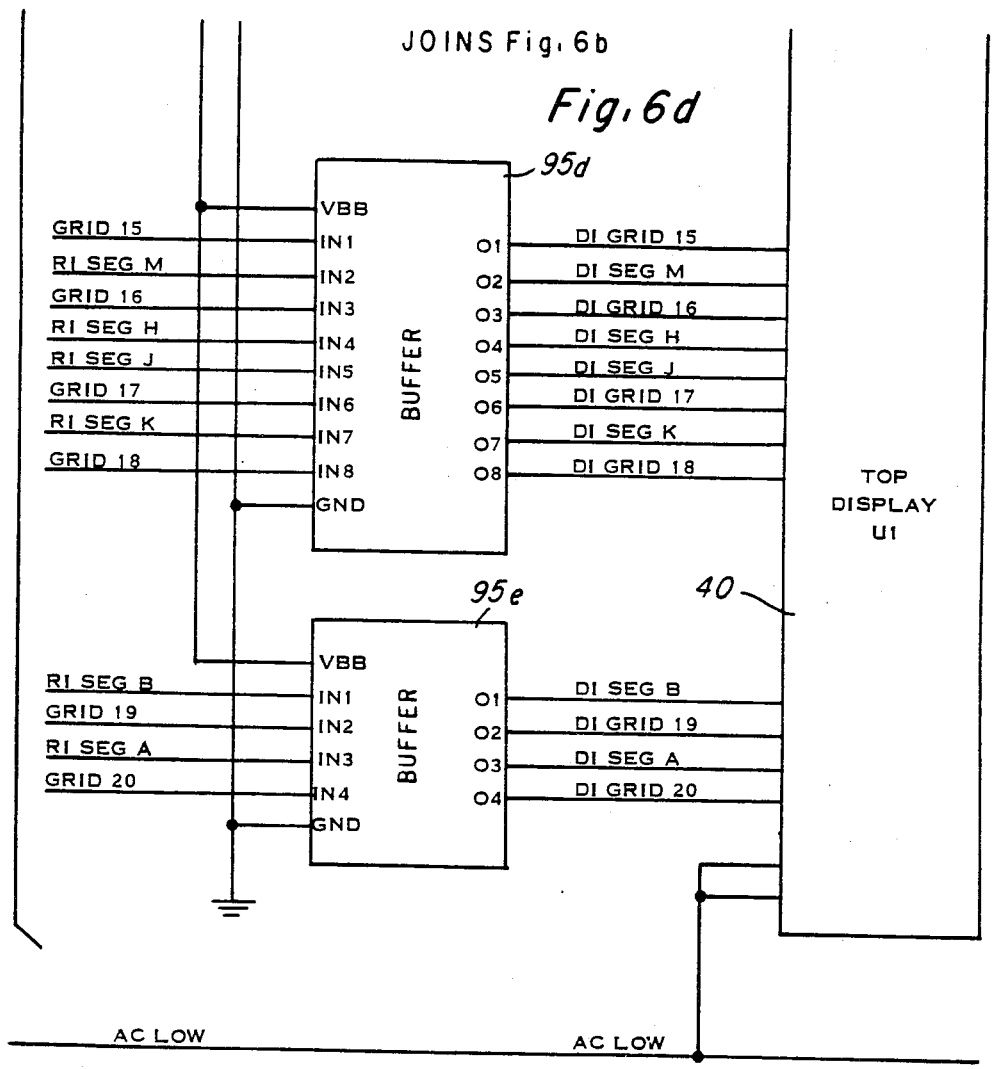

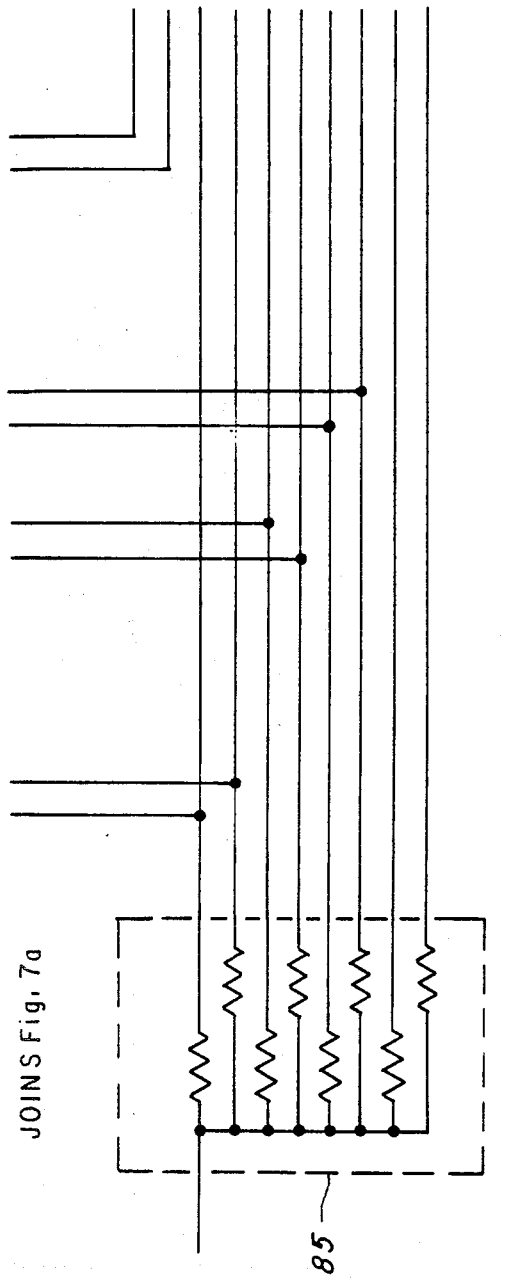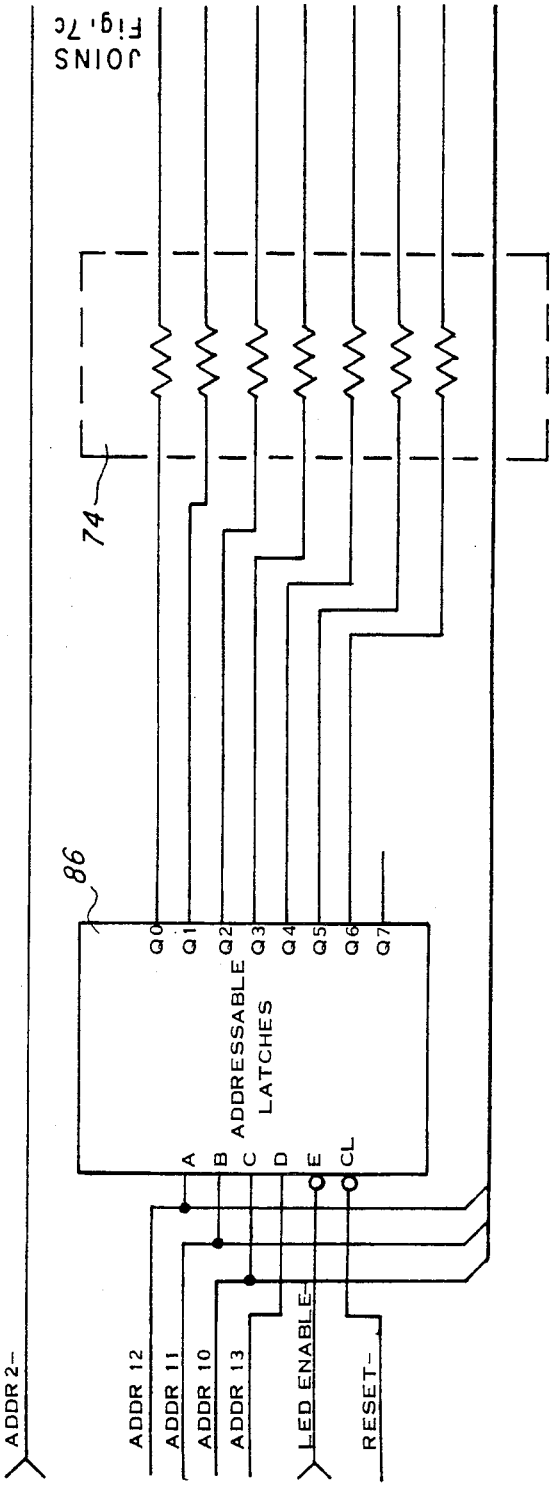
Fig. 7b

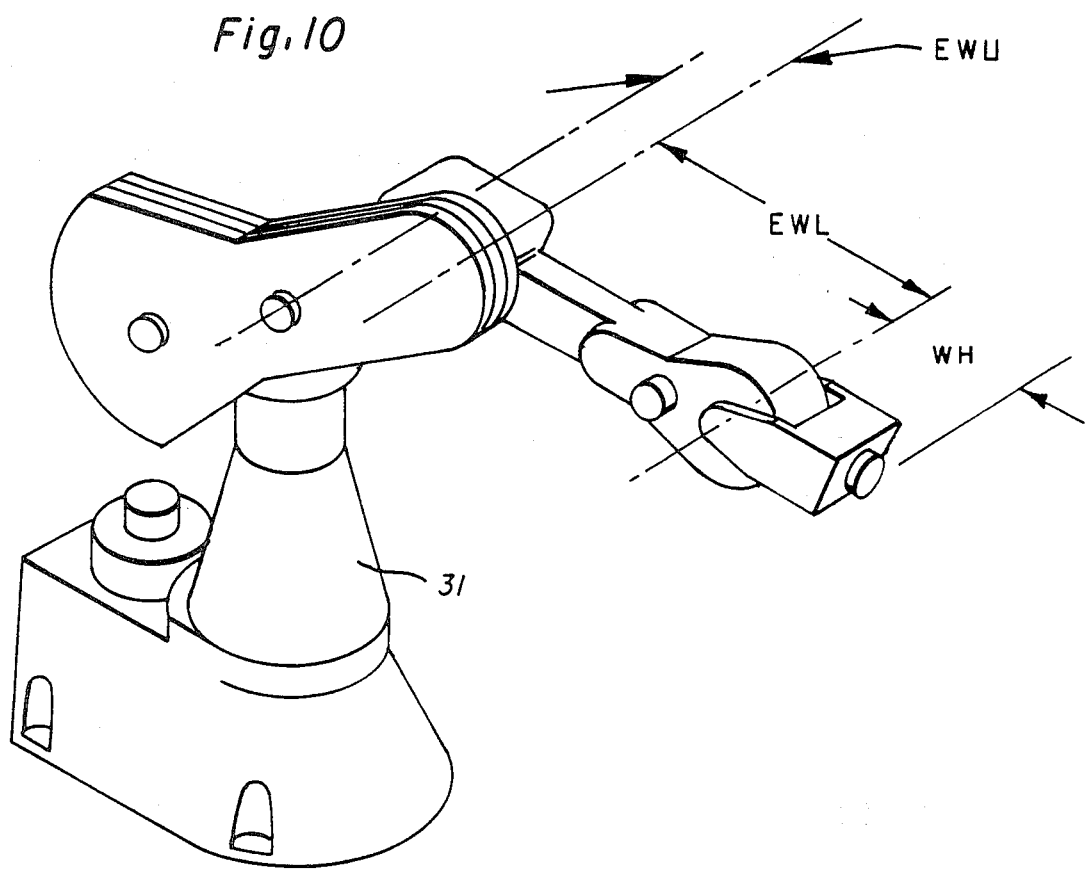

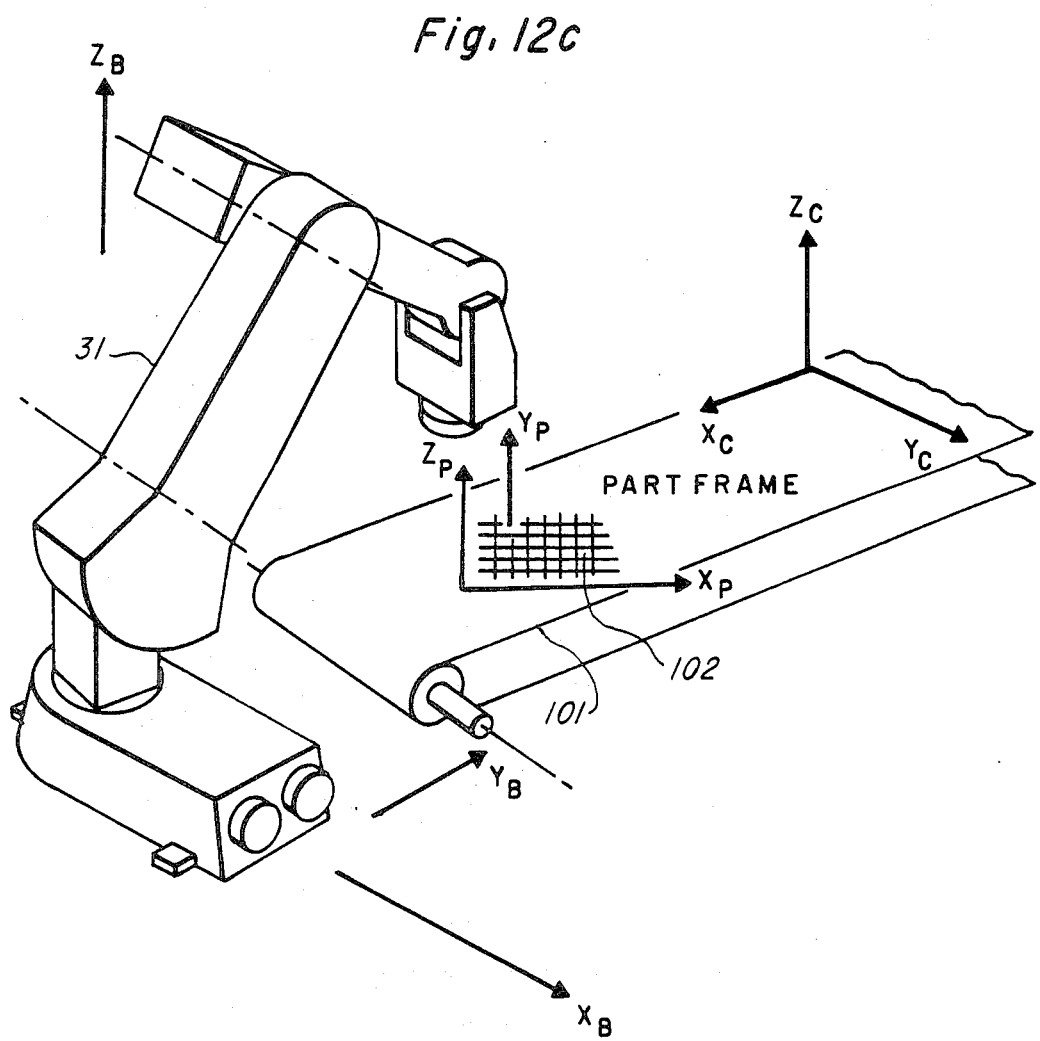

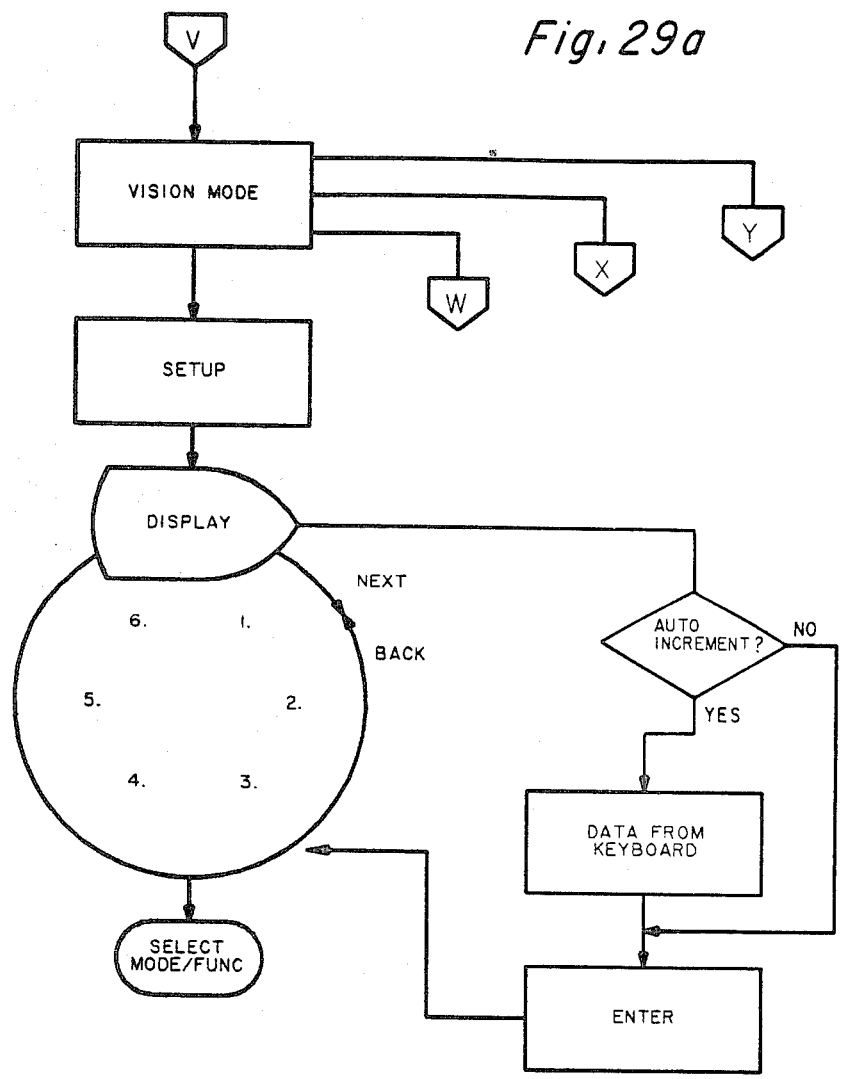

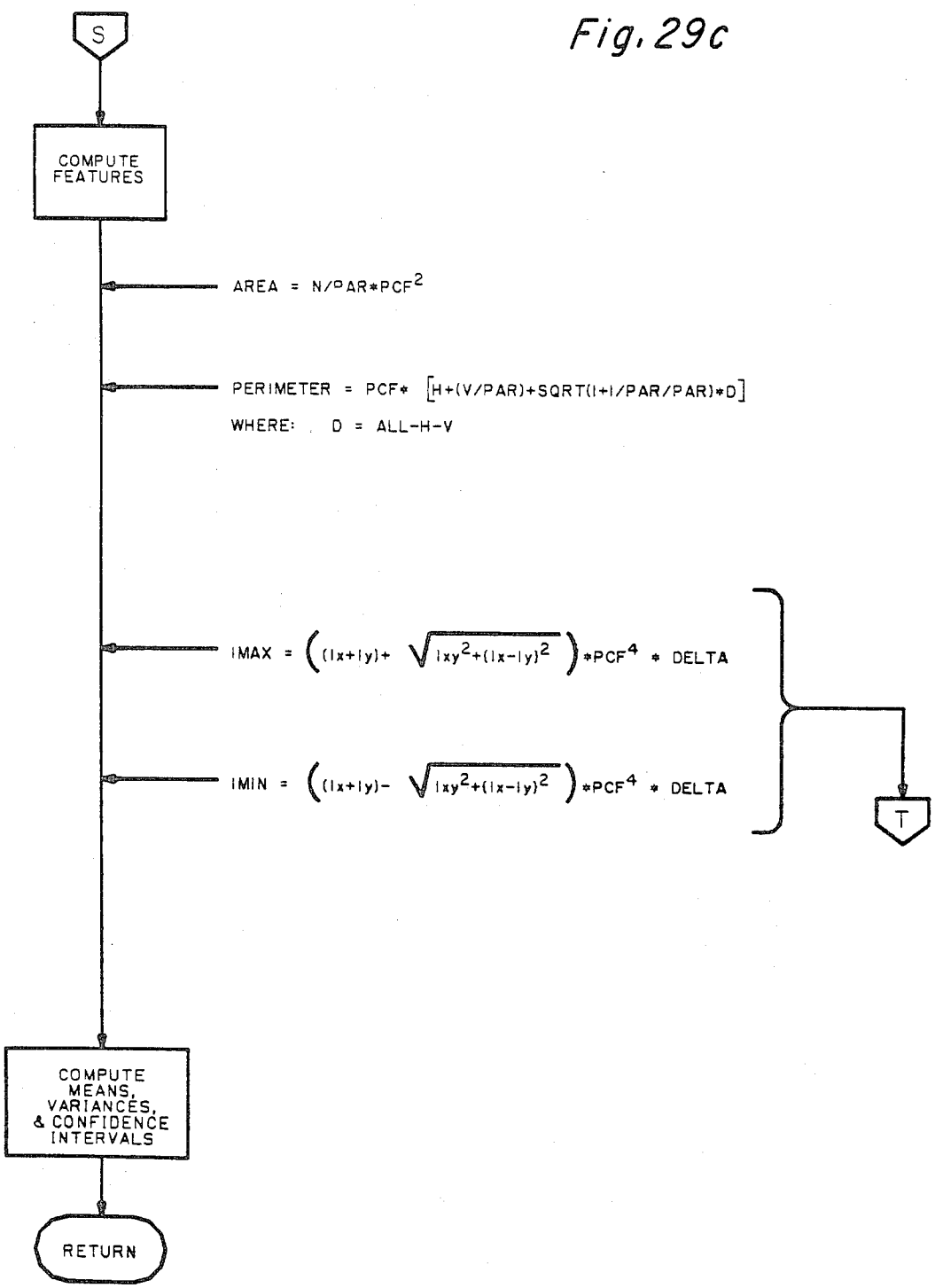

*Fig. 29d*

REQUIRED CALCULATIONS a. Qx—First moment of area about the horizontal axis of the system.

$$Q_x = \sum_{j=Y_{min}}^{Y_{max}} (j - Y\text{ offset}) * H_j$$

where Ymax, Ymin are the vertical upper, lower limits of the window.

b. Qy—First moment of area about the vertical axis of the system.

$$Q_y = \sum_{i=X_{min}}^{X_{max}} (i - X\text{ offset}) * V_i$$

where Xmax, Xmin are the horizontal upper, lower limits of the window.

c. Raw 2nd moments $$U = \sum_{j=Y_{min}}^{Y_{max}} (j - Y\text{ offset})^2 * H_j$$

$$W = \sum_{i=X_{min}}^{X_{max}} (i - X\text{ offset})^2 * V_i$$

$$V = \sum_{k=\text{vertical upper limit} - y_{max}}^{X_{max} + \text{vertical upper limit}} (k - D\text{ offset})^2 * D_k$$

XCG = Qy*PCF/N

YCG = -Qx*PCF/PAR*N d. Ixy — product of area about horizontal and vertical axis.

Ixy=((u+w-v)-2*Qy/N*Qx)/2/PAR² where (XCG, YCG) is the object centroid location.

REQUIRED CALCULATIONS CONTINUED e. $I_x$ - Second moment of area about the horizontal axis.

$I_x = (W-Q_y/N*Q_y)/2/PAR$ f. $I_y$ - Second moment of area about the vertical axis.

$I_y = (U-Q_x/N*Q_x)/2/PAR^3$

HAND-HELD MANIPULATOR APPLICATION MODULE

BACKGROUND OF THE INVENTION

1. Field of the Invention

This invention relates to the control of programmable manipulators. More particularly, it relates to the total control of an articulated robot by a hand-held applications module.

2. Description of the Prior Art

Prior art robot systems have hand-held units which are used only in teaching the robot the movements necessary for an application, but not for the programming of the functions to be performed at each location or the sequence of these movements. To develop the complete application, an off-line programming station must be used and then the application program is loaded into the robot system.

Robot systems are becoming highly sophisticated yet the ability to program these machines in a fast, simple manner has heretofore not been addressed fully. In particular, on-line programming capabilities other than by means of a large computer system have not been adequately developed.

The hand-held application module provides on-line programming capability without the need for a large computer system.

BRIEF SUMMARY OF THE INVENTION

A hand-held application module is selectively connected to a programmable manipulator to fully control the operation of that programmable manipulator. The module is provided with a keyboard input and with an alpha-numeric display. The end effector of the programmable manipulator may be moved to desired points and the location of those points is then entered into the system through a teaching mode operation selected from the module. Program statements, either before or after teaching the points, may be entered to define whether the arm should stop at any particular point or whether it should simply proceed through that point. Also, the program will state whether the end effector shall remain at a particular point until the occurrence of an event or a timeout. An entry may be made from the keyboard of the module to have the end effector travel in a straight line from one point to another.

Application programs created through the use of the application module are, in the format of this executable code, identical to application programs created using the ER-L TM robot programming language. Program mode keys and display prompts utilized by the applications module are substantially equivalent to ER-L TM language syntax (within the physical limitations of key names and display space). It is a result of this equivalence between programs developed using the applications module and the ER-L TM language which permits enhancement of simple programs utilizing the extention capabilities of ER-L TM language. The application module has the capability of debugging programs. This capability applies to programs developed using the module as well as programs developed offline using the ER-L language.

After having entered the program, for debugging purposes, any point to point portion of the program may be run in the debug mode from the module. Also, for ease of debugging, the program statements and parameters may be retrieved from the memory of the digital computer which controls the programmable manipulator. These program statements and parameters may be viewed (in the program mode) on the alpha-numeric display and may be run forward or backward. If it is desired, a particular program statement or parameter may be deleted in the program mode. Other program statements and parameters may be inserted at desired points. All of this debugging capability is provided through keyboard entry at the module.

A principal object therefore of this invention is to provide total on-line control of a programmable manipulator through a hand-held application module.

Another object of this invention is to provide control of a programmable manipulator that is simple for an operator to employ.

Still a further object of this invention is to provide a hand-held application module that teaches points to which the end effector is intended to move, and with that teaching further enables the transmission of desired program statements to fully define the operation, including the location of the points.

Still another object of this invention is to provide a hand-held application module capable of debugging the entered program.

Another object of the invention is to provide a hand-held application module that enables the deletion and addition of program statements.

These and other objects will be made evident in the detailed description that follows.

BRIEF DESCRIPTION OF THE DRAWINGS

FIG. 2 is a plan view of the hand-held application module.

FIGS. 6a–6d schematically illustrate another portion of the circuit of FIGS. 3a and 3b.

FIGS. 7a–7c schematically illustrate the final portion of the circuit of FIGS. 3a and 3b.

FIG. 10 illustrates a robot and certain of its dimensional identifications.

FIGS. 12a–12e are flowcharts illustrating various aspects of the teach mode.

FIGS. 29a–29f are flowcharts illustrating the operation of the vision mode.

DETAILED DESCRIPTION

Figure 1:
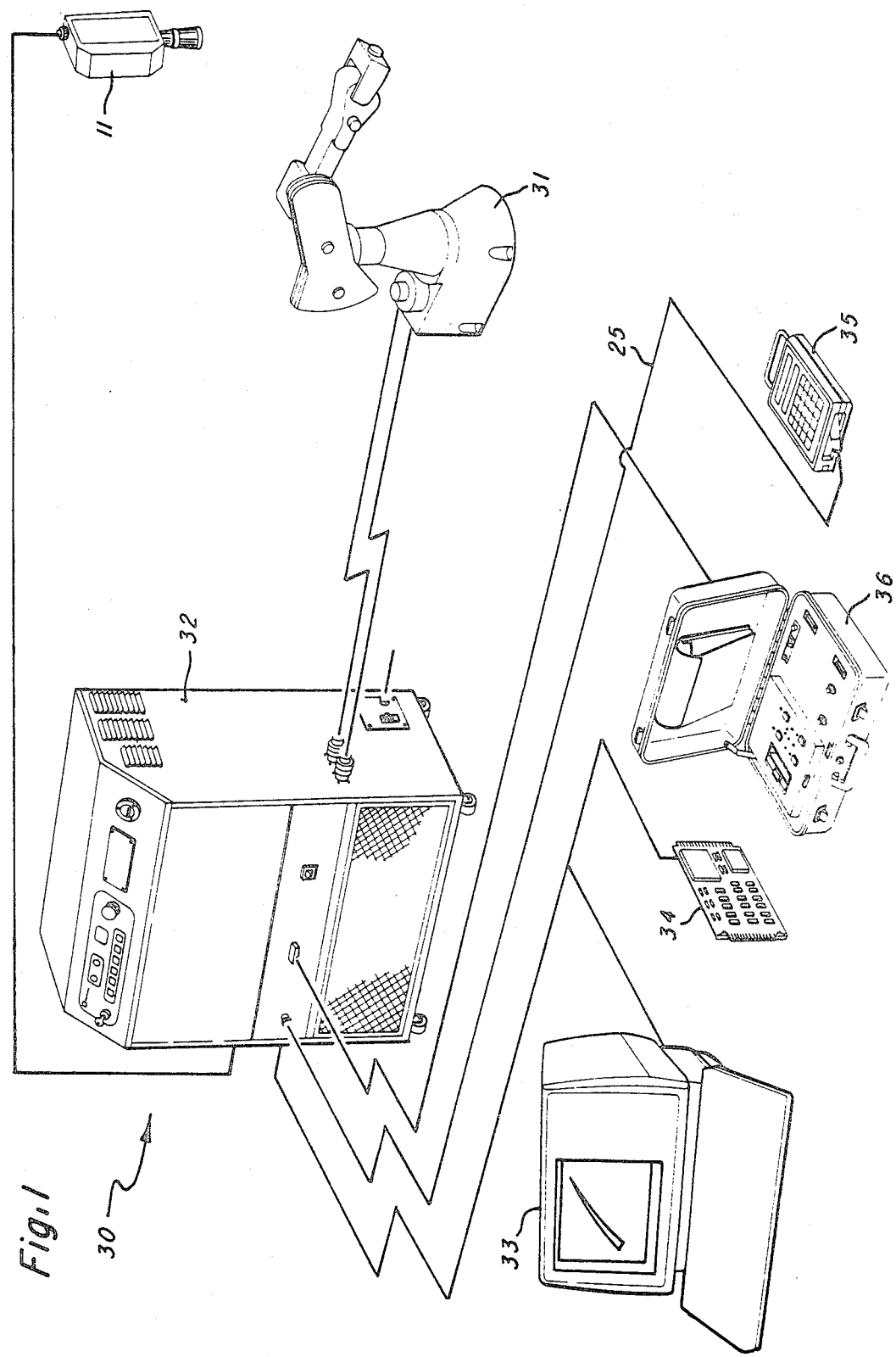
FIG. 1 is a perspective drawing of the hand-held application module, the robot which it controls, together with its control box, a video camera for use in a visual system, and other peripheral items.

FIG. 1 illustrates the hand-held application module 35 being connected through conductor 25 to controller cabinet 32. Articulated robot 31 is connected to controller cabinet 32 as is video camera 11. In this preferred embodiment, in a conventional manner, an electric motor in each joint provides the motive force. The motive force could also be provided by one or more electric motors in conjunction with cords and pulleys. Programming station 33, process I/O 34 and load device 36 may be connected in the system, through control cabinet 32, as desired.

FIG. 2 illustrates the module 35 in case 38 having handle 37 attached to case 38. Conductor 25 is shown entering the case 38.

Fluorescent displays 39 and 40 are used for displaying data of various kinds. Light emitting diodes 41 indicate the various modes in which the module operates, including teach, program, debug, calibrate, vision, other, and run.

A keyboard, having 64 keys is also illustrated with various functions associated. Numerals 0 through 9 may be entered and other functions to control the robot may be entered. Keys that are applicable to the various modes are present as indicated in FIG. 2.

Figure 3A:
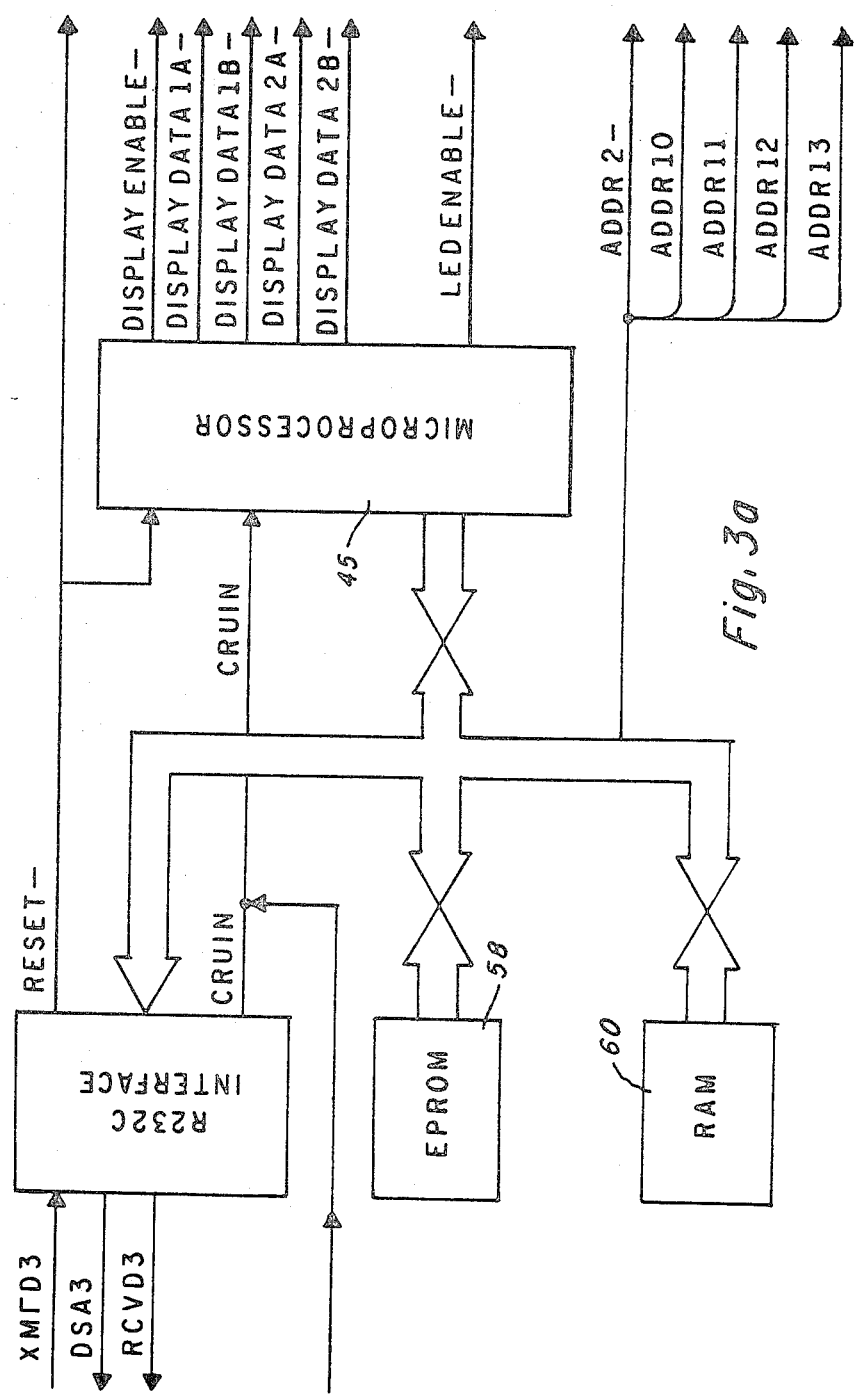
FIGS. 3a and 3b illustrate, in block form, the electronic components of the module.

FIG. 3a illustrates the requisite interface circuitry, including microprocessor 45, which in this preferred embodiment is a Texas Instruments Incorporated type 9981. An RS232C interface communicates with the robot central processing unit (RCPU). In this preferred embodiment, an Electronic Industries Association standard RS232C interface is employed. It receives data from the RCPU on line XMTD3 and sends the received data to microprocessor 45 over the communications register unit input (CRUIN) line. When interface 90 transmits information to the RCPU, it is sent over line RCVD3. Line DSR3 from interface 90 notifies RCPU that the interface is ready. Erasable programmable ROM 58 and random access memories 60 provide external program storage and external memory, respectively, to microprocessor 45 through bus 91 and bus 92. Microprocessor 45 provides output signals display enable-, display data 1A-, display data 1B-, display data 2A-, display data 2B-, LED enable- and ADDR2, ADDR10, ADDR11, ADDR12 and ADDR13.

Figure 3B:
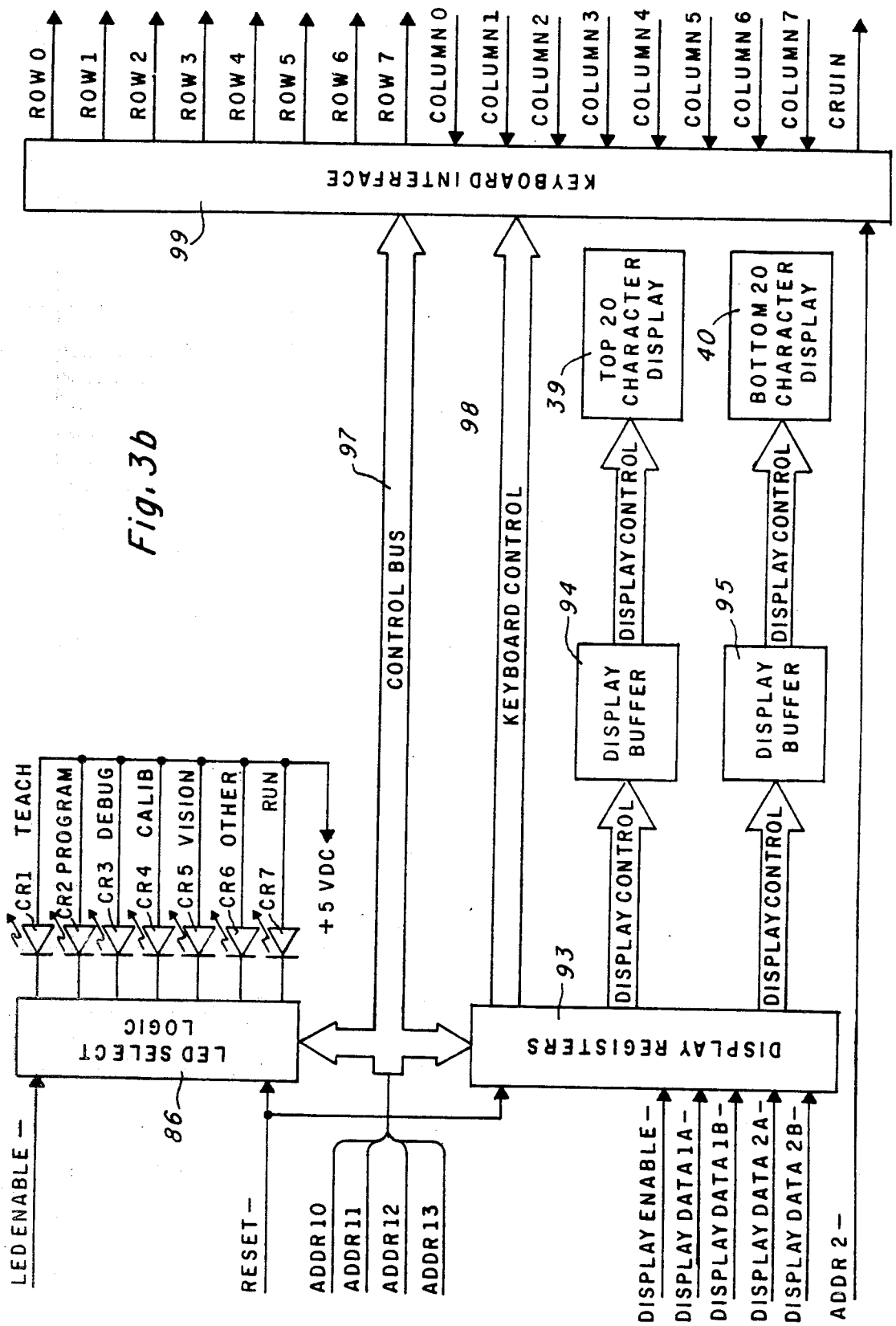

FIG. 3b illustrates the LED select logic 86 receiving signal LED enable-, reset-, and ADDR10 through ADDR13 from control bus 97 to select the connected light emitting diodes CR1-CR7 corresponding to the various modes of operation noted earlier.

The display registers 93 receive inputs display enable-, display data 1A-, 1B-, 2A-, and 2B- providing an output through keyboard control 98 to keyboard interface 99 and outputs to display buffers 94 and 95. Display buffer 94 activates the top character display 39 and display buffer 95 activates the bottom character display 40.

Control bus 97 interconnects keyboard interface 99, display registers 93 and LED select logic 86. Keyboard interface 99 activates ROW0 through ROW7 lines which are output to the keyboard, one at a time. When a key is depressed, the active ROW signal will be returned on one of the column lines, 0 through 7, to the keyboard interface. The keyboard interface sends the selected signal to microprocessor 45 to determine which key was pressed (knowing the row and column position).

Figure 4A:
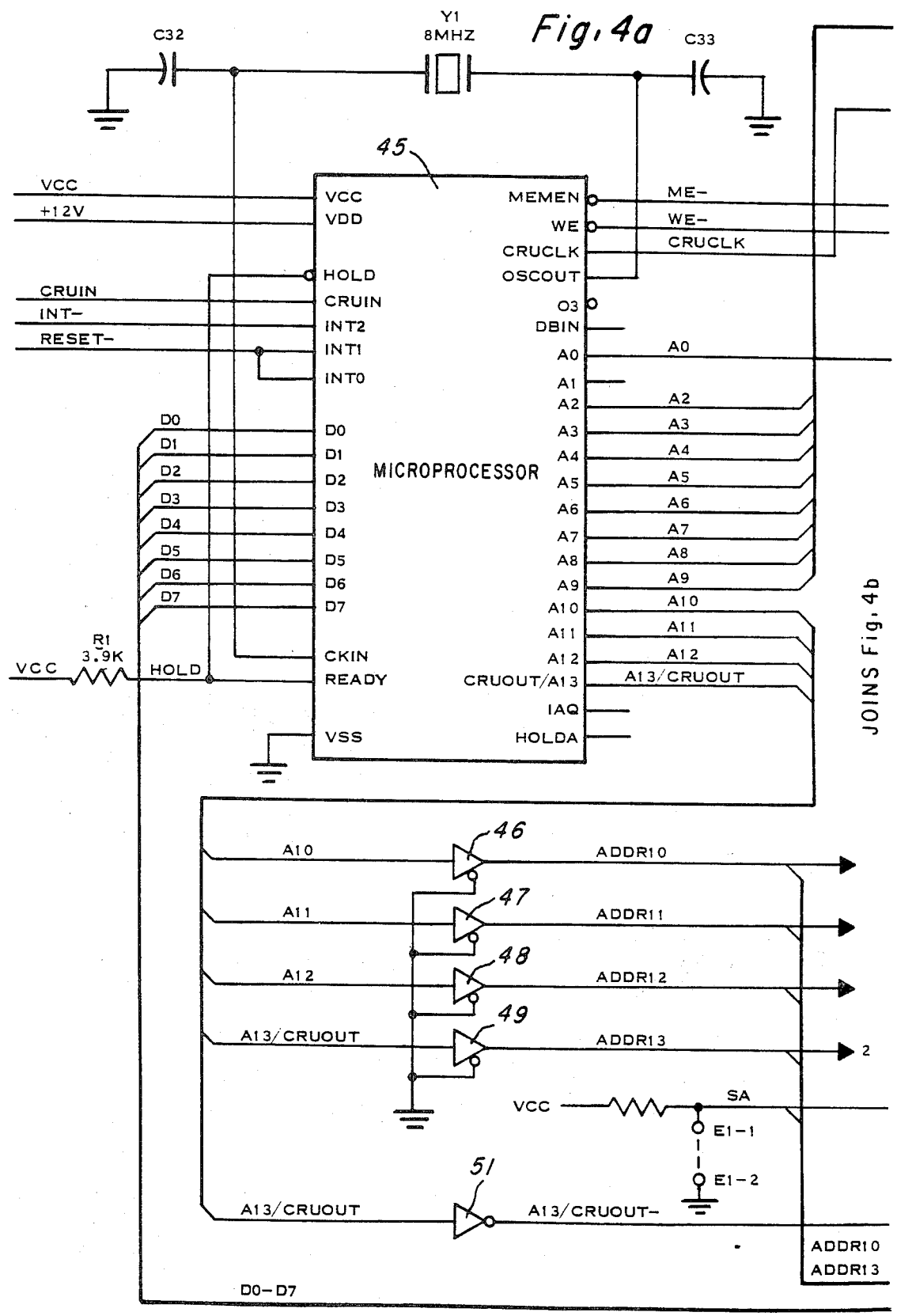
FIGS. 4a–4c schematically illustrate, in more detail, a portion of the circuit of FIGS. 3a and 3b.

FIG. 4a illustrates the microprocessor TMS9981 as being clocked by crystal Y1, at a frequency of 8 Mhz, in combination with capacitors C32 and C33. Input signal CRUIN is shown, together with signals RESET and INTfrom R232C interface (not shown). Output signals ME-, WE and CRUCLK are shown, together with output signals A0, A2–A12 and A13/CRUOUT. Input signals D0–D7 are also shown. Signals A10–A13/CRUOUT are inverted through invertors 46–49, respectively, to provide output signals ADDR10 through ADDR13.

Figure 4B:
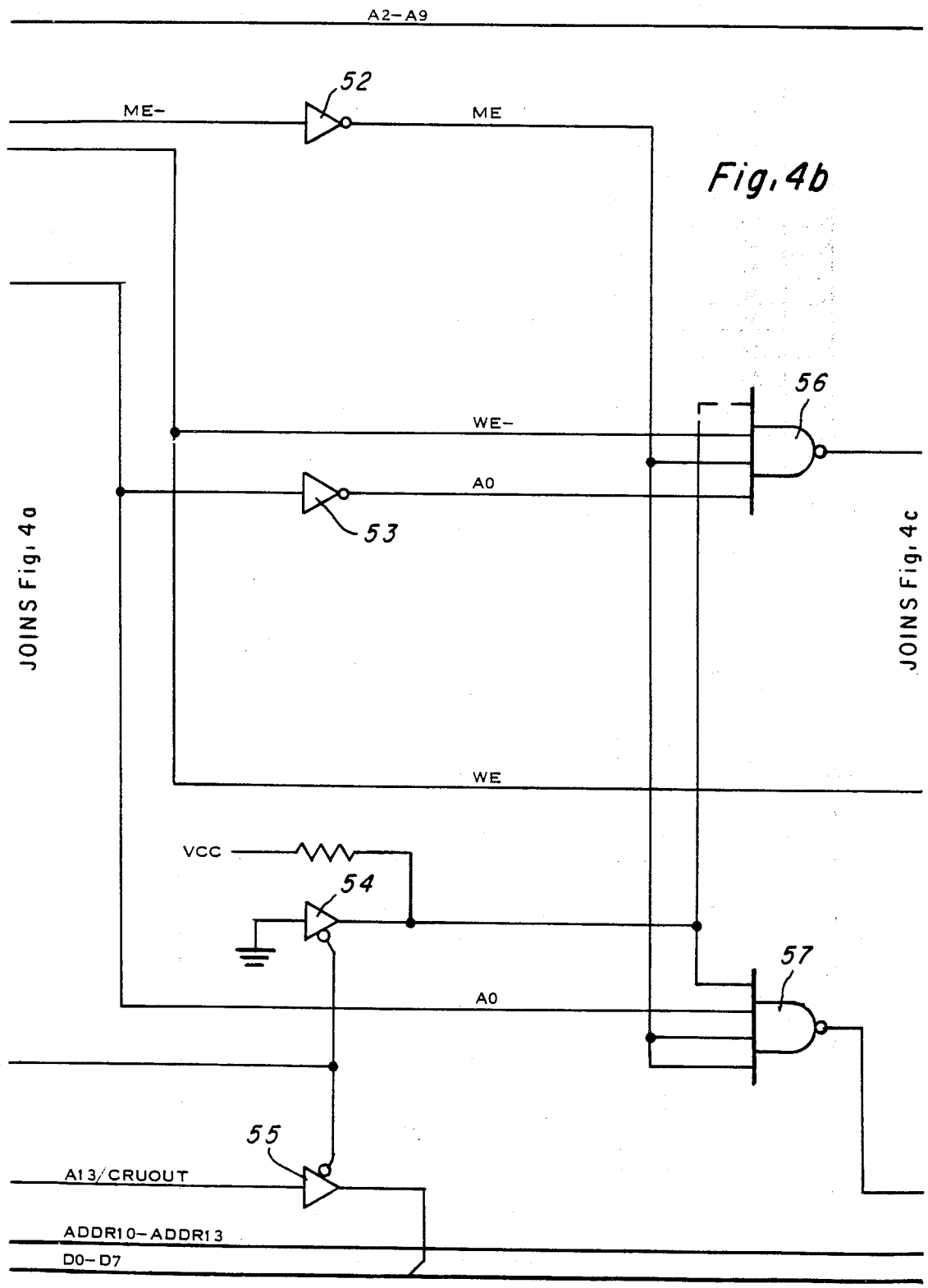

FIG. 4b illustrates signal ME- inverted through invertor 52 to provide signal ME as one input to each of NAND gates 56 and 57. ME- is also applied to NAND gate 56. Signal A0 is inverted through invertor 53 and applied as another input to NAND gate 56 and is applied directly as an input to NAND gate 57. Voltage signal SA (from voltage VCC) controls noninverting gates 54 and 55. Gate 54 applies a "1" in the absence of SA and a "0" in the presence of signal SA. Gate 55 transmits the signal A13/CRUOUT-, from invertor 51 when signal SA is present. Voltage VCC is applied through resistor R3 to NAND gates 56 and 57, unless gate 54 is conducting, in which case ground is applied through gate 54 to NAND gates 56 and 57.

Figure 4C:
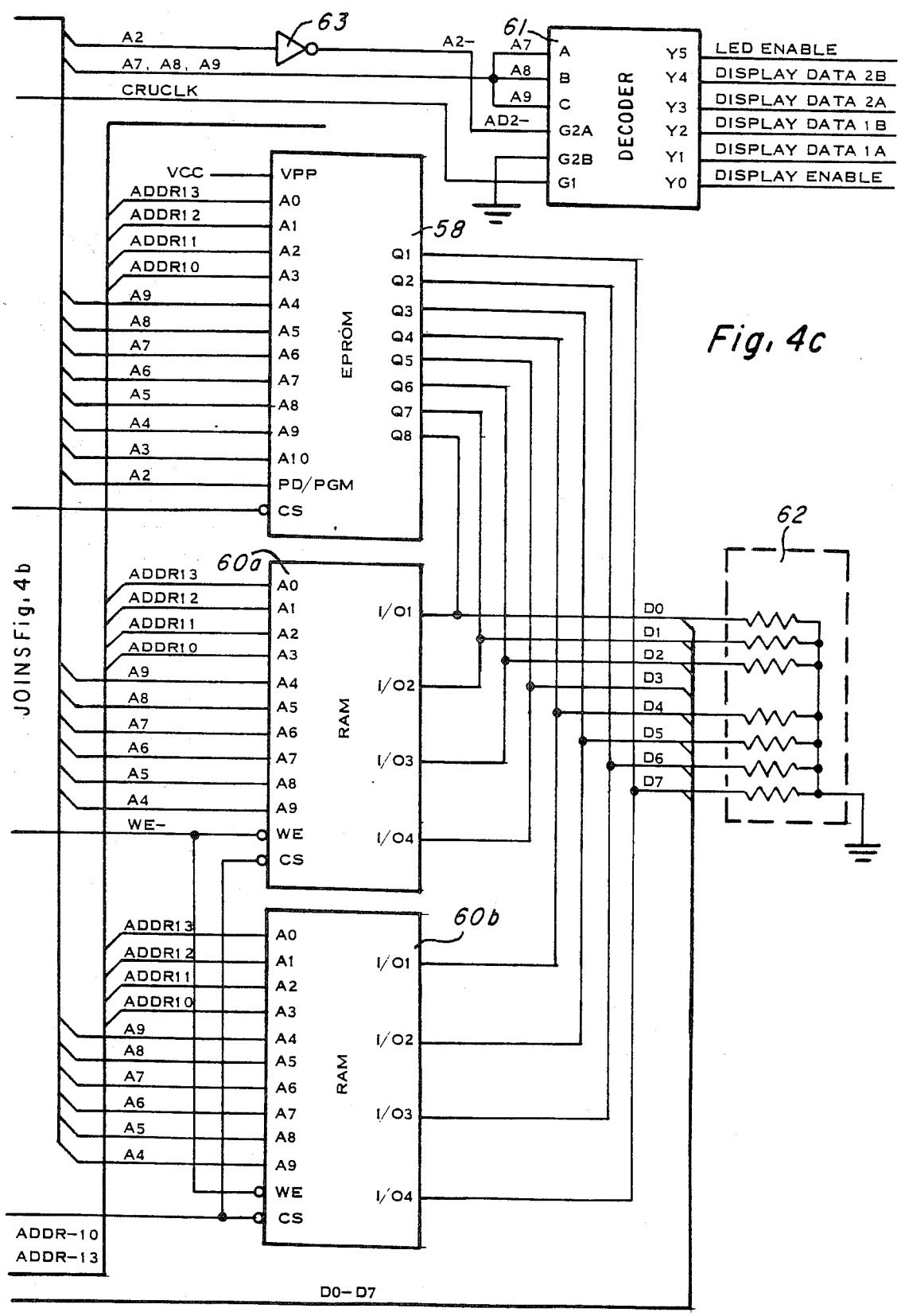

FIG. 4c illustrates signal A2 being inverted through invertor 63 and being applied to decoder 61 as signal ADD2-, a control signal for the decoder 61. Signals A7, A8 and A9 are applied to inputs A, B and C of decoder 61 while signal CRUCLK is applied to control input G1. Control input G2B is grounded. The signals yielded are, on terminals Y0 through Y5, respectively, display enable, display data 1A, 1B, 2B, and LED enable-. Decoder 61 is a Texas Instruments type 74LS138, in this preferred embodiment.

EPROM 58 is addressed by signals ADDR10 through ADDR13 and A2 through A9 and controlled by the output of NAND gate 56 to provide output signals D0–D7. RAMS 60A and 60B are addressed by signals ADDR10 through ADDR13 and A4 through A9. They are each controlled on the WE- input by signal WE- and on input CS- by the output from NAND gate 57. Signals D0 through D7 are terminated in a resistor pack 62 and returned through the input of microprocessor 45.

In summary, FIGS. 4a-4c illustrate the schematic diagram of microprocessor 45, its memories, and its input and output signals.

Figure 5A:
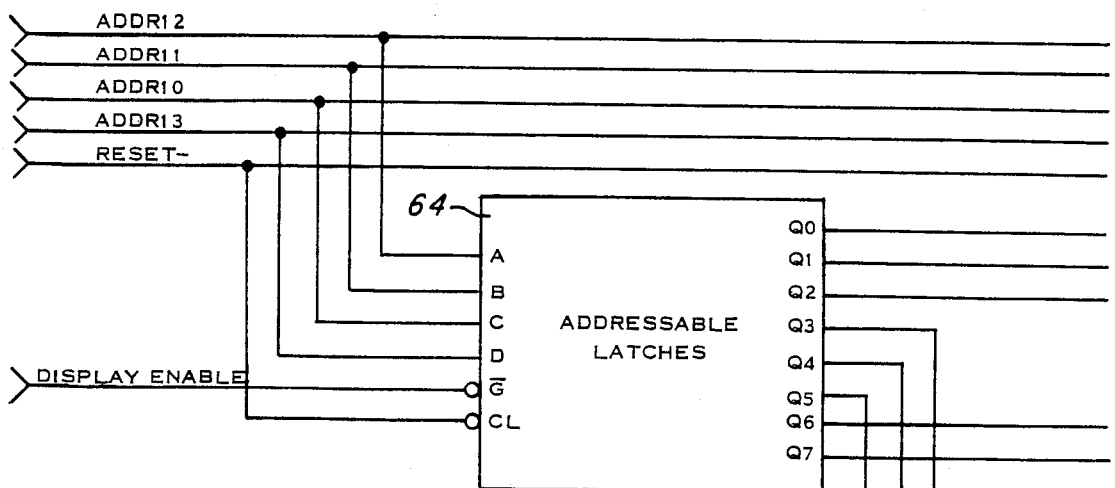
FIGS. 5a–5c schematically illustrate another portion of the circuit of FIGS. 3a and 3b.

FIG. 5a illustrates signals ADDR10–ADDR13 as data input to addressable latches 64 whose control inputs are provided by the display enable signal on input G- and the RESET- signal on terminal CL. Resultant output signals on terminals Q0, Q1 and Q2 are display select A, display select B, and display select C, respectively. These outputs also provide inputs to the A B and C terminals of addressable latches 65, 66 and 67, those inputs providing the latch select. The data input comes from terminal Q6 of unit 64 on terminal D of each of latches 65, 66 and 67. The enable terminal G- of latches 65, 66 and 67 is provided by the output terminals Q3, Q4 and Q5 respectively, of latches 64. Output Q7 from latches 64 provides signal keyboard enable.

Latches 65 provide output signals grid 1–grid 8; addressable latches 66 provide outputs signals grid 9–grid 16; addressable latches 67 provide output signals grid 17–grid 20.

Figure 5B:
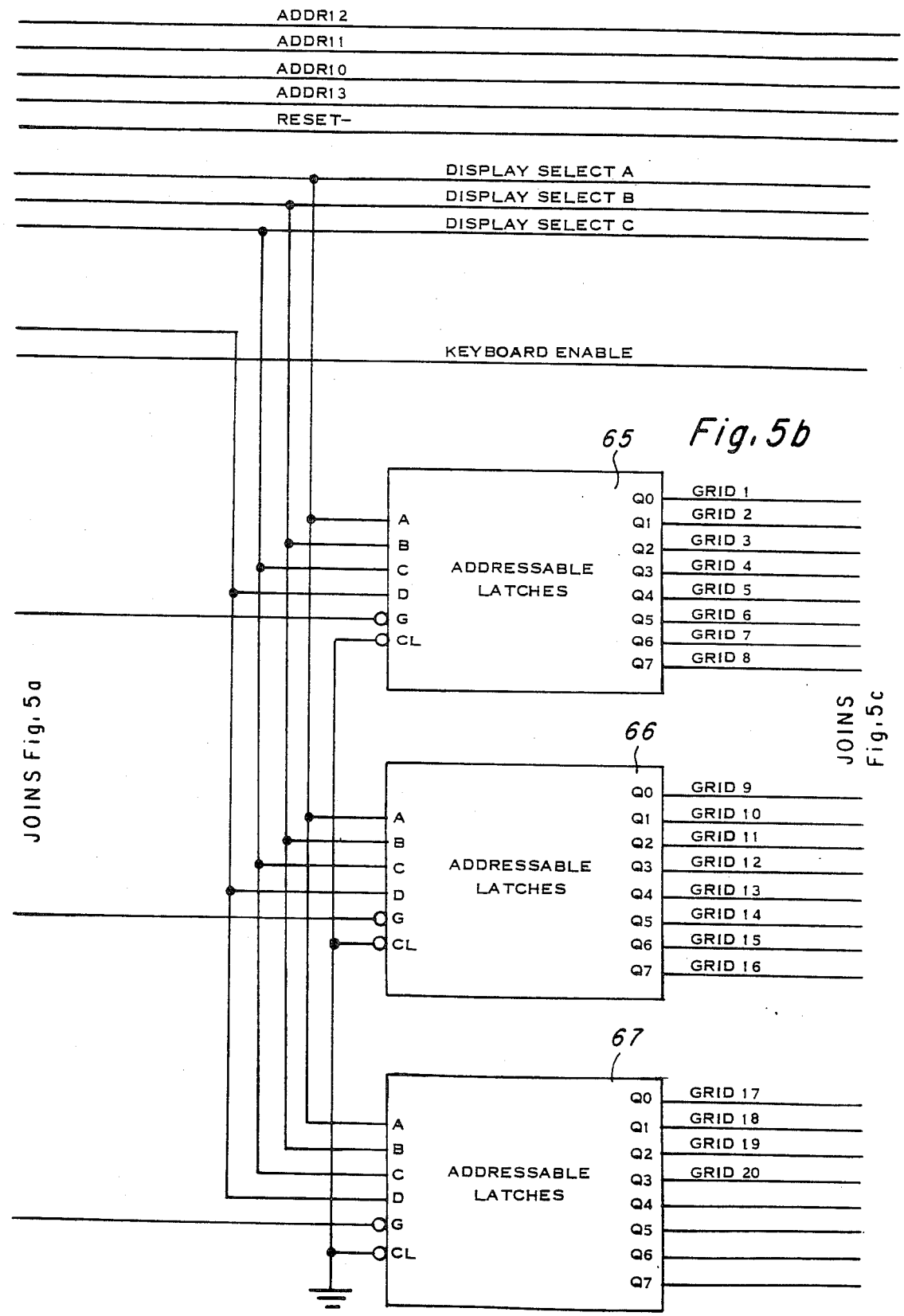
Figure 5C:
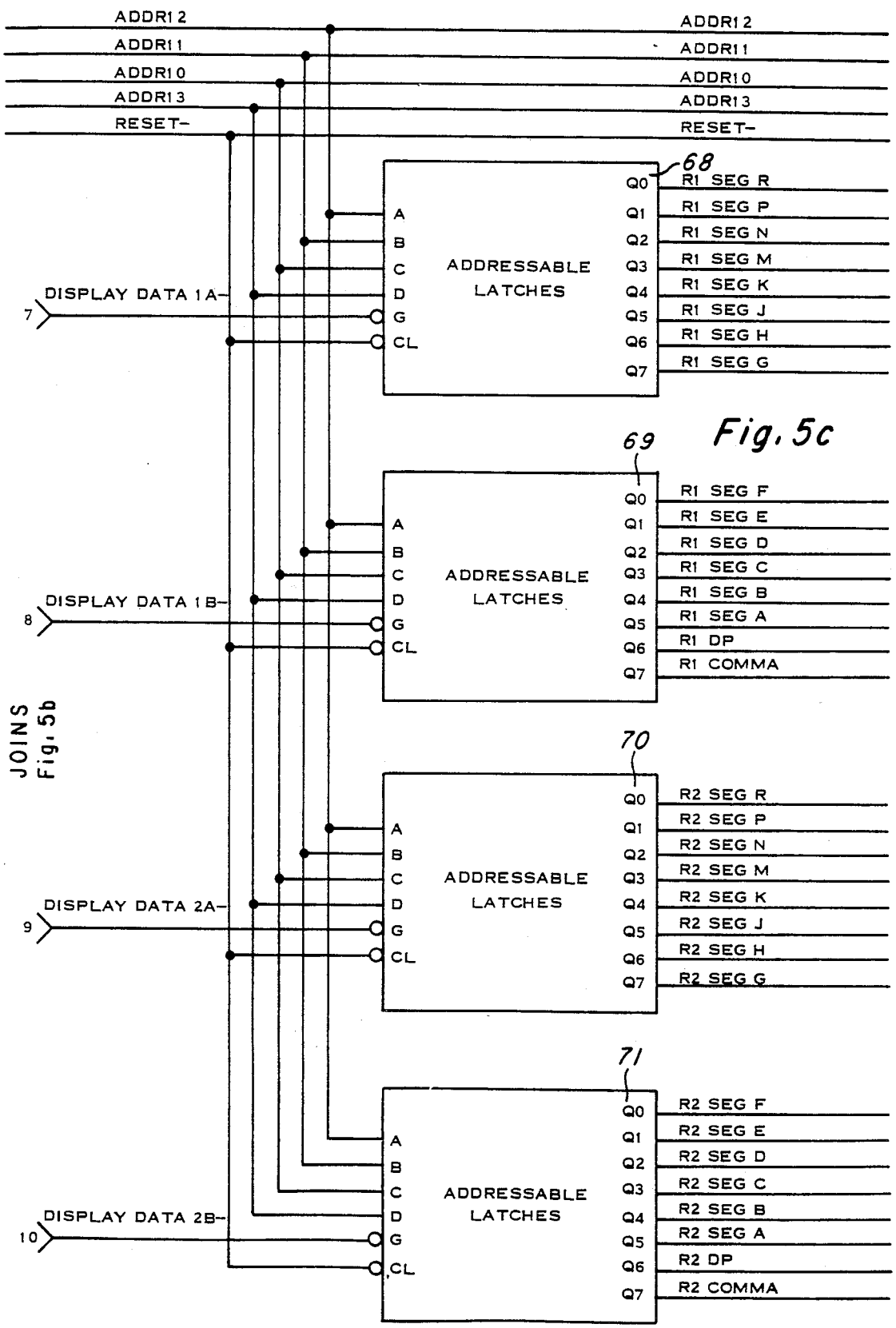
Figure 6A:
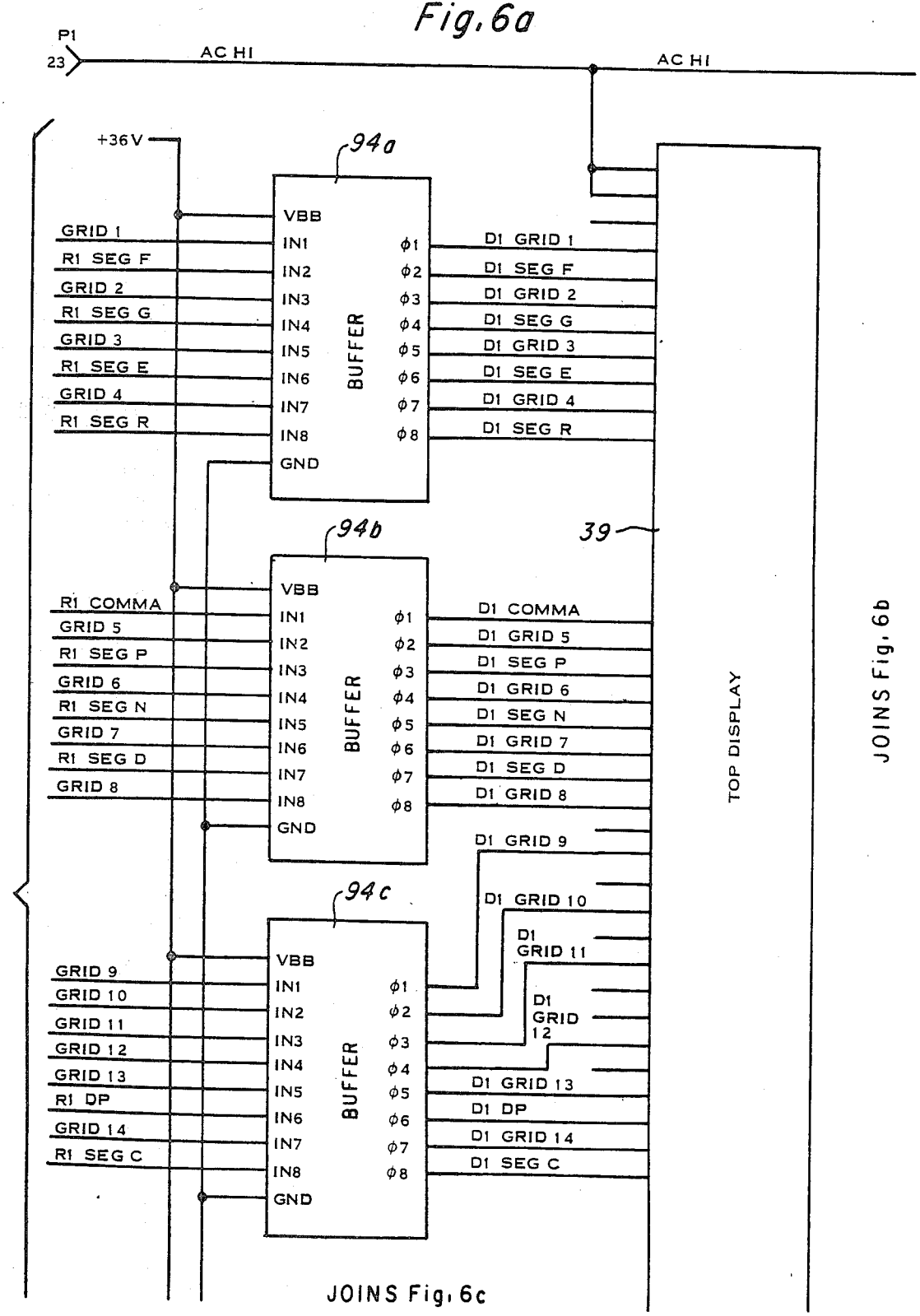
Figure 6B:
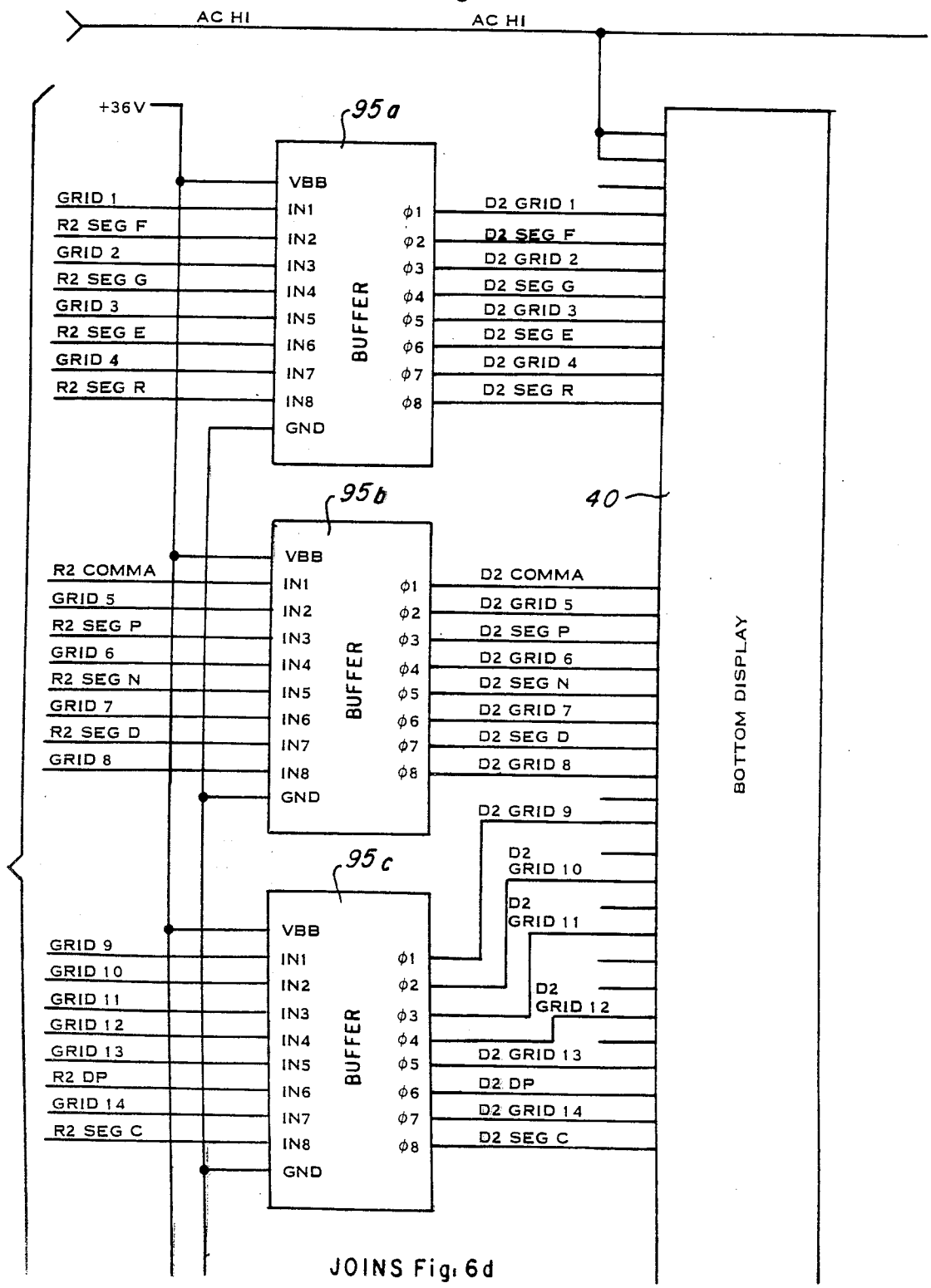
Figure 6C:
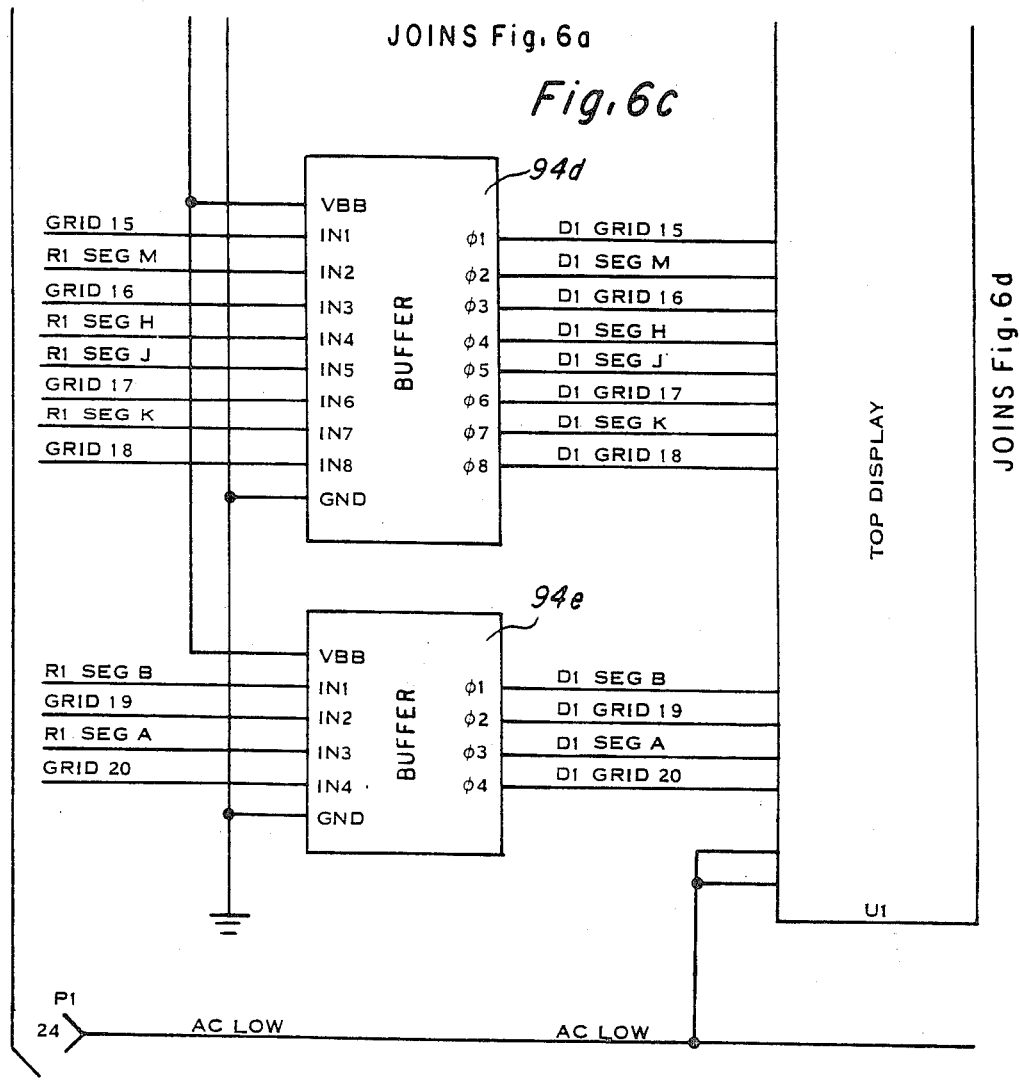

FIG. 5c illustrates addressable latches 68, 69, 70 and 71 having the latch select terminals A, B and C enabled by signals ADDR12, ADDR11, and ADDR10, respectively. The data signal is applied by signal ADDR13 on terminal D of each of latch circuits 68–71. Enable terminal G- is supplied by signals display data 1A- to latches 68, display 1B- to latches 69, display data 2A- to latches 70, and display data 2B- to latches 71. Signal RESET- is applied to the clear terminal of each of the latches 68–71. It should be noted that in this preferred embodiment the addressable latches 64–71 are all Texas Instruments type SN74LS259.

The outputs of addressable latches 68, on terminals Q0 through Q7 respectively are: R1SEG R; R1SEG P; R1SEG N; R1SEG M; R1SEG K; R1SEG J; R1SEG H; R1SEG G. The output signals from addressable latches 70, are designated identically to the output signals from latches 68 except that "R1" is changed to "R2".

The output signals from addressable latches 69 on output terminals Q0–Q7, respectively are: R1SEG F; R1SEG E; R1SEG D; R1SEG C; R1SEG B; R1SEG A; R1 DP; R1, COMMA. The outputs of addressable latches 71 on terminals Q0–Q7 are identically noted except that "R1" is replaced by "R2".

In summary, FIGS. 5a–5c illustrate the circuitry required for the selection of the various segments of the fluoresent display characters. Addressable latches 64–71 comprise the display registers 93 of FIG. 3b.

FIGS. 6a–6d illustrate top display 39 with display buffers 94a–94e providing its input signals and bottom display 40 with display buffers 95a–95e providing its inputs. The signals for top display 39 will be described in detail. The signals for bottom display 40 are exactly the same in notation, except that R1 in top display 39 circuitry is replaced by "R2" in bottom display 40 circuitry. Buffers 94a–94e and 95a–95e are type UDN-6118A from Sprague Electric Company.

Input signals IN1–IN8 for buffer 94a are, respectively, GRID 1; R1SEG F; GRID 2; R1SEG G; GRID 3; R1SEG E; GRID 4; R1SEG R. Its outputs, on pins 01–08 are, respectively: D1 GRID 1; D1 SEG F; D1 GRID 2; D1 SEG G; D1 GRID 3; D1 SEG E; D1 GRID 4; D1 SEG R.

The inputs to buffer 94b are, respectively: R1, COMMA; GRID 5; R1SEG P; GRID 6; R1SEG N; GRID 7; R1SEG D; GRID 8. Its outputs on terminal 01–08 are, respectively: D1,; D1 GRID 5; D1 SEG P; D1 GRID 6; D1 SEG N; D1 GRID 7; D1 SEG D; D1 GRID 8.

The input signals to buffer 94c on terminals IN1–IN8 are, respectively: GRID 9–GRID 13; R1 DP; GRID 14; R1 SEG C. Its outputs, on terminals 01–08 are, respectively: D1 GRID 9–D1 GRID 13; D1 DP: D1 GRID 14; D1 SEG C.

The input signals to buffer 94d are, respectively: GRID 15; R1SEG M; GRID 16; R1SEG H; R1SEG J; GRID 17; R1SEG K; GRID 18. Its outputs are, respectively: D1 GRID 15; D1 SEG M; D1 GRID 16; D1 SEG H; D1 SEG J; D1 GRID 17; D1 SEG K; D1 GRID 18.

The inputs to buffer 94e, on pins IN1–IN4 are, respectively: R1SEG B; GRID 19; R1SEG A; GRID 20. Its outputs on pins 01–04 are, respectively: D1 SEG B; D1 GRID 19; D1 SEG A; D1 GRID 20. All of these outputs provide the selection inputs to top display 39. In like manner, all of the outputs from buffers 95a–95e provide the inputs to bottom display 40.

Figure 7A:
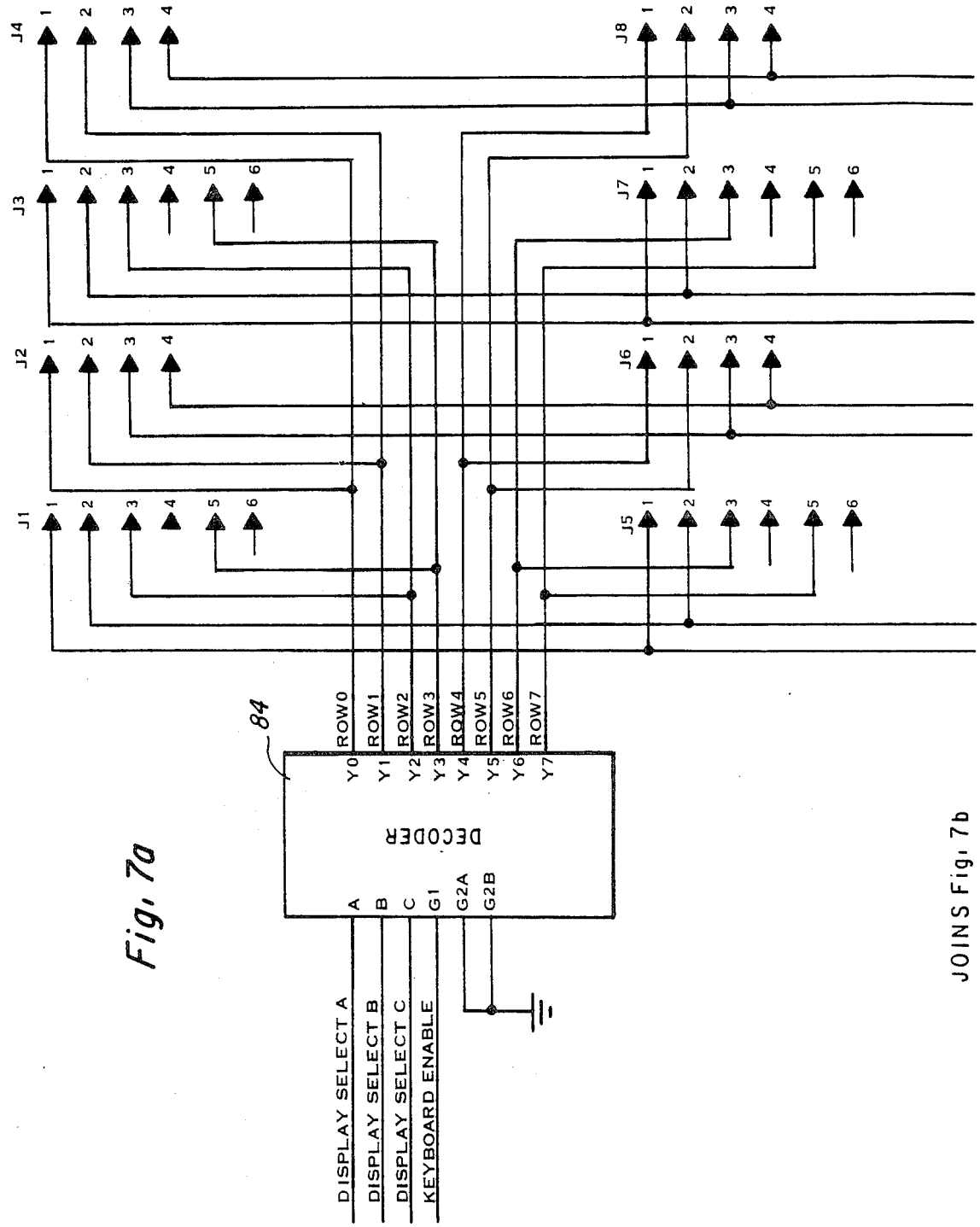

FIG. 7a illustrates decoder 84 having inputs "display select A", "display select B", and "display select C" from th select inputs. The signal "keyboard enable" is connected to the G1 enable terminal with signals G2A and G2B continuously enabled through a ground connection. The output selections on terminals Y0–Y7 are signals ROW0 through ROW7. ROW0 provides an output to terminal J2-1 and terminal J4-1; signal ROW1 provides an output to terminal J2-2 and J4-2. Signal ROW2 provides an output to terminal J1-3 and J3-3. Signal ROW3 provides an output to terminal J1-5 and terminal J3-5. Signal ROW4 provides an output to terminal J6-1 and to terminal J8-1. Signal ROW 6 provides an output to terminal J5-3 and to terminal J7-3. Signal ROW7 provides an output to terminal J5-5 and to terminal J7-5.

Figure 7C:
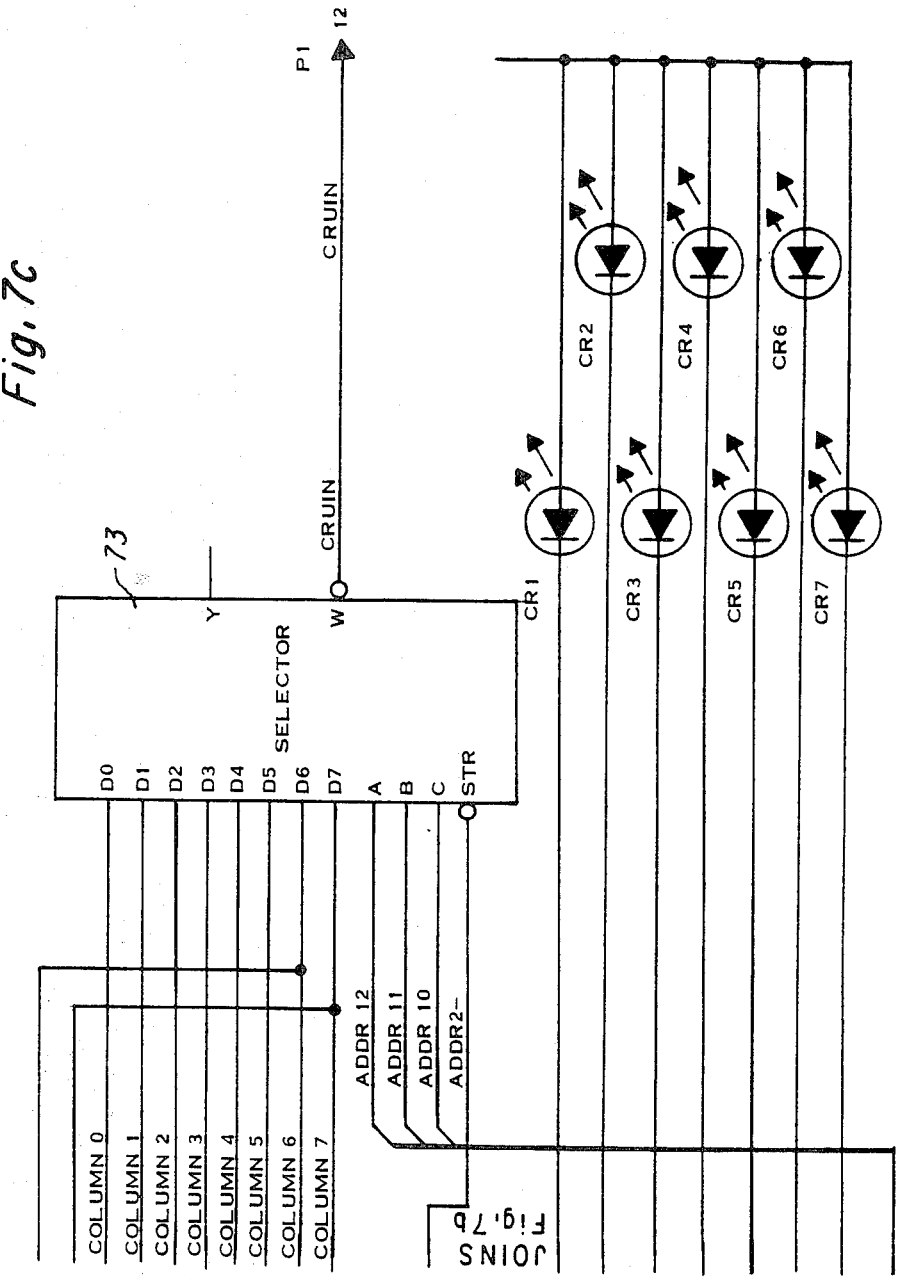

Voltage VCC applied through resistors in resistor pack 85 of FIG. 7b supply input voltages on terminals J1-1, J5-1, J1-2, J5-2, J2-3, J2-4, J6-3, J6-4, J3-1, J3-2, J7-1, J7-2, J4-3, J8-3, J4-4, and J8-4. The voltages are all applied as inputs to terminal D0–D7 of selector 73 of FIG. 7c, in this preferred embodiment, Texas Instruments type 74LS251. Signals ADDR12, ADDR11, and ADDR10 are applied to data select terminals A, B and C respectively. Signal ADDR2- is applied to the strobe terminal. The output signal CRUIN, on terminal W is applied to microprocessor 35.

Addressable latches 86 of FIG. 7b receives signals ADDR12, 11, 10 and 13 on input terminals A through D, respectively. Signal LED enable- is applied to the enable terminal G- and signal RESET- is applied to the CL terminal. Output signals on terminals Q0–Q6 are applied through the resistors of resistor pack 74 to LEDs CR1–CR7 which represent the operational modes of the hand-held application module.

Figure 8:
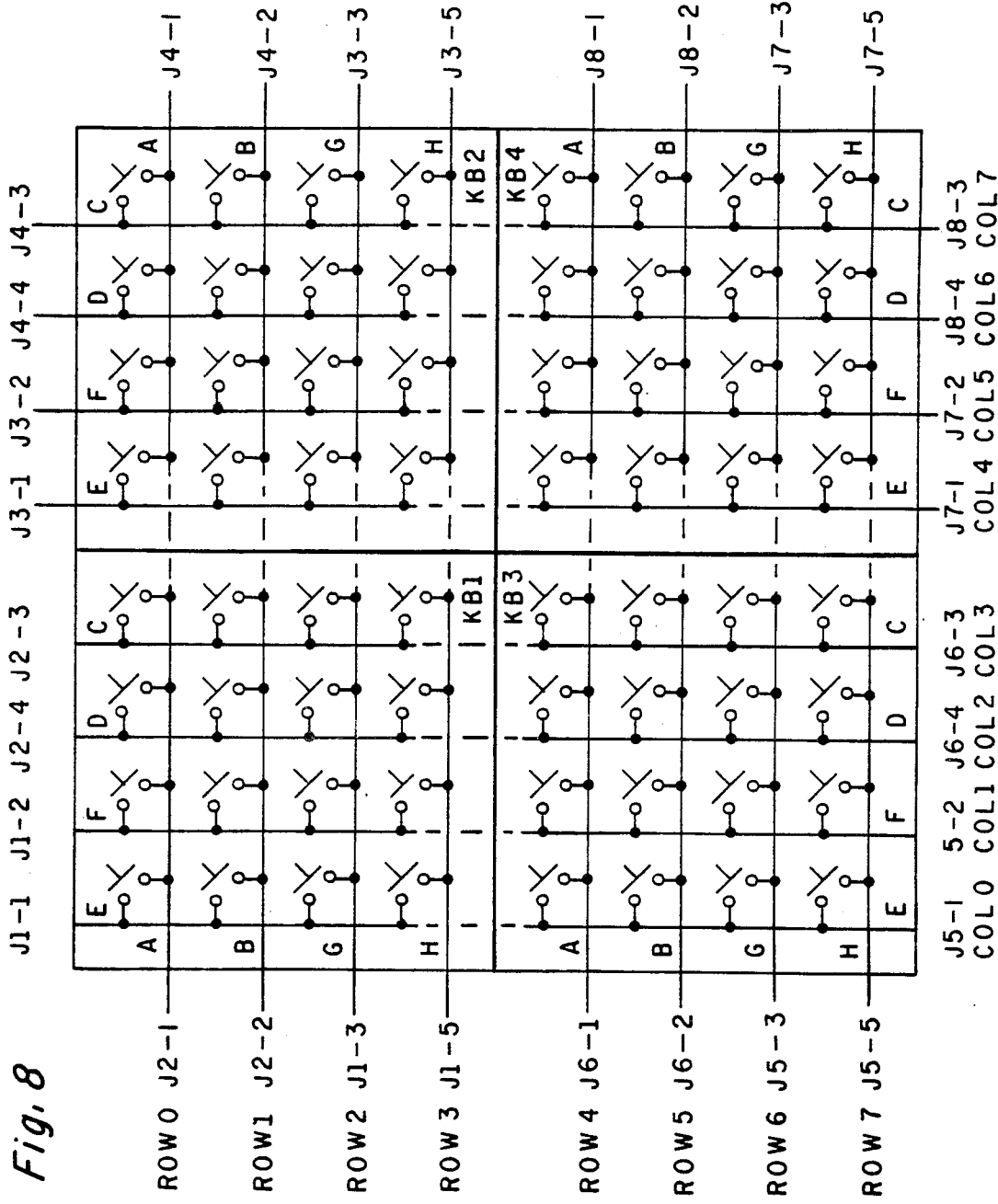
FIG. 8 is a schematic diagram of the keyboard of the module.

FIG. 8 is a schematic of the keyboard of the module. The columns and rows are addressed by terminals J1–J8 as indicated. That is selections of the keys are made by the various combinations of terminals whose signals are dependent upon the condition of signals ROW0 through ROW7 and the voltages provided by voltage VCC.

In summary, microprocessor 45, together with its memories, and the associated logic circuitry provides for the scanning of the keyboard to determine whether a key has been depressed, for display of data in display units 39 and 40 and for transmission and reception of data from the robot central processing unit (RCPU). In this preferred embodiment, the RCPU is a Texas Instruments type 990/5 microcomputer, described in U.S. Pat.

No. 3,944,985 which is incorporated herein by reference.

MODE OF OPERATION

Figure 9A:
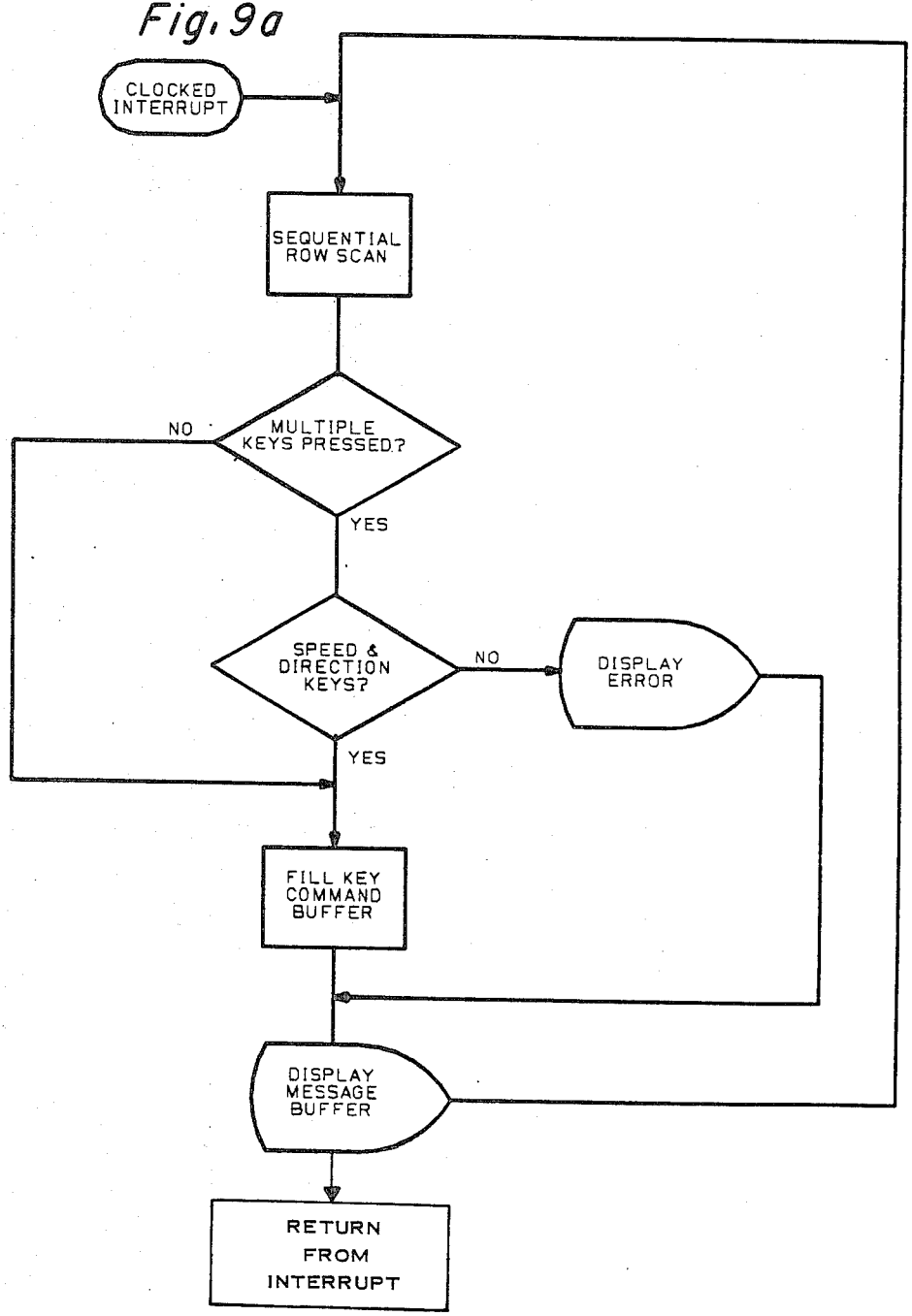
FIGS. 9a and 9b are flowcharts illustrating the operation of the module electronics.
Figure 9B:
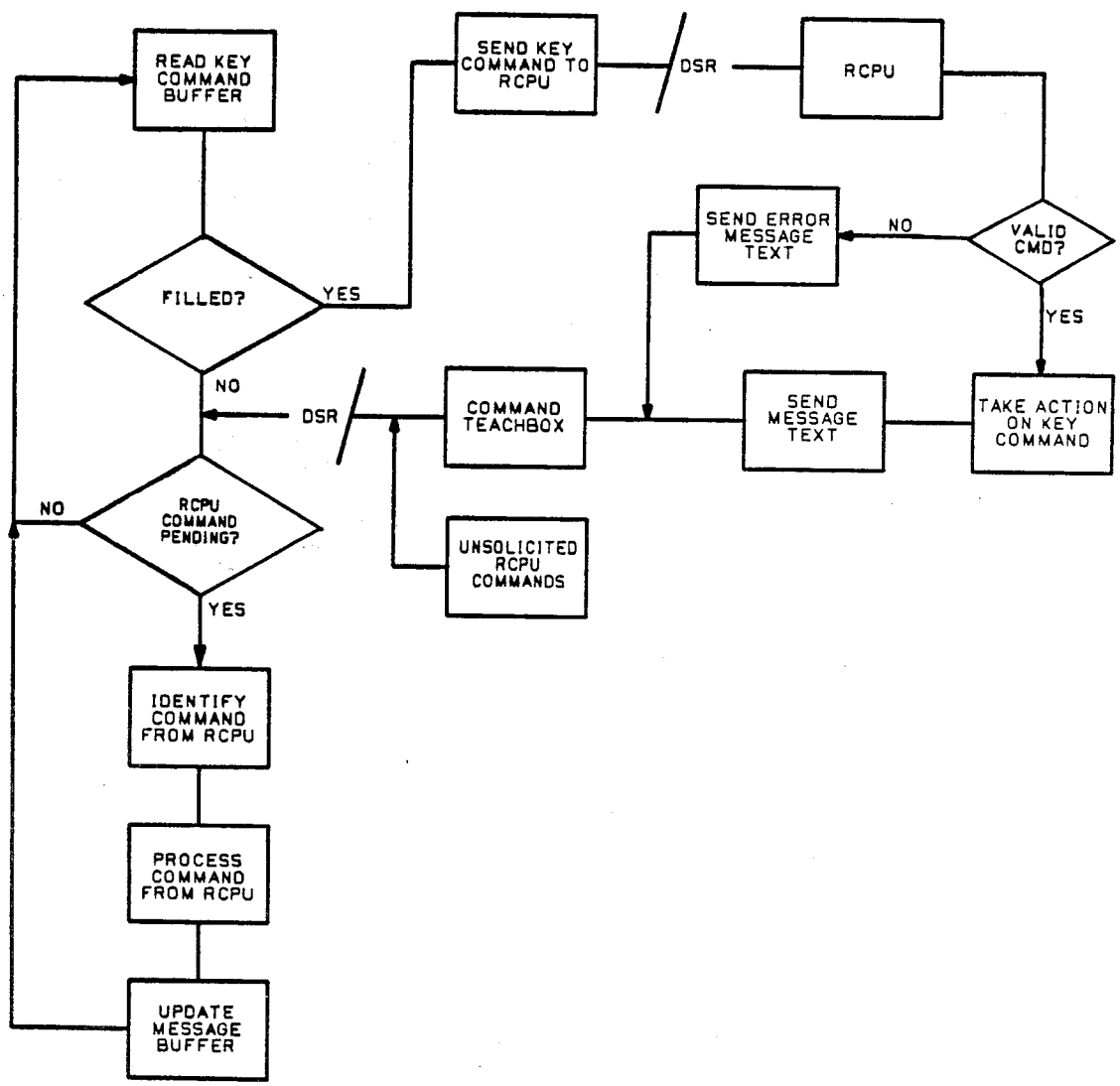

FIGS. 9a and 9b are flowcharts illustrating the operation of the circuitry for the hand-held application module, described above. The operations described result from the program resident in EPROM 58 as it controls the operation of microprocessor 45. This is illustrated in FIG. 9a where a clock interrupt causes a sequential row scan of the keyboard and if multiple keys are not pressed, then the key command buffer is filled and the message buffer is displayed. The interrupt processor completes and returns control to the application module loop. However, if multiple keys are pressed, and if they are not speed and direction keys, then an error is displayed, a message buffer is displayed and the interrupt processor completes and returns control to the application module loop. If there has been multiple keys pressed and if they are speed and direction keys, then the key command buffer is filled, the message buffer is displayed and the interrupt processor completes and returns control to the application module loop.

FIG. 9b illustrates the module process loop for responding to the key command buffer and for displaying the message buffer. Start first at the block entitled "read key command buffer". If not filled, then identify command from RCPU, process command from RCPU, update message buffer and return to read key command buffer. If no RCPU command is pending, then there is obviously no need to identify process and update. If the key command buffer is filled, then the key command is sent to the RCPU over the DSR communication route. The key command is received and determined whether valid. If it is valid, then action is taken on the key command by the RCPU and a message text (ordinary 2 Prompt) is generated. It it is not a valid command, then an error message text is generated. After a message is generated, the message and any command for the application module, including any unsolicited RCPU command, such as called up in a debug routine is communicated to the module by a return through the DSR.

In essence then, the functions performed are filling the key command buffer and monitoring the display message buffer.

FIG. 10 illustrates an articulated robot 31 and the location of the measurement of wrist hand length (WH), lower arm length (EWL) and upper arm length (EWU). Another common measurement is shoulder offset (SJ) which in this preferred embodiment is 0 except for manufacturing errors. These measurements are used in various equations to follow.

Figure 11:
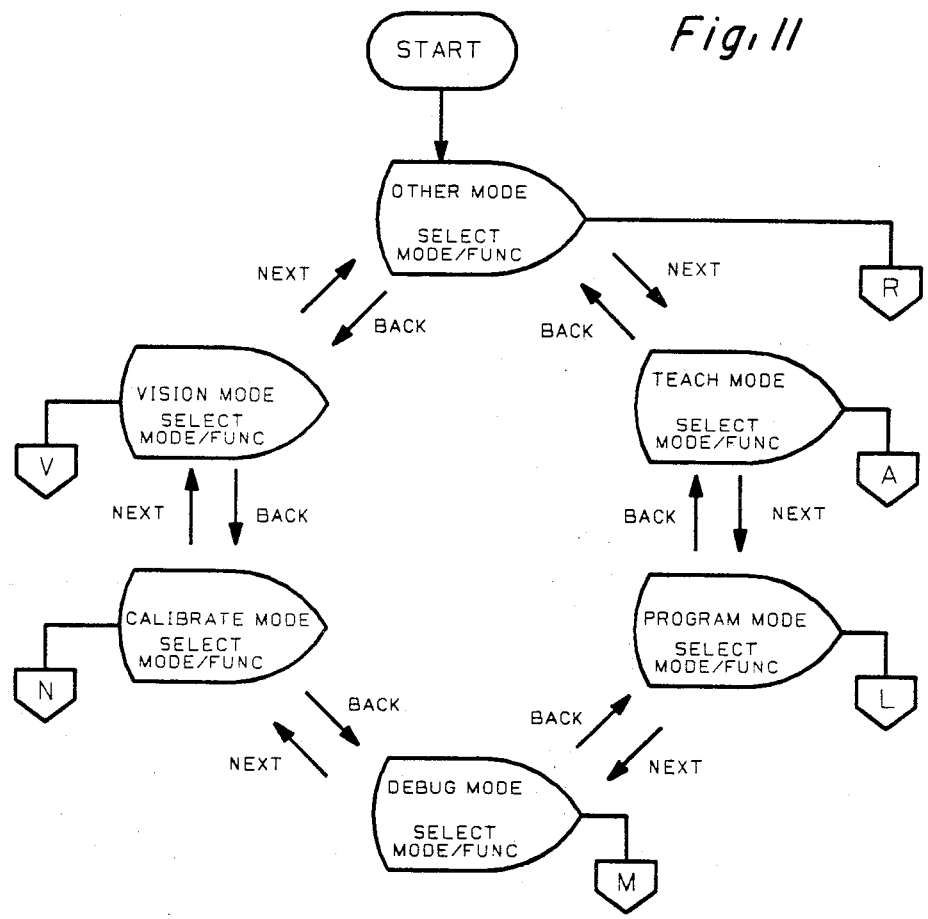
FIG. 11 is a flowchart illustrating the overall operation of the module system.
Figure 12A:
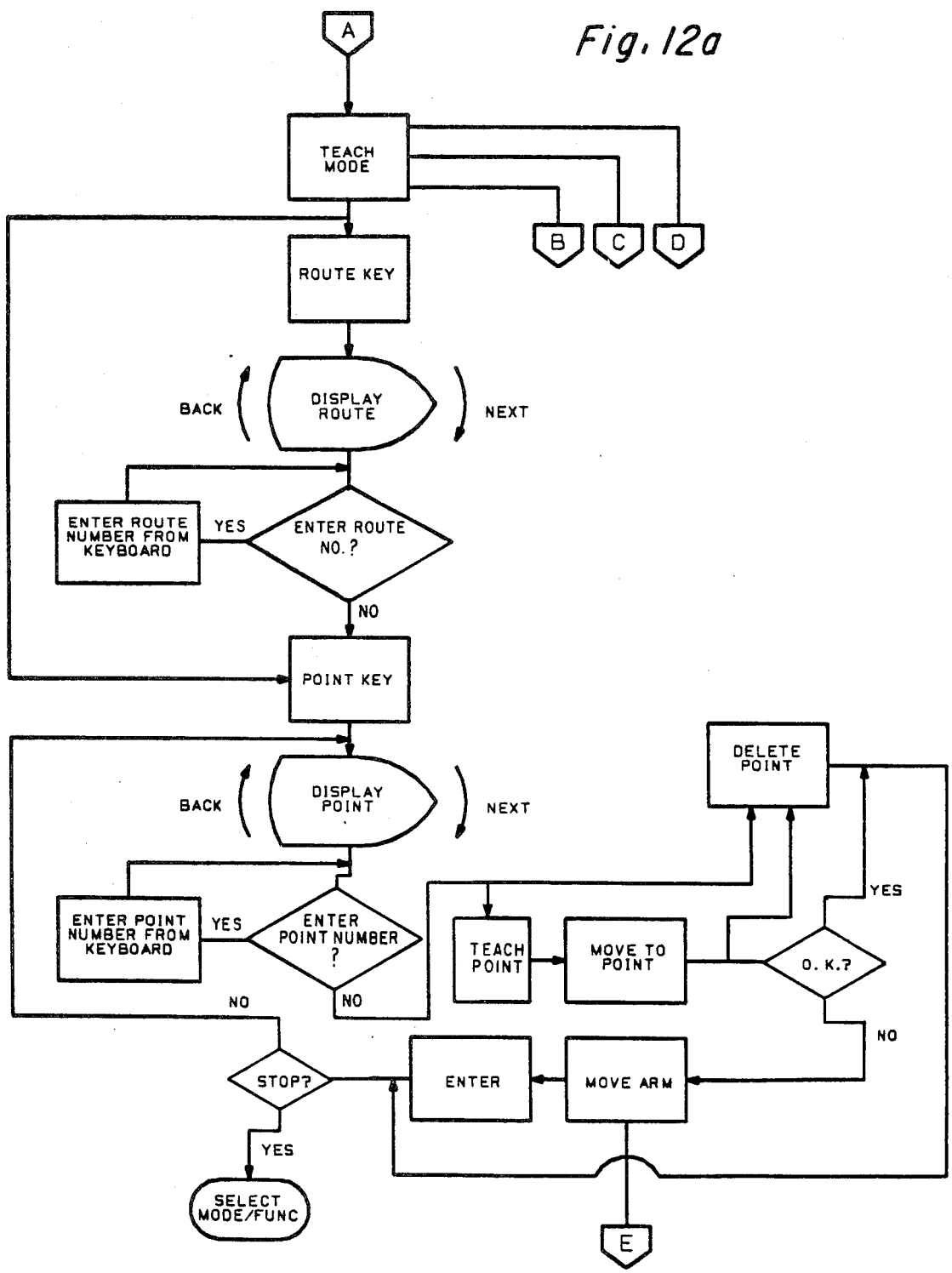

FIG. 11 illustrates the broad functioning of the application module. The various modes, indicated by the LEDs on the front panel of the module are illustrated. That is: other, teach, program, debug, calibrate and vision are all set out. They initiate the various operations to cause the robot 31 to move as directed. They may be sequentially referenced, in either direction of callup by the "next" and "back" keys on the module. Teach mode refers to "A" which follows on FIG. 12a which in turn branches to "B", "C", and "D".

First, with teach mode operative, the route key is depressed and a particular route identification is displayed. A route is a series of points at which actions may be performed. The desired route may be found by moving the "back" and "next" keys as necessary. However, if a particular route number is known or requested, it may be entered directly, as indicated. Next, the point key of the module is depressed and the identification of a point is displayed. The desired point may be achieved by pressing the "back" and "next" keys or, the identity of a particular point can be entered directly from the keyboard as indicated.

Next, the point may be taught or deleted. Then the robot arm is moved to a point and the point deleted or, if the point is satisfactory, then the teaching is completed or if more points are desired, then another point ID is identified. If the point is not satisfactory, the move arm is initiated, the point is entered, and if it is decided to continue, then the identity of the point is again displayed and the routine is repeated.

Figure 12B:
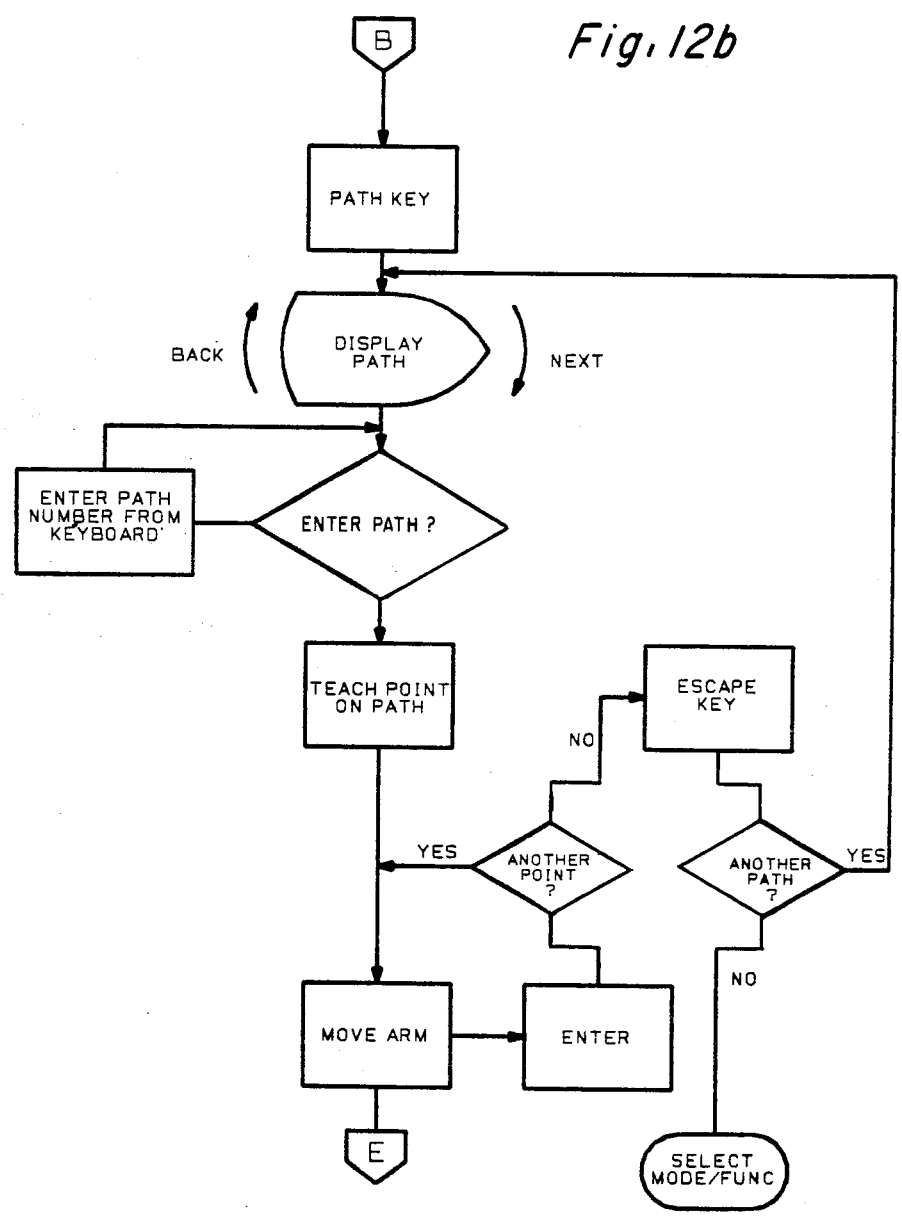

FIG. 12b indicates that a path key is activated. A path is a plurality of points that form a path for the robot arm to follow but not to stop. The identity of the path is displayed and either manually, or by entering from the keyboard, a desired path identification is made and a point is taught on the path. When the arm motion is initiated, an entry is made and if another point is to be taught, the arm is moved again and the cycle is repeated. If another point is not to be taught, then the escape key enables departure from that particular path and if another path is to be referenced, the entire procedure is repeated. If not, then a new mode is selected.

FIG. 12c illustrates a problem of referencing a desired frame. That is, robot 31 is within its base frame defined by the coordinates $X_b$, $Y_b$ and $Z_b$. The conveyor belt 101 is in a different plane defined by coordinates $X_c$, $Y_c$ and $Z_c$. Part 102 on conveyor 101 is in still another plane defined by coordinates $X_p$, $Y_p$ and $Z_p$. For the robot 31 to affect an orderly disposition of the elements of part 102 (keys for example) it would be very simple for the operator to first refer to the plane of the conveyor and then, in reference to that frame (which is referred back to the base frame), refer to the frame of the part 102. Mathematically, this operation requires complex computations, undesirable for the unsophisticated operator. To overcome this difficulty, these frames are easily "taught" by the operator by simply moving to three points in each plane and operating the appropriate keys on the application module. The mathematical operations necessary for the various transformations are accomplished in the RCPU.

Figure 12D:
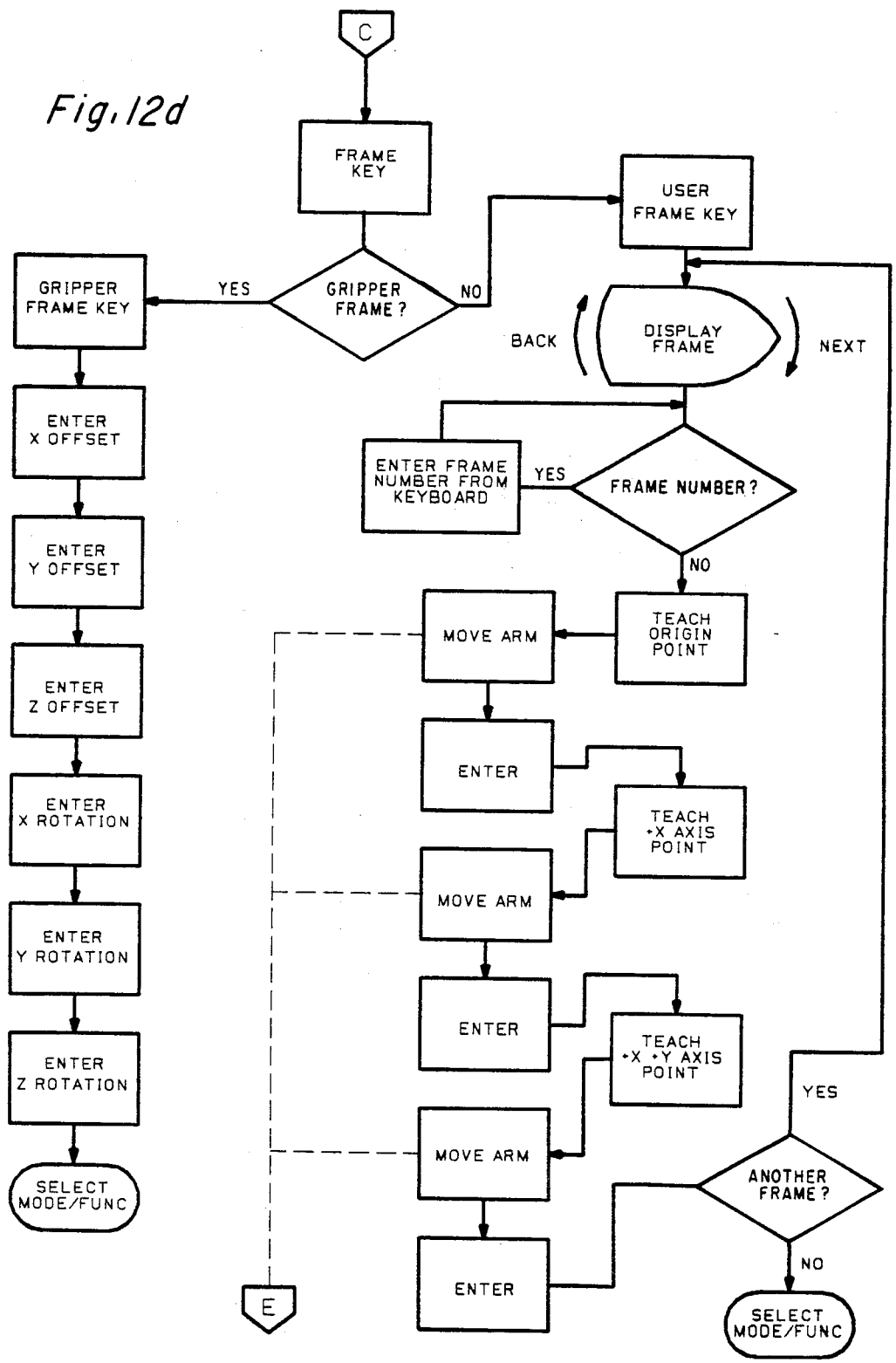

FIG. 12d illustrates the operations for the frame selection. In the teach mode, the frame key is depressed. A special case of frame selection is that of the gripper frame which has reference to the tool that is selected to be attached to the end effector of the robot arm. It is a one time selection and is accomplished, as indicated, by depressing the gripper frame key, entering the desired x offset, y offset, z offset, x rotation, y rotation and z rotation. These steps then identify the relationship of the gripper to the robot arm.

When a user frame is desired, as indicated in FIG. 12c, the user frame key is depressed, the identification of the frame is displayed and the desired frame is located by moving "back" and "next" or by entering the frame number from the keyboard. An origin point is taught by touching the end effector to the origin of the desired frame, the arm is moved and the point is entered. A point on the x axis is taught, the arm is moved, and the point is entered. Next, a point on the x-y plane is taught, the arm is moved and the point is entered. If another frame is requested, the operation is repeated. As many frames as desired may be entered. Otherwise, the mode is exited.

Figure 12E:
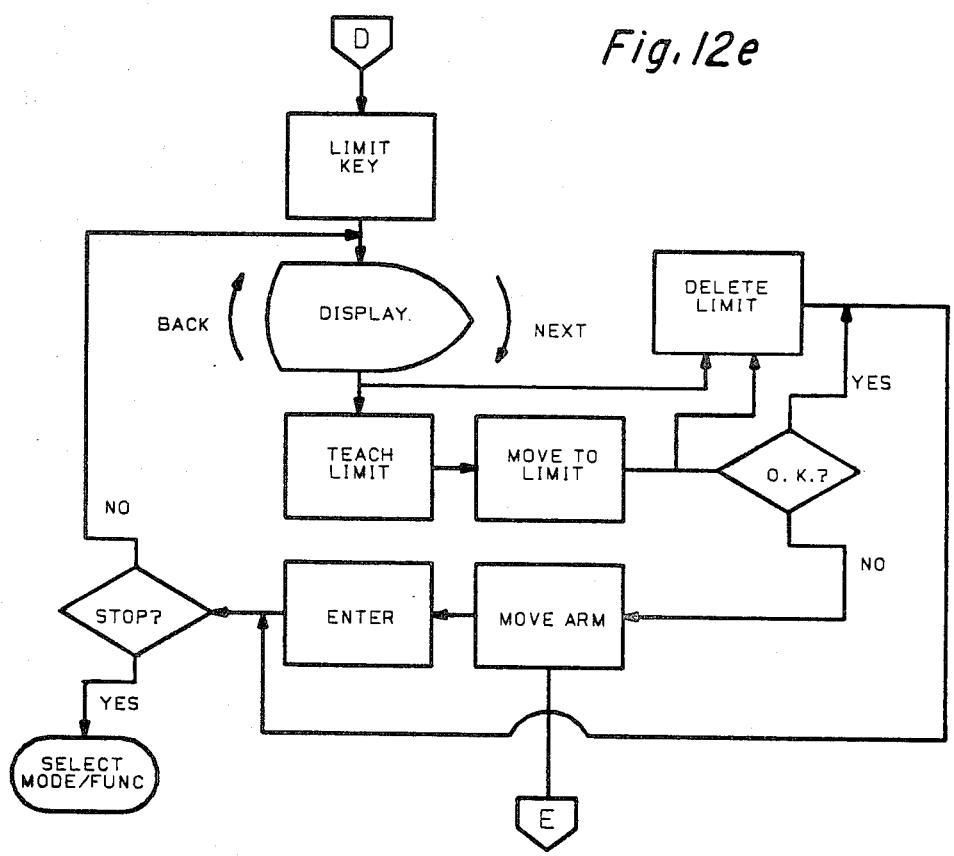

FIG. 12e is still another function of the teach mode. This indicates that the robot arm may be limited in its extent of reach. Often, for safety reasons, it is desired that the robot arm be limited in all directions of motion. When such limit is desired, the limit key of the module is depressed and the identification of the limit is displayed as desired. The limit is either taught or deleted and if taught, then the arm is moved to the limit and if ok, the procedure is over. If not as desired, then the arm is moved, and an entry is made. At that time, if the limits have been defined, the procedure is stopped. Otherwise, the remaining desired limits are taught in the same manner.

Figure 13:
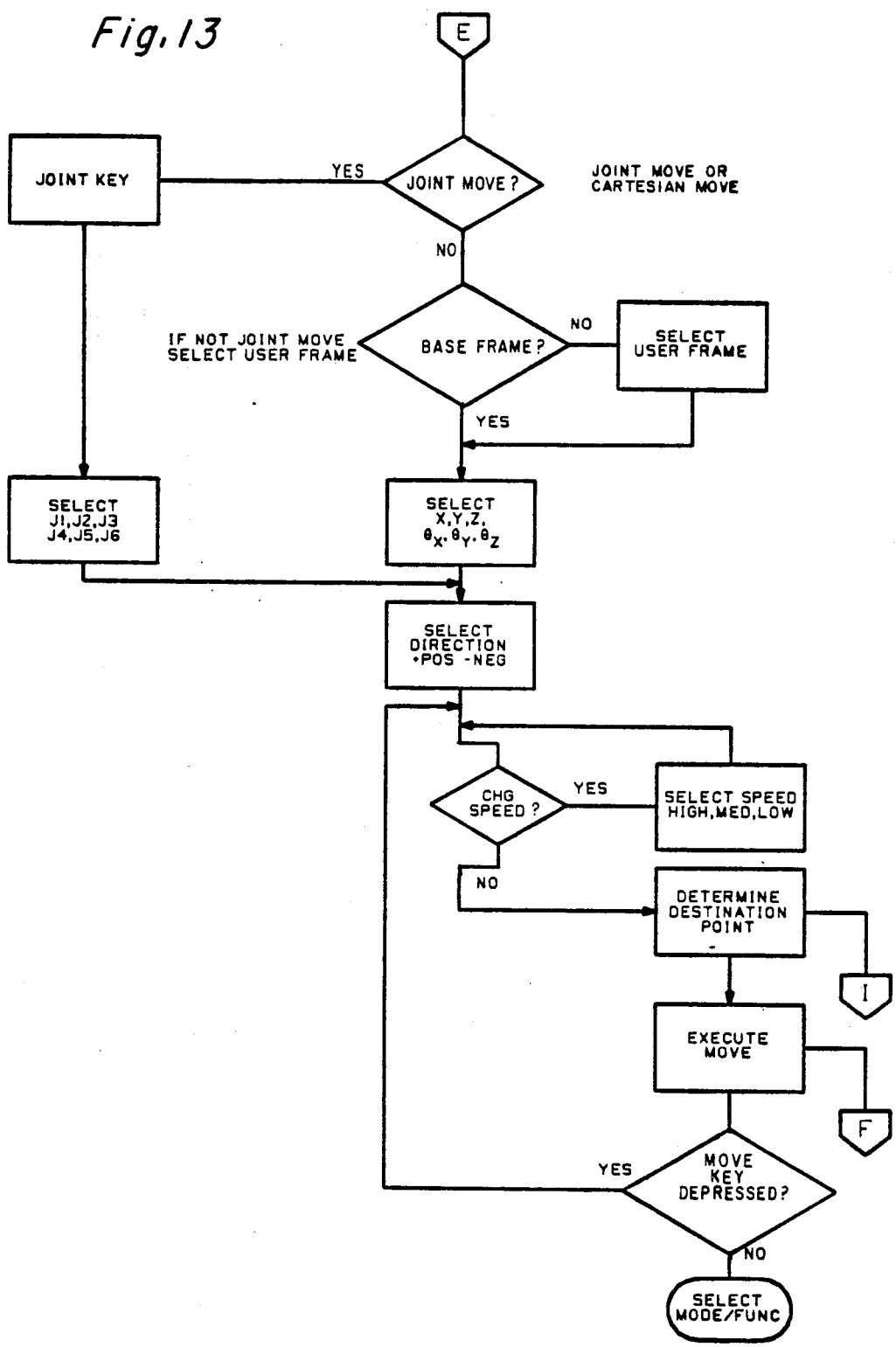
FIGS. 13 and 14 are flowcharts illustrating the control for moving the robot.

FIG. 13 is the flowchart of initiation of movement. It may be decided to move a joint in which event the joint key is depressed and then the key corresponding to the particular joint to be moved is depressed. In the alternative, if it is desired to move in a cartesian manner then the appropriate coordinate and orientation is selected. If in the cartesian move, it is determined that the move is not to be in the base frame, then the user frame must be selected. After selecting the joint or the cartesian coordinate, then the direction is selected from the keyboard at which time the move would be made at a predetermined rate unless it is desired to change speed at which point the operator may select high, medium or low speed. If no change is desired, then the destination point is determined and the move is executed. If the move key remains depressed, the select speed and direction is repeated. If not, the loop is exited.

Figure 14:
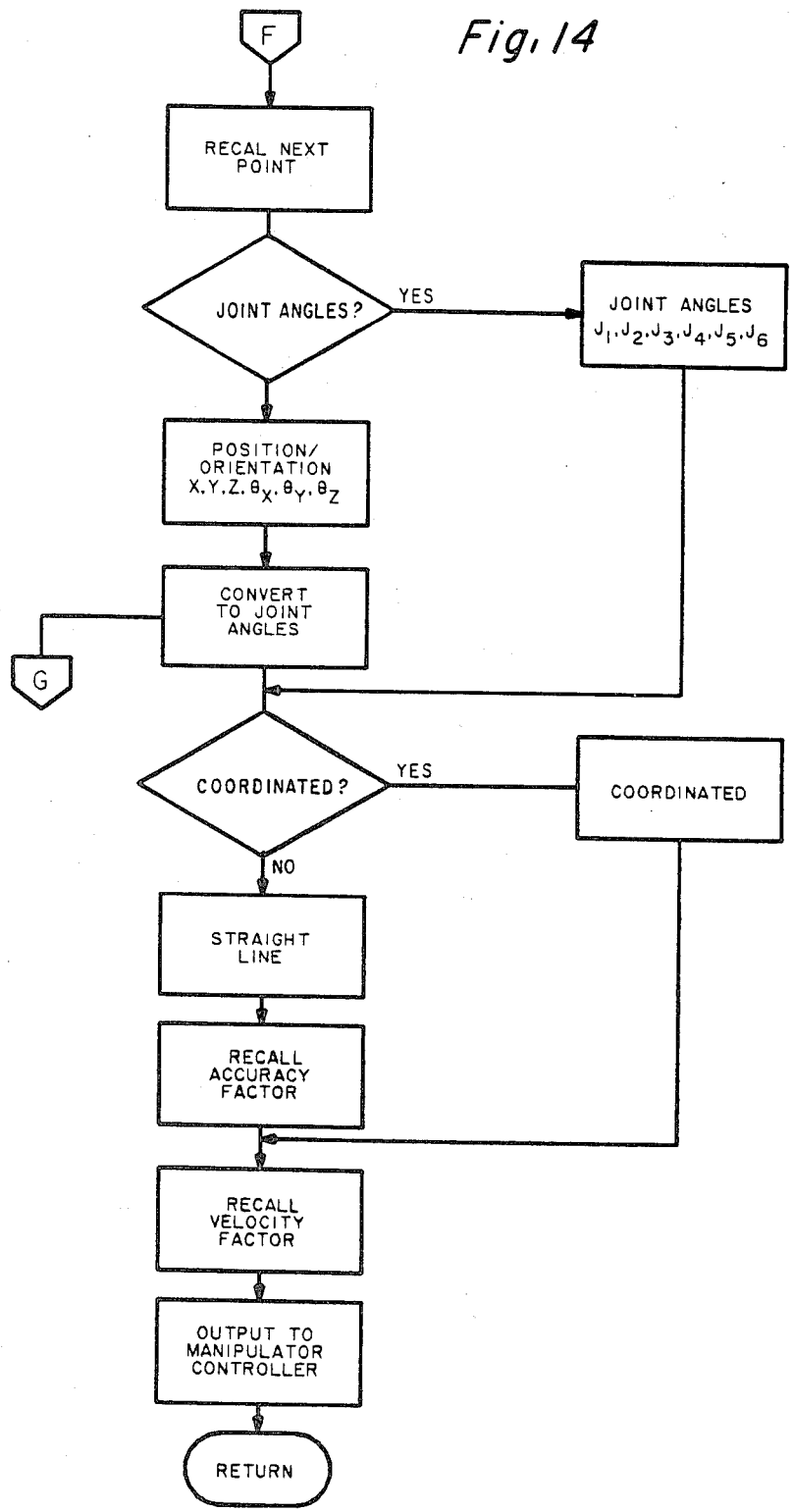

FIG. 14 illustrates a move to the next point by recalling the next point and checking the point format. If the format is in joint angle, then the next decision is the type of move. If the point format is in position and orientation, then that position and orientation must be converted to joint angles.

Once the joint angles have been determined, then it is necessary to determine what type of move. If it is coordinated, then a velocity factor is recalled to cause all of the joints to move at such a rate of speed so as to complete the move at the same instant. To get to the recall velocity factor if a straight line is desired, then an accuracy factor is recalled. That is, a straight line is made up of a number of segments. The higher the accuracy called for, the higher the number of points making up those segments. One hundred percent accuracy provides for the maximum number of points for a given distance, the move is then completed.

Following are definitions of various operators that are used in the mathematics of transformation from points to coordinates and coordinates back to points, as well as matrix multiplication.

1.
$$T(BASE,P) = \begin{bmatrix} O_{X1} & O_{Y1} & O_{Z1} & X \\ O_{X2} & O_{Y2} & O_{Z2} & Y \\ O_{X3} & O_{Y3} & O_{Z3} & Z \\ 0 & 0 & 0 & 1 \end{bmatrix}$$
POSITION/ORIENTATION MATRIX 2. SJ = SHOULDER OFFSET
WH = WRIST HAND LENGTH
EWU = UPPER ARM LENGTH
EWL = LOWER ARM LENGTH 3. S1 = SIN(J$_1$),    C1 = COS(J$_1$)
S23 = SIN(J$_2$+J$_3$),    C23 = COS(J$_2$+J$_3$)
S3 = SIN(J$_3$),    C3 = COS(J$_3$)
S4 = SIN(J$_4$),    C4 = COS(J$_4$)
S5 = SIN(J$_5$),    C5 = COS(J$_5$)
S6 = SIN(J$_6$),    C6 = COS(J$_6$)

4. X$_W$ = WRIST X COORDINATE = X−O$_{Z1}$*WH
Y$_W$ = WRIST Y COORDINATE = Y−O$_{Z2}$*WH
Z$_W$ = WRIST Z COORDINATE = Z−O$_{Z3}$*WH

5.
$R^2 = X_W^2 + Y_W^2 - SJ^2$,   $R = \sqrt{X_W^2 + Y_W^2 - SJ^2}$ $\phi_1 = ARCTAN(Y_W/X_W)$
$\phi_2 = ARCTAN(SJ/R)$ $AC^2 = R^2 + Z_W^2$,   $AC = \sqrt{R^2 + Z_W^2}$ $DEW^2 = EWU^2 - EWL^2$,   $DEW = \sqrt{EWU^2 - EWL^2}$ $AD = (AC^2 + DEW^2)/2*AC$
$DC = AC - AD$ $BD = \sqrt{EWU^2 - AD^2}$

1 = ARCTAN(AD/BD)
2 = ARCTAN(Z$_W$/R)
3 = ARCTAN(DC/BD)

Figure 15:
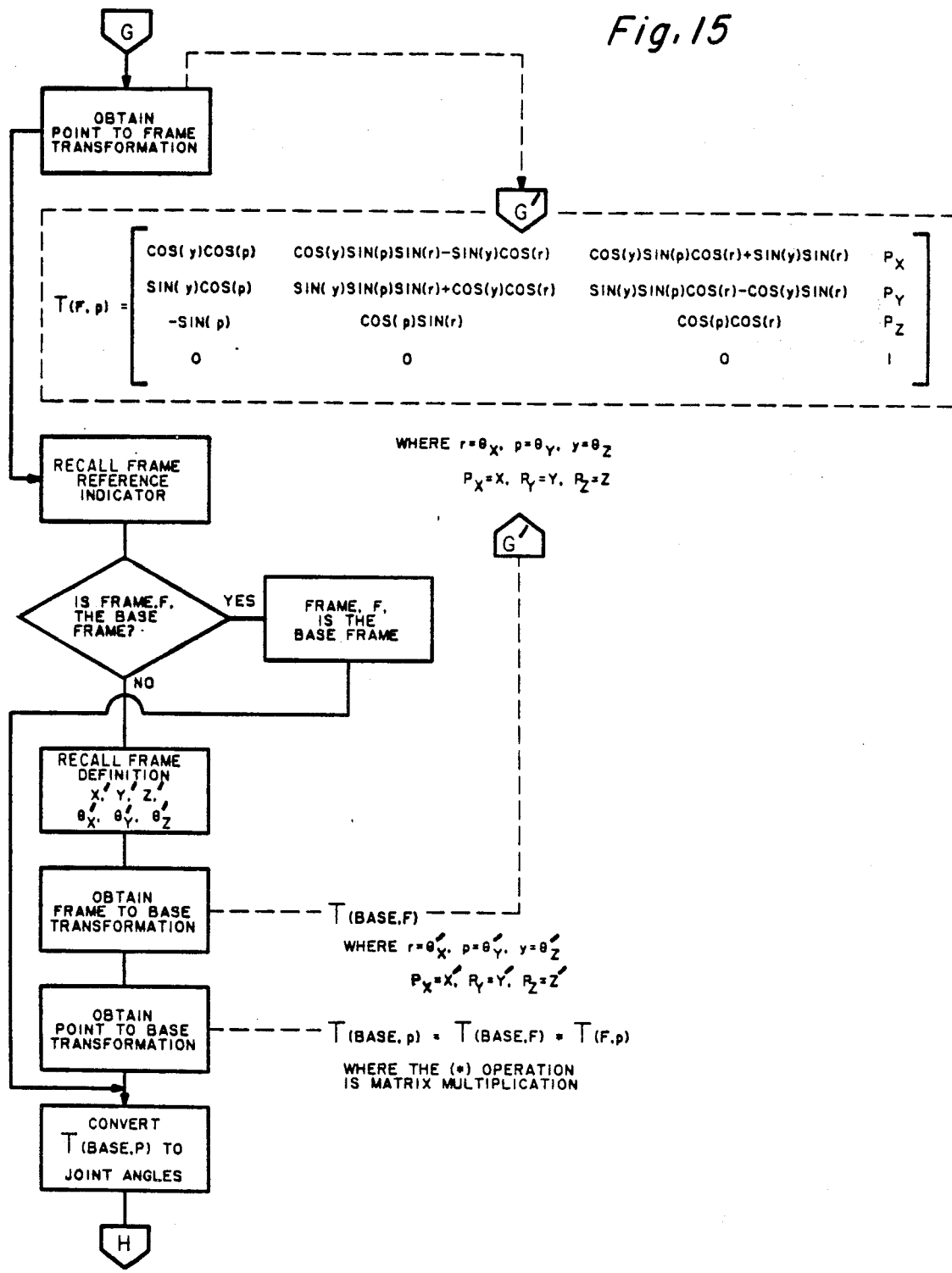
FIG. 15 illustrates mathematical transformations for robot operation.
Figure 16:
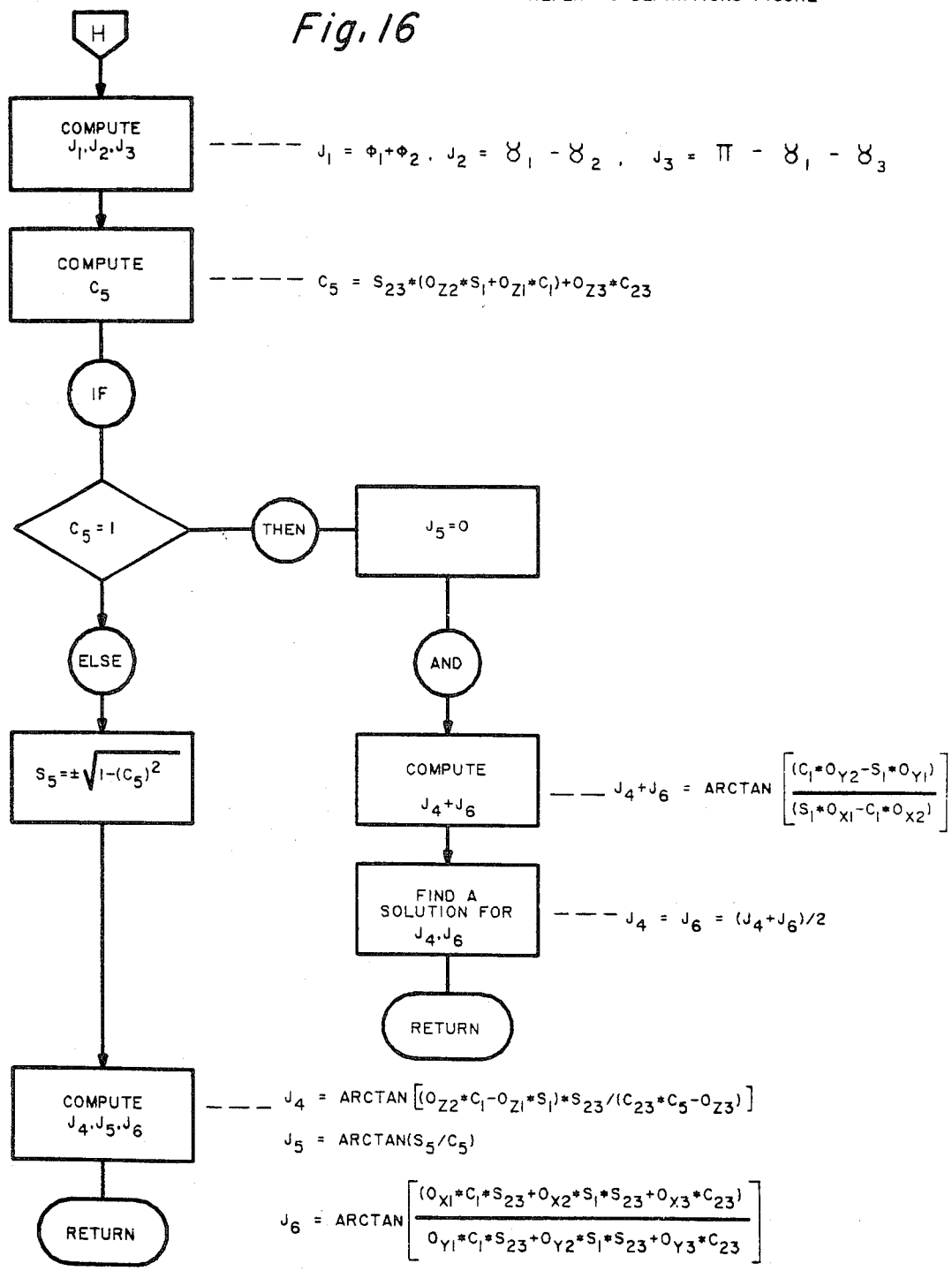
FIG. 16 illustrates mathematical manipulations for operation of the robot.

Turning to FIG. 15, reference letter "G" illustrates an entry from an instruction to convert to joint angles. First, a point to frame transformation is made at "G'" where T (F,p) is shown. Then the frame reference indicator is recalled and if the frame F is the base frame, the next step is to convert T (BASE, p) to joint angles. If it is not the base frame, then the frame definition is recalled and the frame to base transformation is made at G'. Then a point to base transformation is made and the T (BASE, p) is converted to joint angles, this conversion is shown in FIG. 16 where J1, J2 and J3 are completed as indicated. Then next, cosine of angle J5 is completed as indicated and if C$_5$=1, then J5=0 and J4+J6 is computed as indicated and J4. J6 is solved. If C5 is not equal to 1, then S$_5$ is determined as indicated and J4. J5. J6 is computed as shown.

Figure 17:
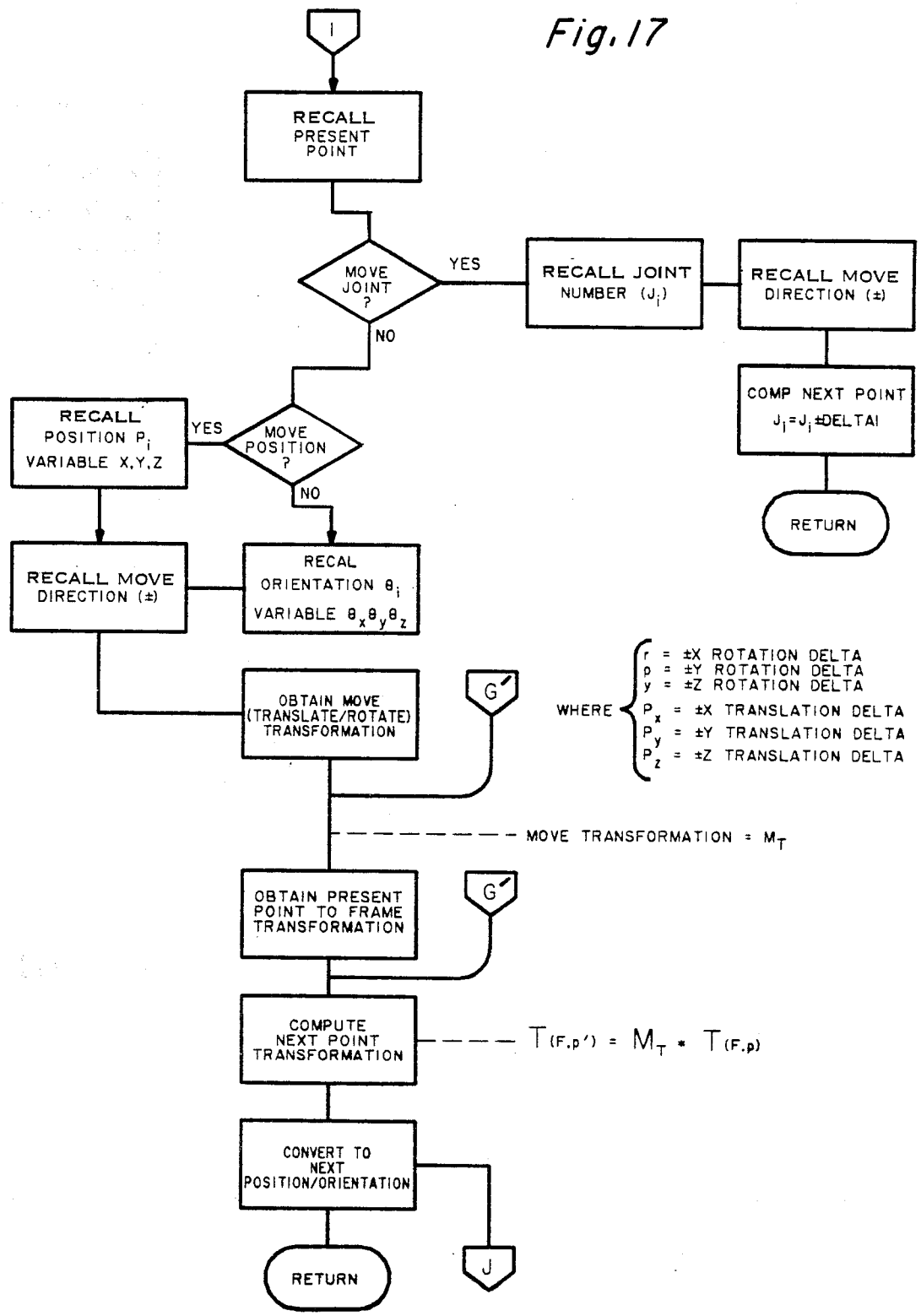
FIG. 17 is a flowchart illustrating mathematics required for movement of the robot.

FIG. 17 is a flowchart for determining a destination point. First, the present point is recalled. If a joint is to be moved, the joint number J$_i$ is recalled followed by a recall of move direction. The next point is then computed as shown. If there is a move position, then position P$_i$ is recalled as variable x, y, z. If there is a move orientation, then orientation O$_i$ is RECALLED AS VARIABLE $\theta_x$, $\theta_y$, $\theta_z$. Then the move direction is recalled. Then the transformation of translate (position) or rotate (orientation) is made at G'. Next, the present point to frame transformation is made in accordance with the expression at G' and the next transformation is computed as shown. Then a conversion is made to the next position/orientation at "J".

Figure 18:
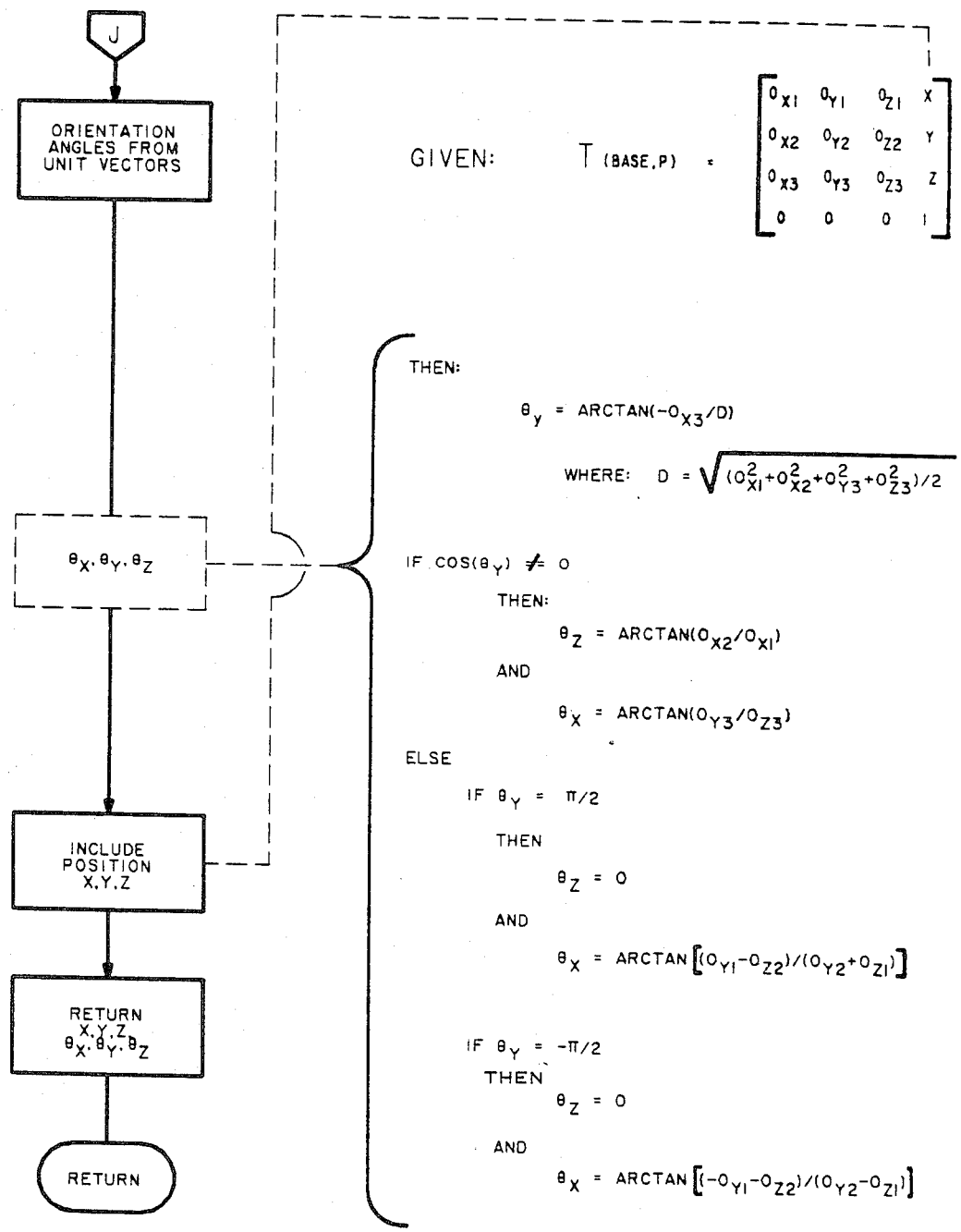
FIGS. 18 and 19 are flowcharts containing mathematics necessary for movement of the robot.

FIG. 18 illustrates the operation of converting to the next position/orientation showing orientation angles from unit vectors being $\theta_x$, $\theta_y$ and $\theta_z$, derived as illustrated. Next, the x, y, z positions are included and finally put together in the coordinate system with x, y, z and $\theta_x$ $\theta_y$ $\theta_z$.

Figure 19:
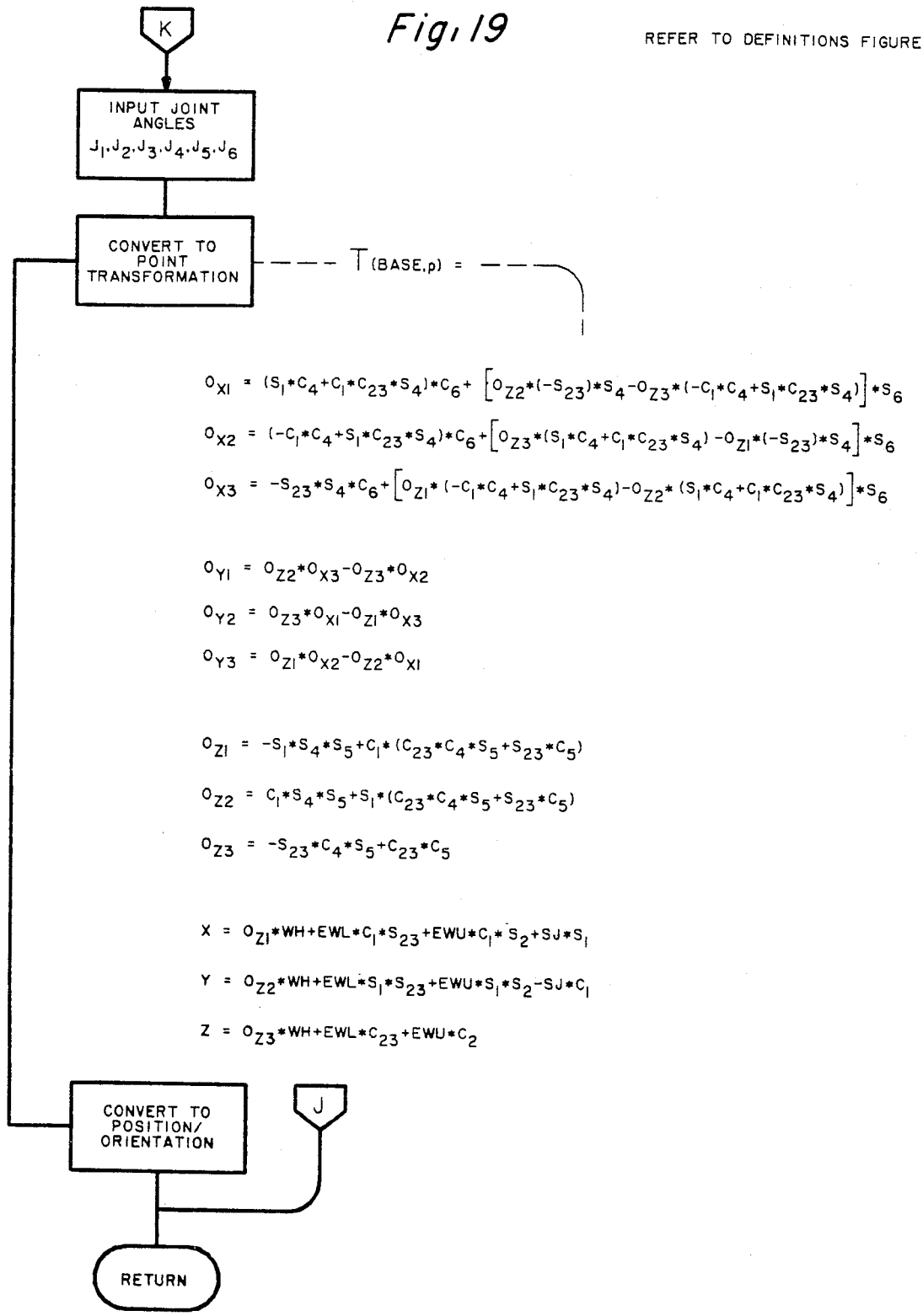

FIG. 19 indicates the conversion of any input at joint angles to a point transformation with mathematical expressions as shown. Conversion to a position/orientation is made as previously indicated on FIG. 18.

From these flowcharts, it is evident that all moves must be made ultimately in joint angles so that a conversion to such is required. Also, when a user frame is selected, it is referenced back to the base frame so that the operation of the robot arm is always in the base frame coordinates and yet the user has defined a particular user frame by simply indicating that user frame as previously shown. If it is desired to use more than one user frame, any number can be established. However, if it is desired, as indicated in FIG. 12c, to reference first one frame (the conveyor belt) to the base frame and then a second frame (workpiece frame) to the conveyor frame, this can be done to an arbitrarily defined depth of seven such frames. This is known as frame stacking and is available through the ER-L ™ language. By multiplying the matrices of, for example, two user frames, one of those frames is referenced to the other. However, no matter what the depth of frame stacking, the actual motion is referenced back to the base frame with other necessary mathematical transformations as shown having been performed.

For example, if the base frame ($F_b$) is referenced by a first user frame ($F_1$), and if base frame $F_b$ is referenced by a second user frame ($F_2$), then:

$$T(F_1, F_2) = T(F_b, F_1)^{-1} * T(F_b, F_2)$$

illustrating that a matrix multiplication yields the desired relationship.

Figure 20:
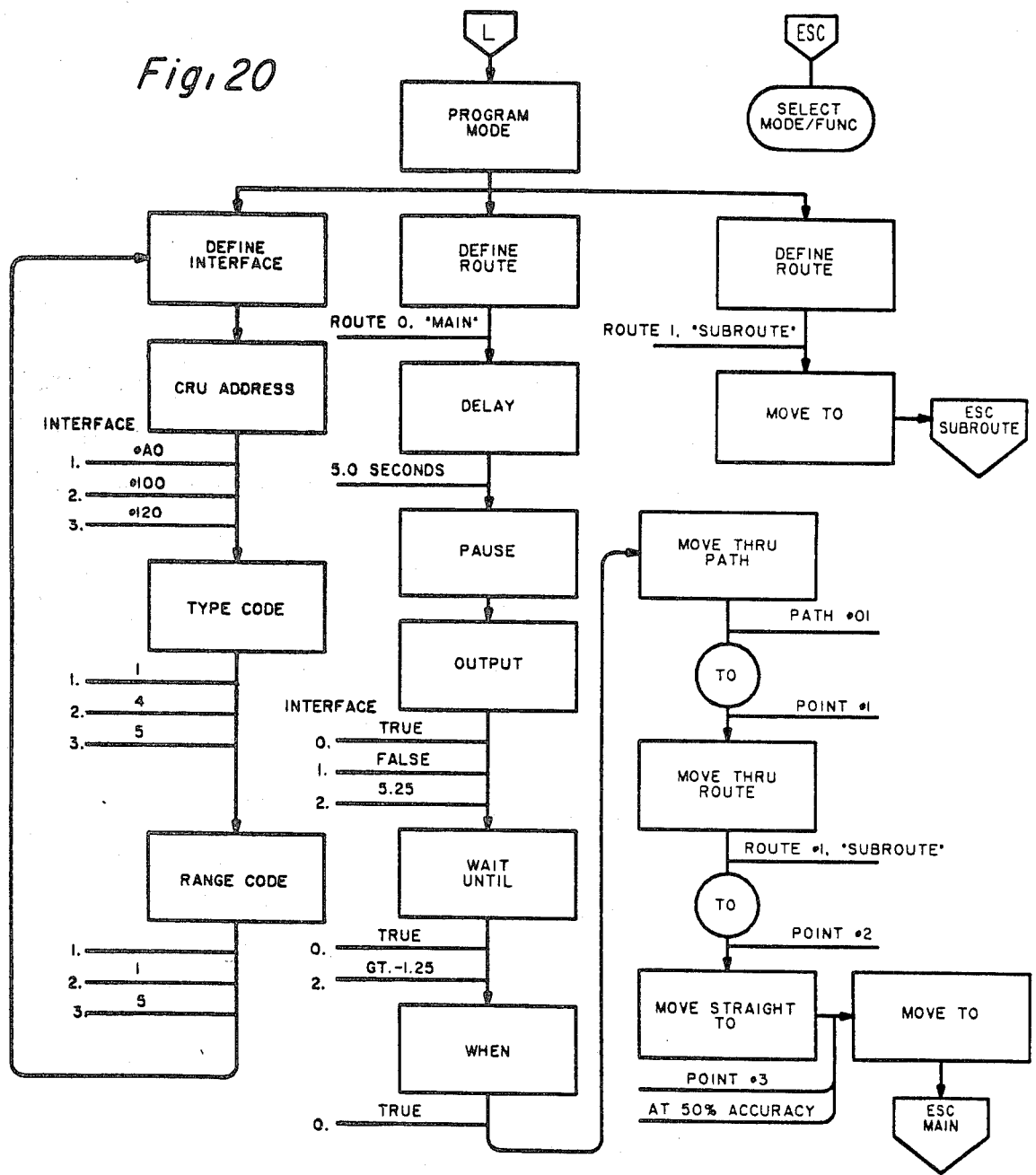
FIG. 20 is a flowchart illustrating the program mode of the module.

FIG. 20 is a flowchart of the program mode of the module. This program is the flowchart of the program shown below.

```
MODULE SIMPLE
CONSTANT
  FRAME1 : FRAME
  PATH01 : PATH
1610 at #A0
  DIN : BOOLEAN INPUT(0)
  DOUT : BOOLEAN OUTPUT(0)
A_D AT #100
  AIN : NUMBER INPUT(0) −5 TO +5 VOLTS
D.A AT #120
  AOUT : NUMBER OUTPUT(0) −10 TO +10 MAMPS
HOME ROUTE MAIN
  DELAYS(5.0)
  PAUSE
  GRIPPER := TRUE
  DOUT := FALSE
  AOUT := 5.25
  WAIT UNTIL GRIPPIN=TRUE
  WAIT UNTIL AIN > −1.25
  WHEN GRIPPEN=TRUE MOVE THRU PATH01 TO PNT1
  PNT1 : POINT
     MOVE THRU SUBROUTE TO PNT2
  PNT2 : POINT
     MOVE STRAIGHT(50) TO PNT3
  PNT3 : POINT
     MOVE TO ESCAPE MAIN
  END ROUTE MAIN
ROUTE SUBROUTE
  MOVE TO ESCAPE SUBROUTE
  END ROUTE SUBROUTE
END MODULE SIMPLE
```

Figure 21:
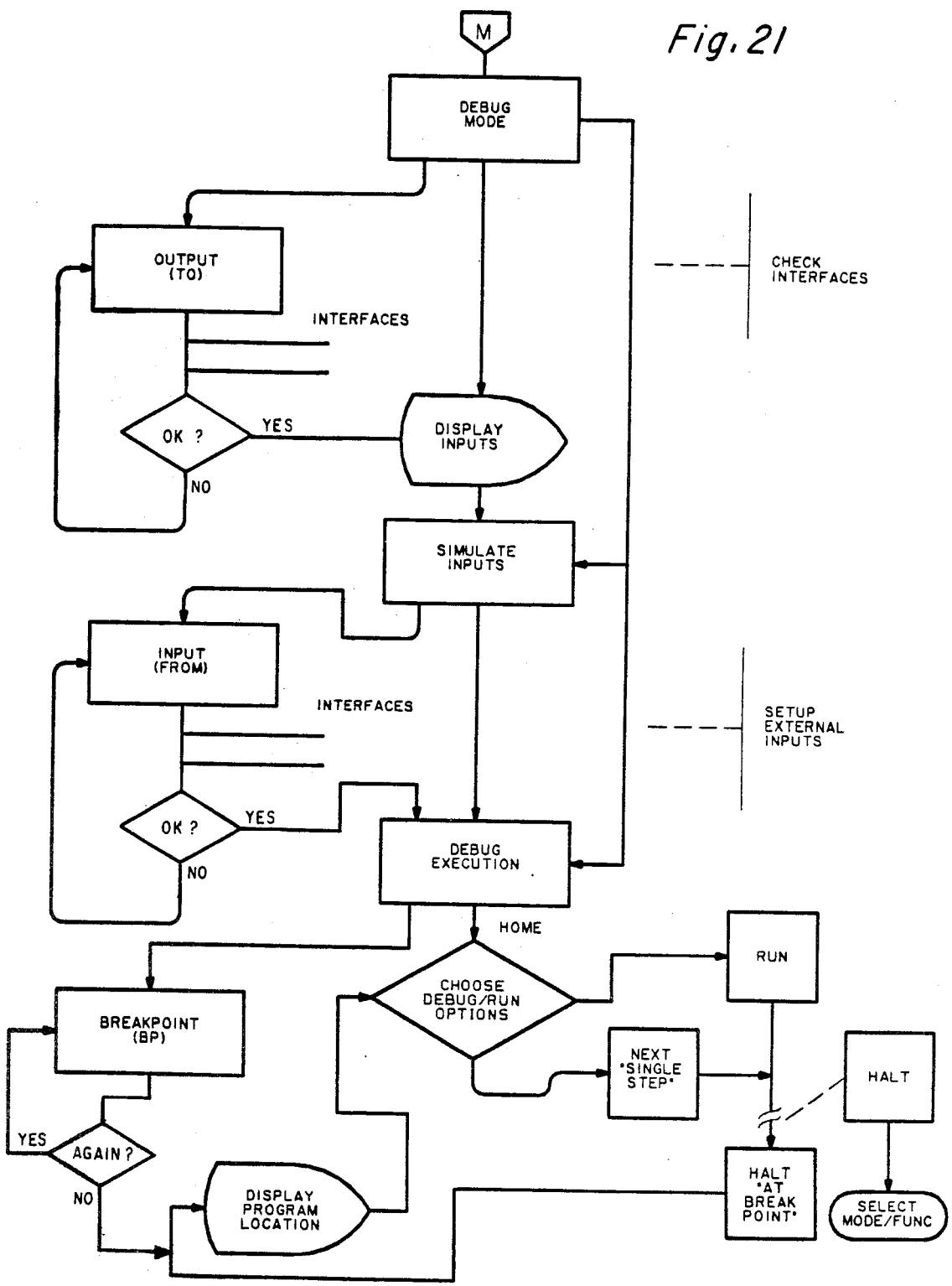
FIG. 21 is a flowchart illustrating the debug module.

FIG. 21 is a block diagram of the debug mode for checking interfaces and the entered programs generally. Debug mode is selected and output is selected to be made to a desired interface. If it is ok, then inputs are displayed. If it is not ok, the cycle is repeated. Then inputs are simulated by choosing inputs from certain interfaces and specifying the values that the points are to take. Once the input loop is ok, debug execution may proceed. Debug execution involves setting a breakpoint if desired. The setting of breakpoints permits execution of a program at defined points. Also, a choice must be made for the various debug/run options. A run may be executed in a single step mode or may be allowed to run with anticipated halt at a breakpoint. When the program reaches a halt (single step or breakpoint) point identification is displayed for correction.

Figure 22:
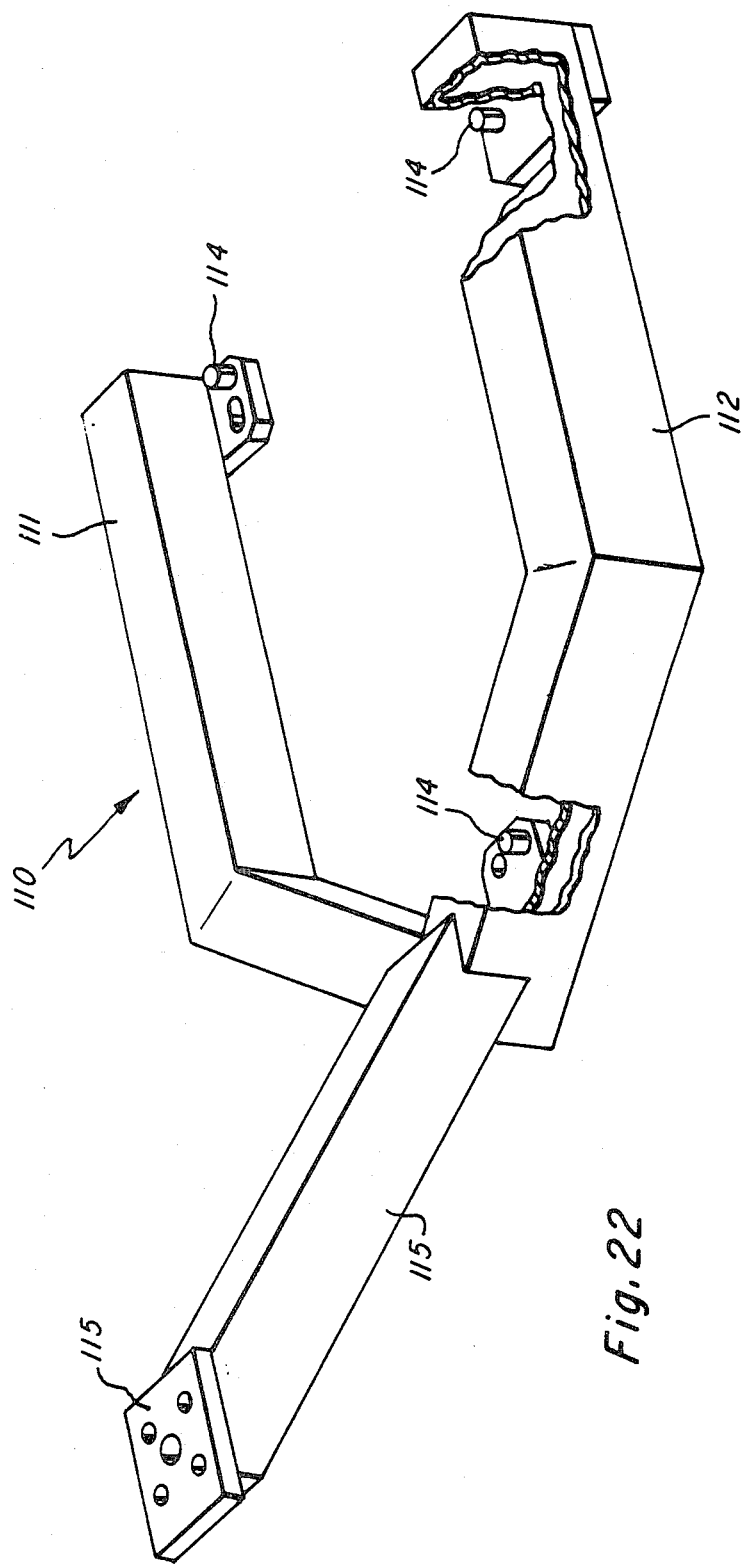
FIG. 22 is a partial cutaway view of the calibration fixture for calibrating the robot.

FIG. 22 illustrates calibration fixture 110 having base members 111 and 112 for attachment to articulated robot 31 by way of fasteners 114. Accurate alignment of the calibration fixture to the robot base must be achieved. The method shown in this figure is to depend on mating machined surfaces between 31 and 110 to establish Z location and a hole and slot in member 110 interfacing pins in the robot base 31 to establish correct x-y location. Other combinations of pins in 110 and hole/slots in 31 or mixtures could be used to establish the correct relationship between 110 and 31. In like manner, round holes could be used with round and diamond pins; or combinations of three spherical balls or cylindrical segments nesting in three Vee grooves in a triangular layout could be used to effect accurate positioning of the fixture 110 to the robot base 31. Upper member 113 terminates in end point 115.

Figure 23:
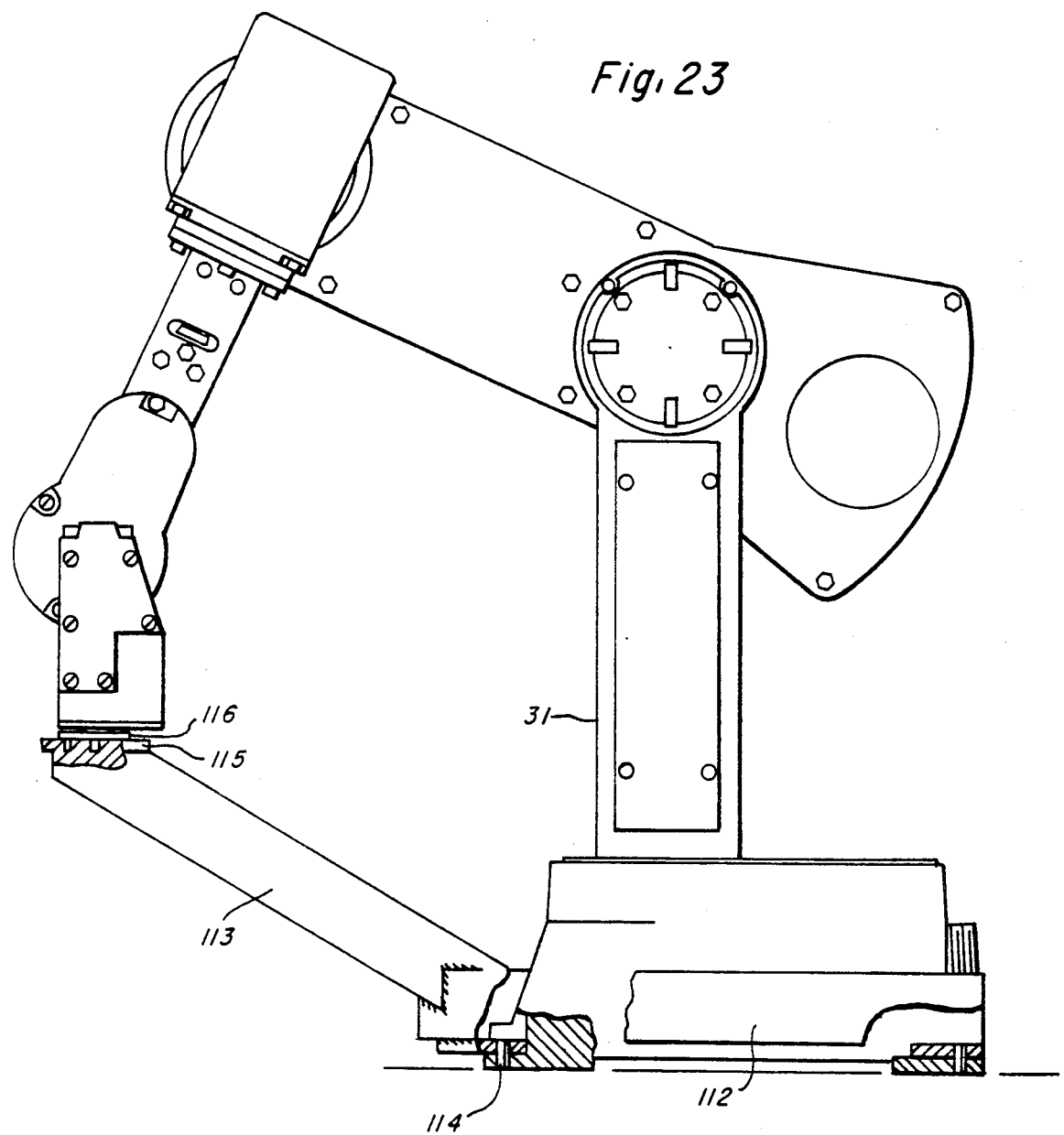
FIG. 23 is a side view of a robot in position in the calibrating fixture of FIG. 22.

FIG. 23 illustrates articulated robot 31 in position in the fixture 110 with end effector 116 connected to end point 115. This places the robot arm in a particular configuration. If all of the link lengths and other robot arm dimensions were nearly perfect, and if all of the fixture dimensions were nearly perfect, then a calibration could be made by simply noting the output of the resolvers at each joint and comparing those measurements with the actual angle imposed by the calibration fixture. These offset values could then be stored in the memory of the RCPU to be brought out whenever angles were measured to correct those angles. However, that is not the case and for the accuracy required, a further calibration must be made.

Figure 24:
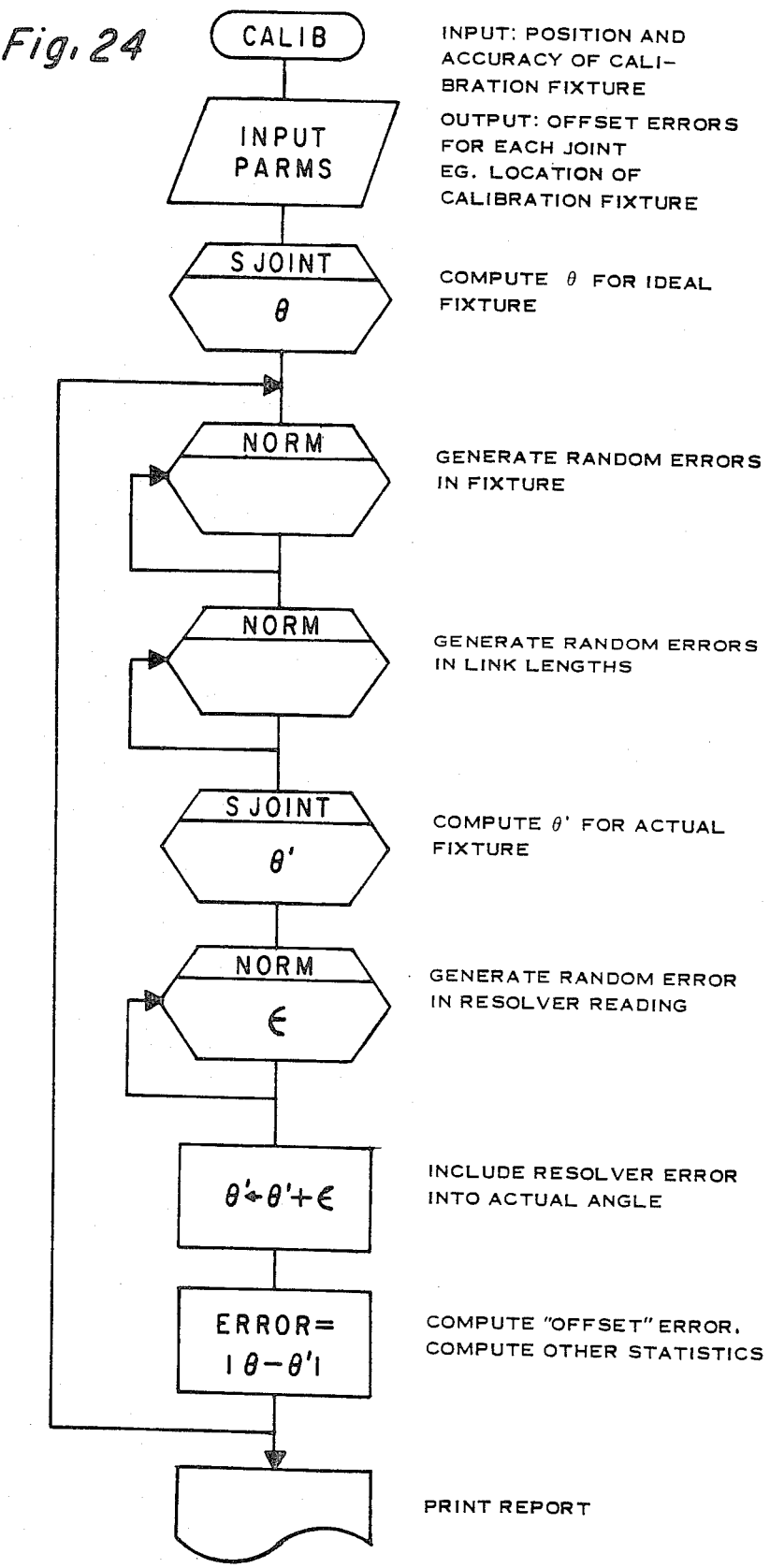
FIG. 24 and FIGS. 25a and 25b are flowcharts illustrating the steps of design of the fixture of FIG. 22.
Figure 25A:
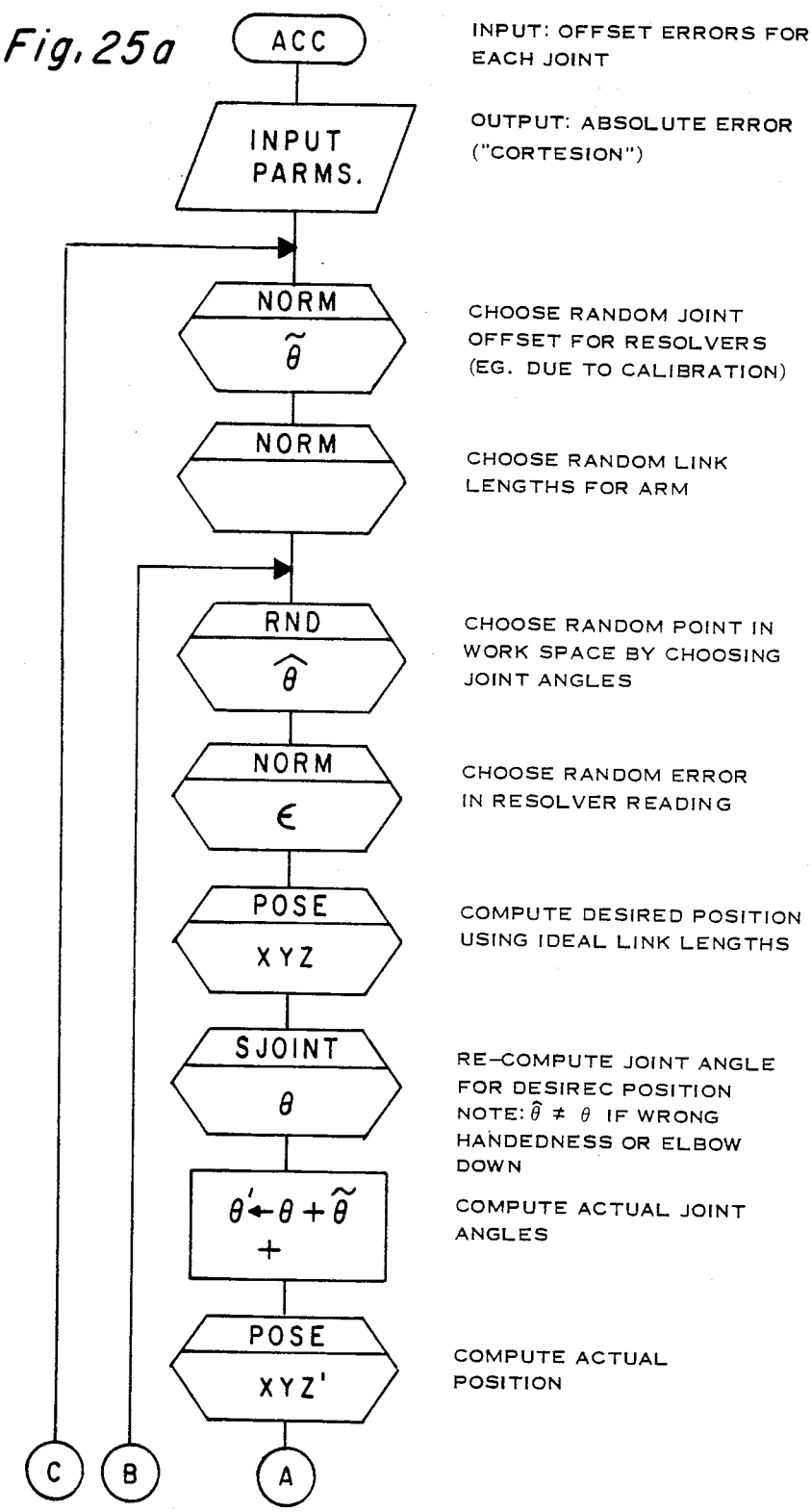
Figure 25B:
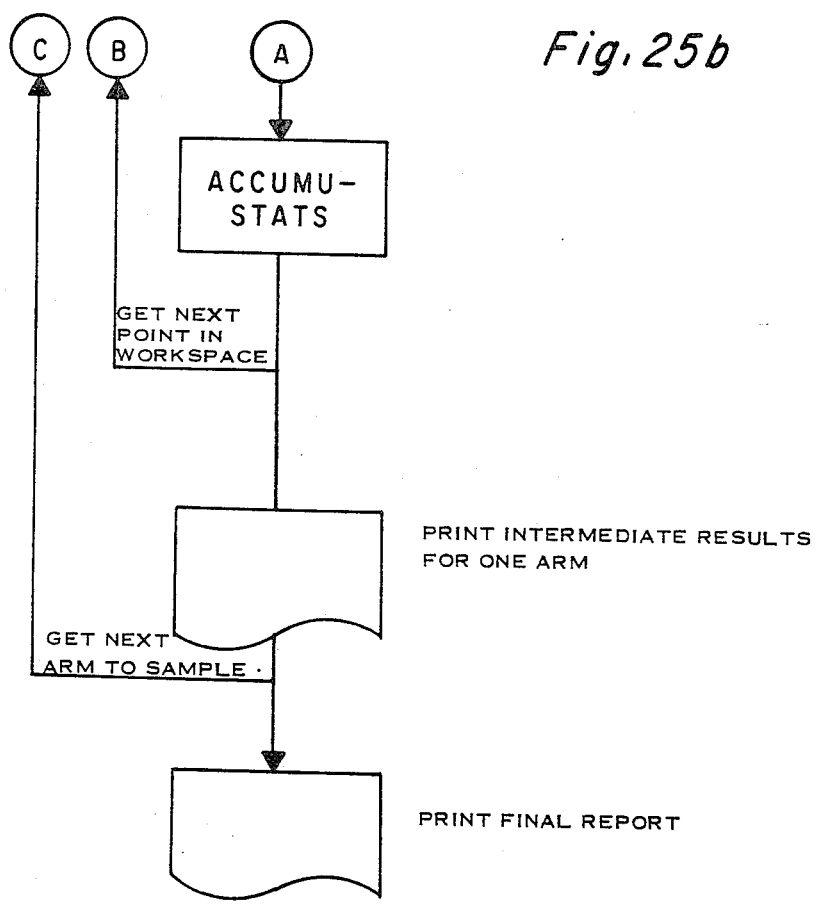

First, refer to FIG. 24 where a flowchart illustrates the Monte Carlo method of determining an ideal end point. That is, the calibration of the fixture itself is shown by first inputting parameters and then computing the $\theta$ for each joint for what is presumed to be an ideal fixtue. Next, random errors from a random error generator are placed on the links lengths, and in the fixture. The new joint angles are then computed. More random error is generated for the resolver reading and that error is then included in the actual angle. The offset is then computed as being the magnitude of the difference between the original angle and the angle developed through the random error generation. This procedure is repeated many times and a best value of position of the end point is used, that is, the value that yields the smallest angle error. At that point, it would be reasonable to assume that maximum accuracy has been achieved. However, it was also necessary, using the same procedure to move the end effector of the arm in space after computing the theoretically best position for the end point fixture. This is shown in FIGS. 25a and 25b where random points in space are chosen and error is introduced in joint offsets, link lengths and resolver readings. This procedure is repeated many times until an ideal end point position is achieved. Between the two calculated end points, a compromise end point is determined by iterating between the procedures of FIG. 24 and FIGS. 25a and 25b and set with subsequent fixture manufacturing providing the same end point location for each fixture within reasonable error limitations.

Figure 26A:
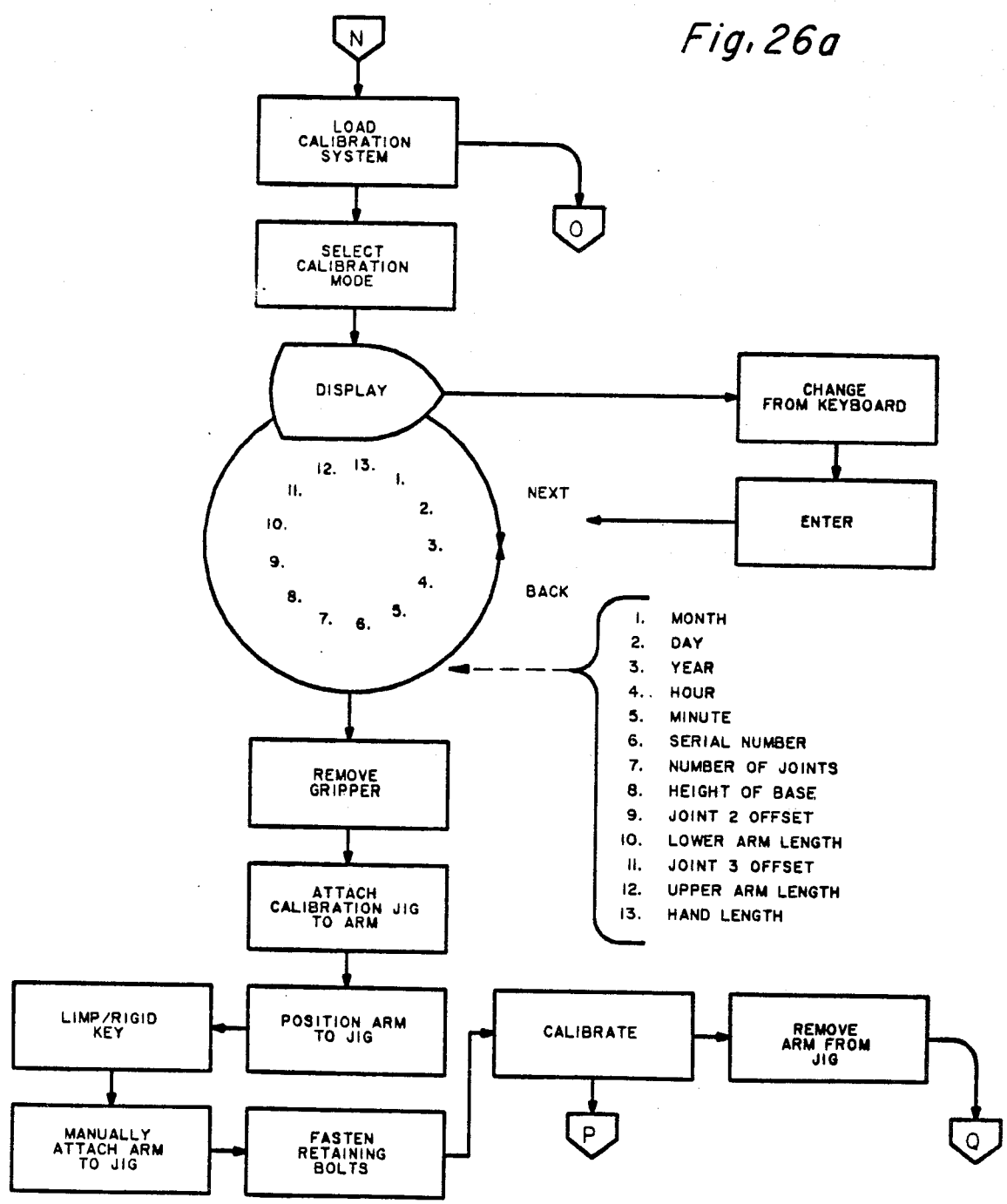
FIGS. 26a–26c are flowcharts illustrating the calibration mode.
Figure 26B:
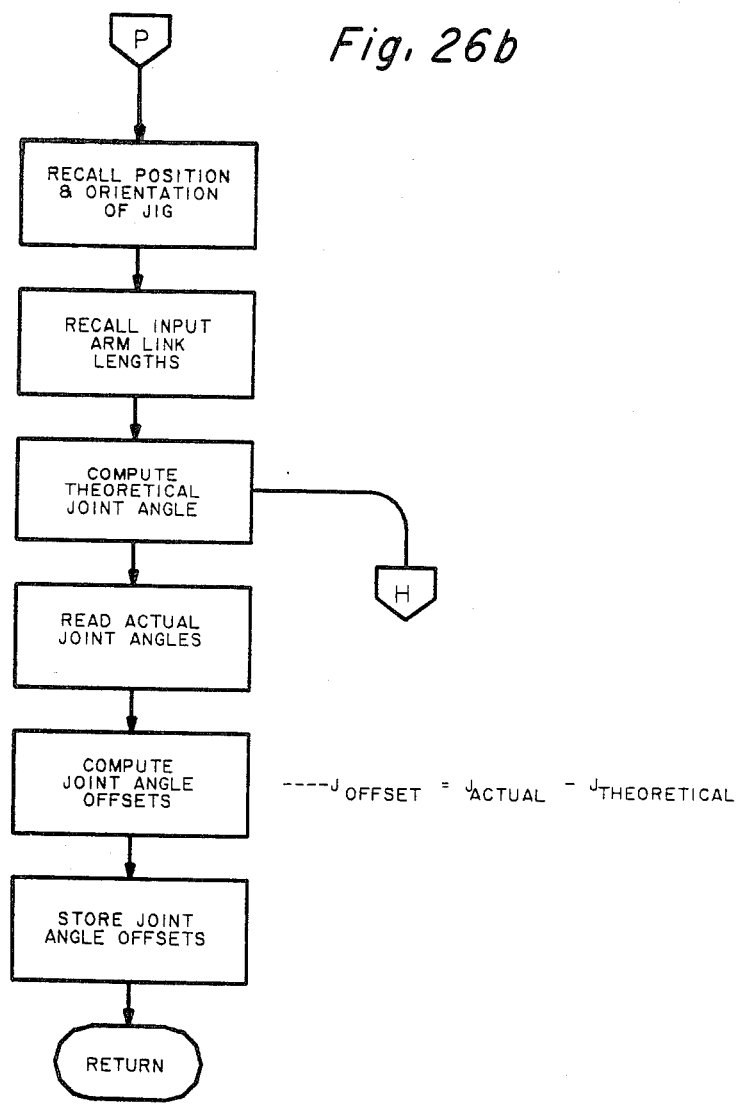
Figure 26C:
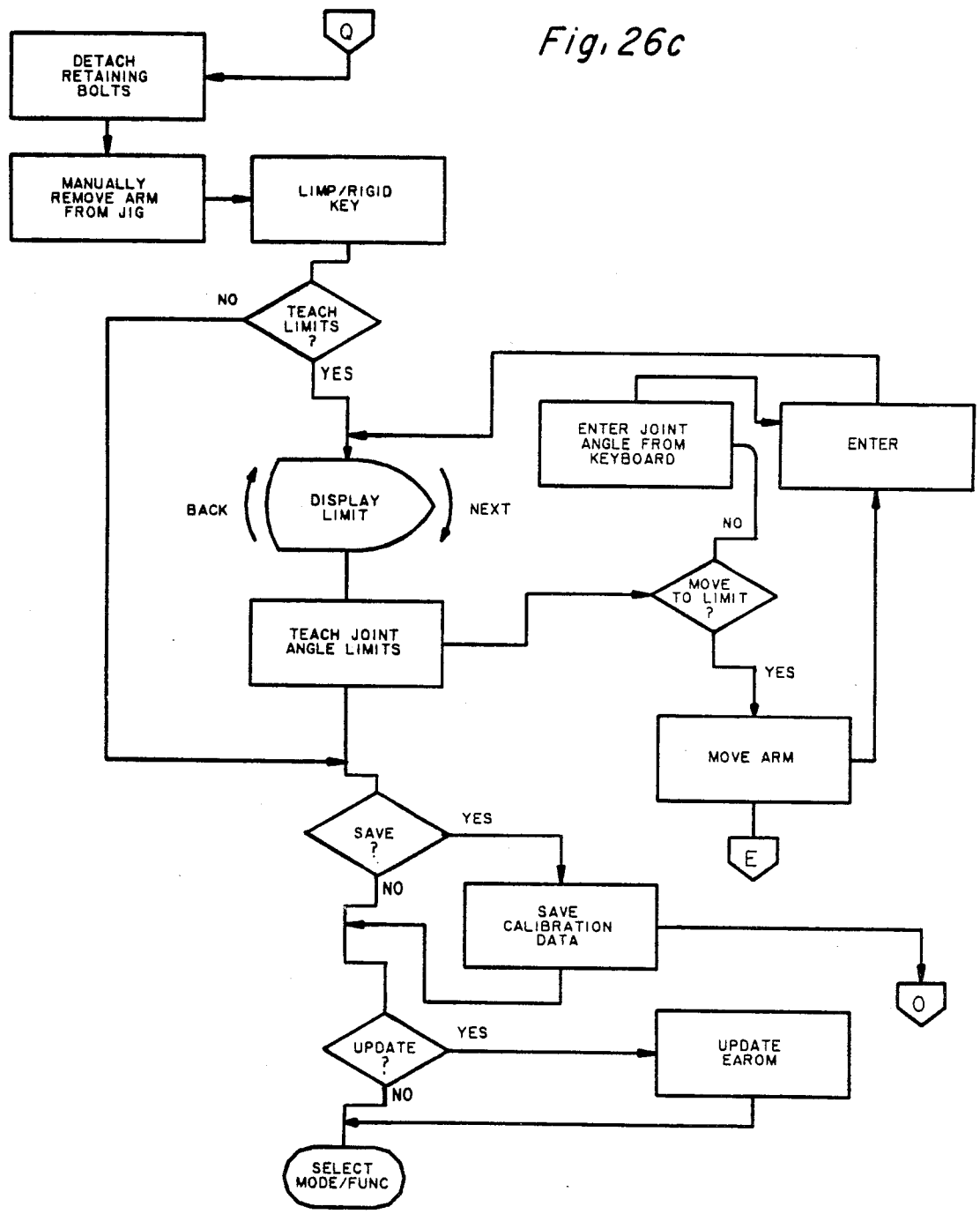

FIGS. 26a, 26b and 26c illustrate the calibration modes, in flow diagram form. The calibration mode is selected and a display is made from which selections are available for loading the system. The gripper is removed and the jig is attached to the robot arm as shown in FIG. 23. The arm is positioned to the calibration jig and a limp/rigid key is activated to permit the arm to go limp within the calibration fixture. Then the arm is manually attached to the fixture. The calibration is accomplished and the arm is removed from the jig.

The calibration is accomplished by the steps shown in FIG. 26b where the position and orientation of the calibration fixture is recalled, the input arm lengths are recalled and theoretical joint angles are computed, employing the RCPU. The actual joint angles are read from the resolvers and the offset is determined by subtracting the theoretical from the actual reading. The offsets are then stored for future use.

Figure 30:
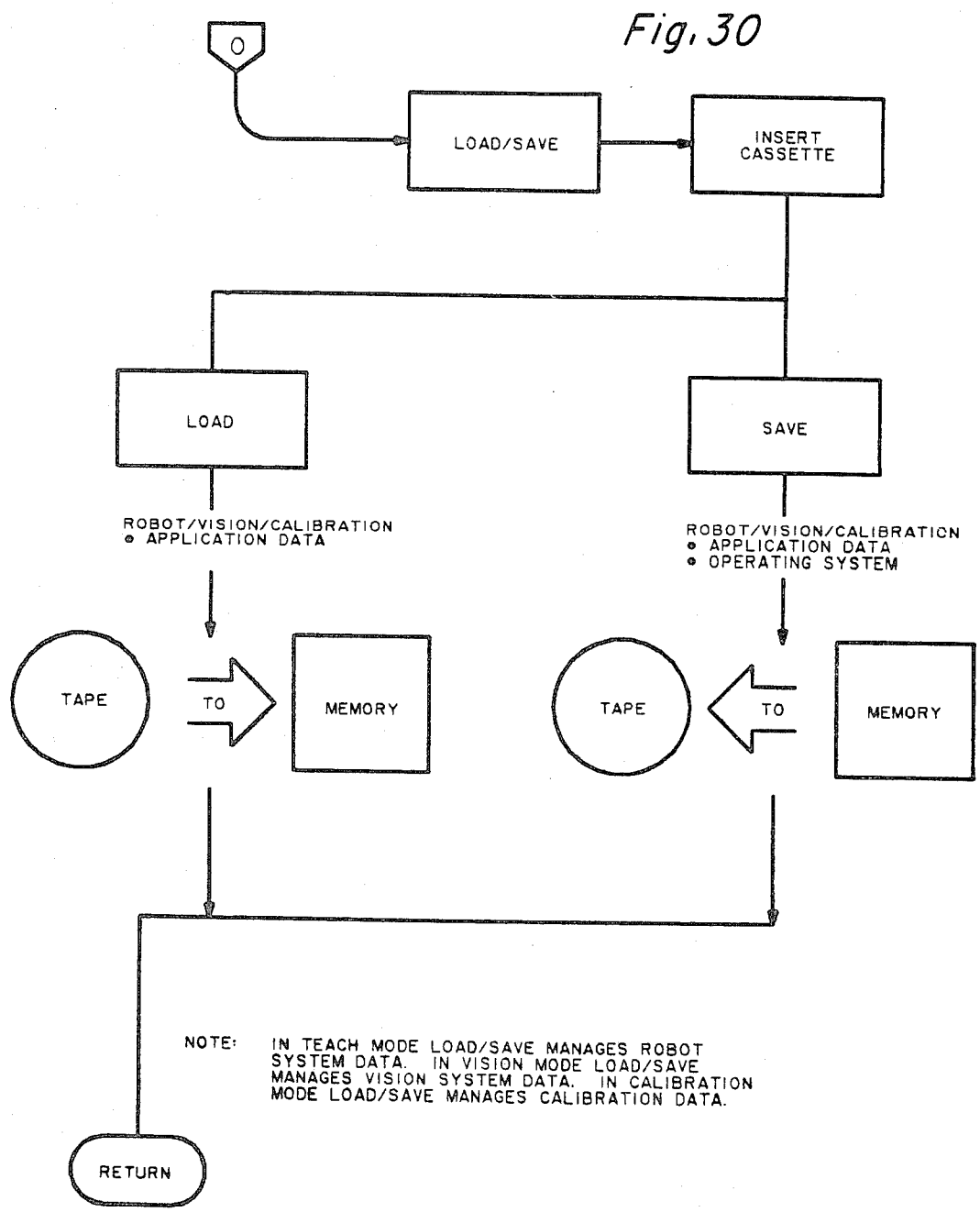
FIG. 30 is a flowchart illustrating a load/save function.

FIG. 26c illustrates removing the arm from the jig and pressing the limp/rigid key to cause the joints to lock. If it is desired at that time to teach limits, a display limit identification is shown which is selected by the "back" and "next" facility. Joint angle limits are then taught and if it is desired, a move to the limit is made. Otherwise the joint angle is entered from the keyboard and the procedure is repeated. If no teach limit is desired, then if the calibration information is to be saved, it may be output as secondary storage on a magnetic tape, disc or the like as indicated at FIG. 30. If an update is to be made, the EPROM is updated. The EAROM contains the calibration offsetts, link lengths and joint limits referenced to effect arm movement.

Figure 27:
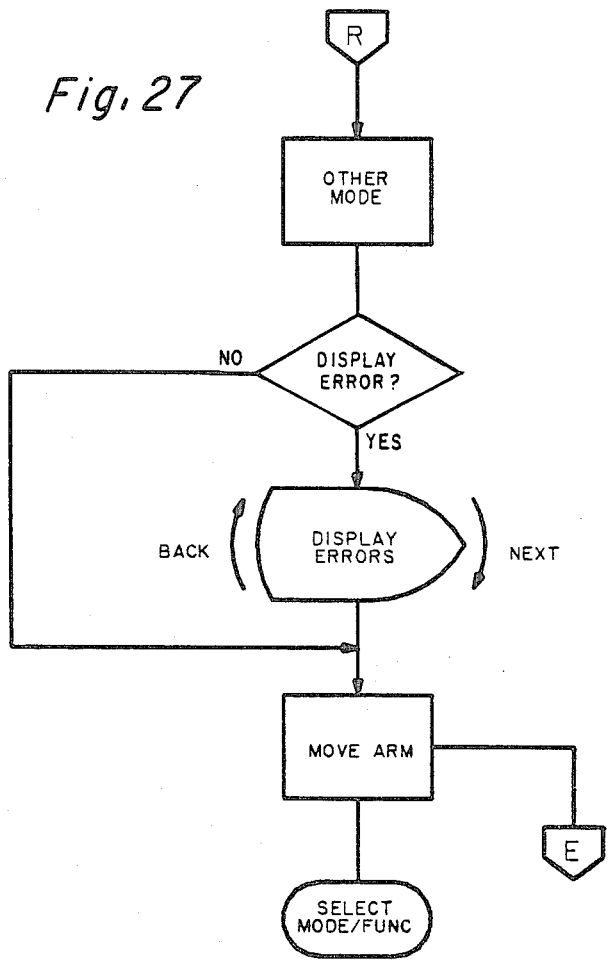
FIG. 27 is a flowchart illustrating the "other" mode.

FIG. 27 illustrates the flowchart when the module is to be used in some other mode than as the application module for the robot. When in the other mode, it is available only to display errors, and to move through that display of errors or to move the arm.

Figure 28:
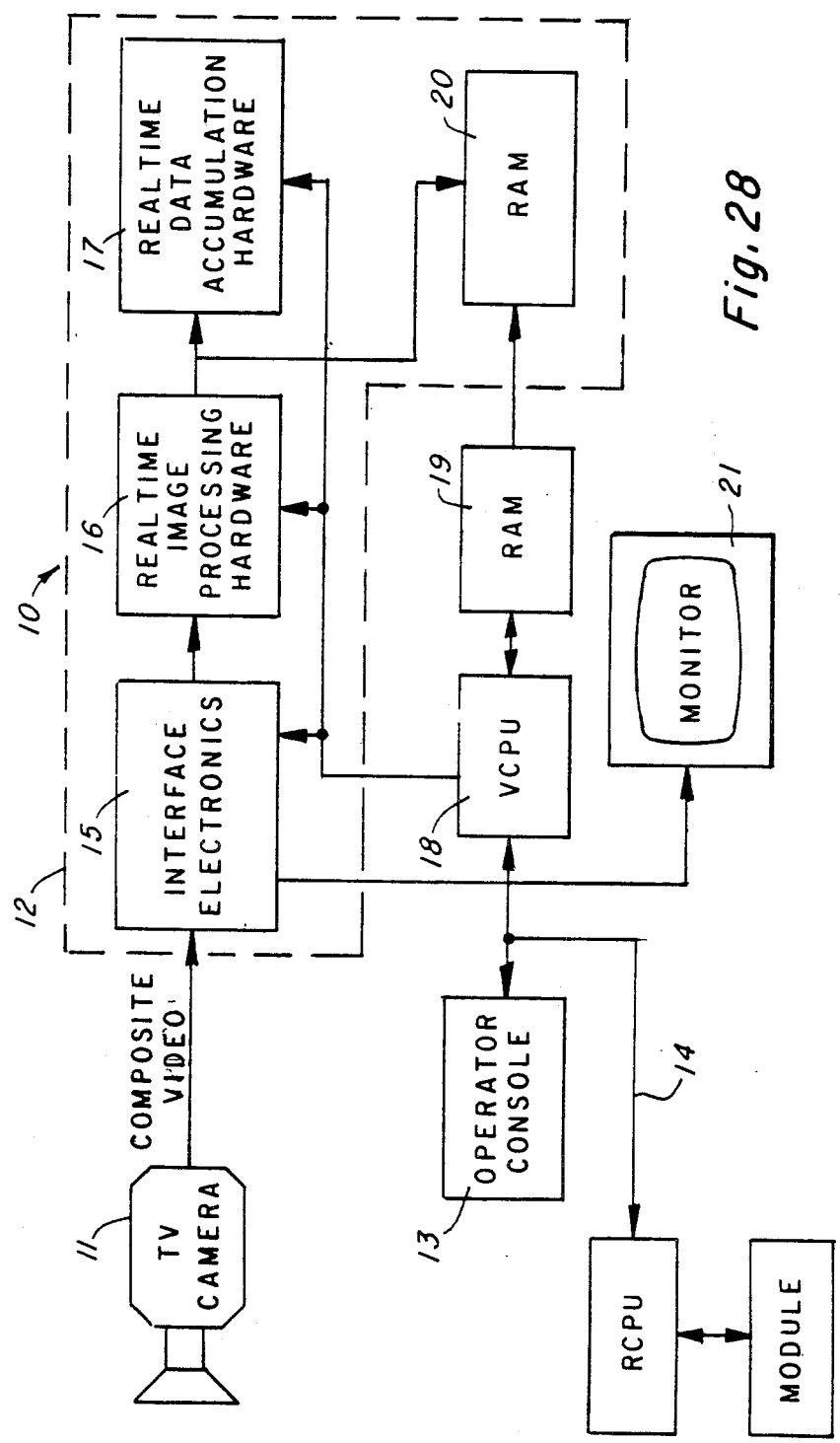
FIG. 28 illustrates a vision system directed by the module.

FIG. 28 illustrates a video acquisition system 10 having a TV (video) camera 11 which provides vision system interface (VSI) board 12 with a composite video signal. In this preferred embodiment, an Hitachi KP-120 solid state TV camera is employed. Interface electronics 15 on VSI board 12 receives the composite video and provides a digitized output. Also, digitized signals are compared to a given range of amplitude to determine whether the pixel corresponds to a white background or to a dark article or object. This is an arbitrary designation so that, for example, a binary "1" may correspond to the dark article while a binary "0" may correspond to a white background. This digitizing and threshold setting is well known in the art.

Real time image processing hardware 16 of VSI board 12 provides the system with an ability to measure article perimeters and areas, and to recognize edges.

Real-time data accumulation hardware 17 of VSI board 12 receives the signal train from hardware 16 and encompasses the hardware required for horizontal, vertical and diagonal collection of image bits (pixels).

Random access memory (RAM) 20 of VSI board 12, which is connected to units 16 and 17, is available for storage of the image of the article.

Video central processing unit (VCPU) 18, together with RAM 19, provide computing capability for controlling the video acquisition system. In this preferred embodiment, VCPU 18 is a Texas Instruments Incorporated type 990/5 microcomputer. VCPU 18 and RAM 19 are connected to units 15–17 and RAM 20.

Monitor 21, which is connected to interface electronics 15 on VSI board 12, is available for viewing the picture taken by the TV camera 11 and image representation stored in RAM 20.

Output 14 from operator console 13 in VCPU 18 is connected to a robot central processing unit (RCPU) to provide a visual robot system.

The following are definitions useful in an understanding of the vision mode.

VISION DEFINITIONS:
The scaling factors are:
| | |
|---|---|
| X offset | — number of pixels in horizontal direction from hardware address 0 to center of screen. |
| Y offset | — number of pixels in vertical direction from hardware address 0 to center of screen. |
| D offset | — number of pixels in diagonal direction from hardware address 0 to center of screen. |
| PAR | — Pixel aspect ratio. (Determined during calibration.) The ratio of horizontal pixel spacing to vertical pixel spacing. Camera dependent. |
| PCF | — Pixel correction factor. Converts pixel units to centimeters. Actual PCF units = cm/pixel_unit_length. |
| DELTA | — Word length format scale factor. |

The hardware values are:
| | |
|---|---|
| ALL | — total number of edge pixels. ALL might not be equal to the sum of H, V. |
| H | — total number of horizontal edge pixels. |
| V | — total number of vertical edge pixels. |
| N | — total number of pixels in object. |
| Hi | — Ith horizontal projection sum. |
| Vj | — Jth vertical projection sum. |
| Dk | — Kth diagonal projection sum. |

The computed features are:
AREA
PERIMETER
MAXIMUM MOMENT OF INERTIA
MINIMUM MOMENT OF INERTIA
Means and variances of each feature are also computed FIG. 29a illustrates selection of the vision mode with a set up and display. The selections in the vision mode are as indicated numbers 1 through 6.

The vision mode enables the articulated robot to coordinate with a video system, enabling the handling of tasks visually. It therefore becomes necessary to coordinate the vision system as set out herein.

Figure 29B:
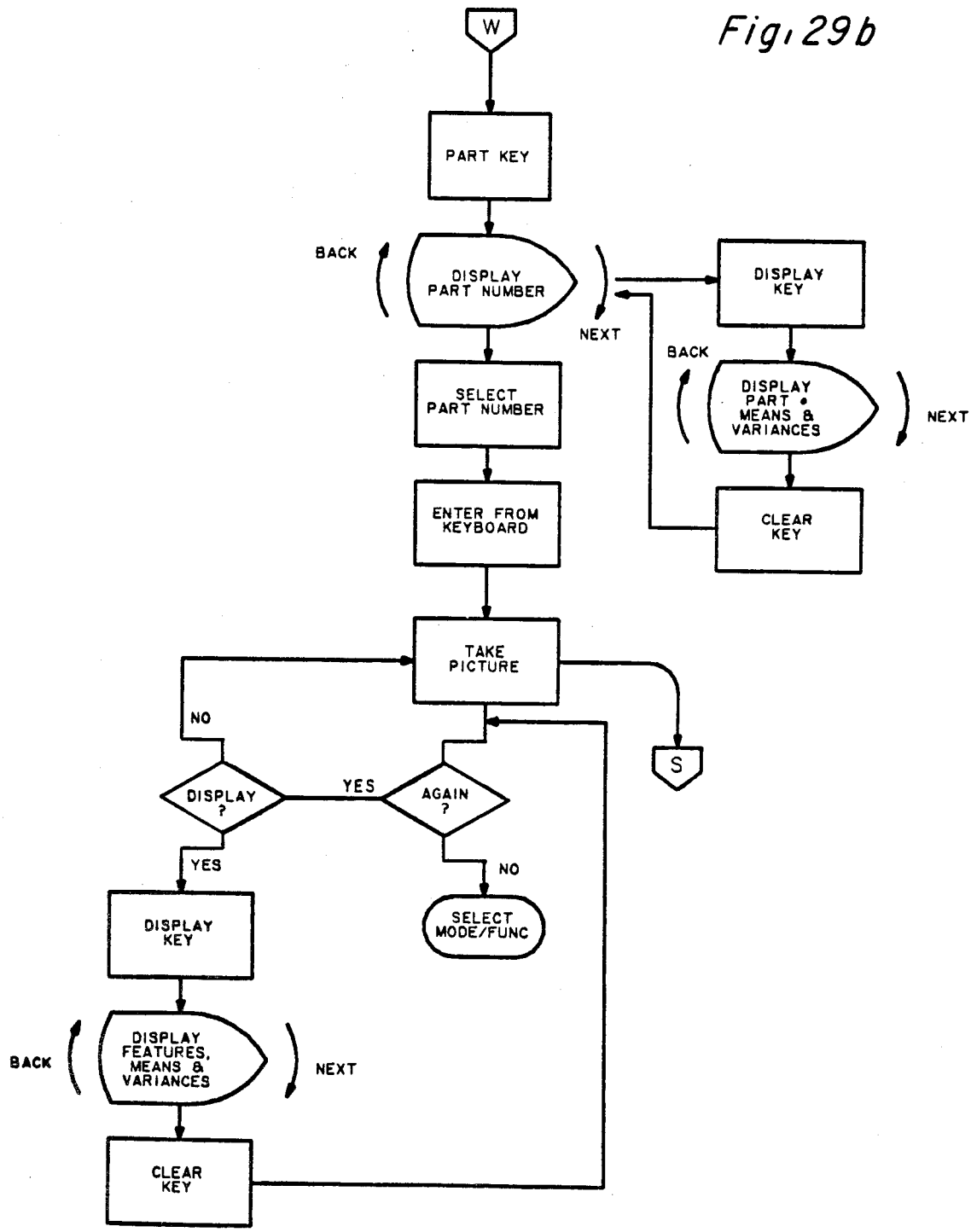

FIG. 29b indicates the selection of the part key on the keyboard of the application module. Next, a part number desired is displayed and is found by moving "back" and "next" as indicated earlier. A part number is selected and entered from the keyboard and a picture is taken. If there is to be a display, the display key is depressed and the display features, means and variances are displayed, again with the facility of moving "back" and "next". When the clear key is activated, the procedure, after having taken a picture, is repeated. If there is no display requested, then the picture is taken again.

After having displayed the part number, the display key can be depressed where again the display part number and means and variances are displayed selectively. To clear the display, the clear key is hit and a part number selected.

Figure 29E:

The picture is taken and next the area, perimeter and the maximum and minimum moments are computed. The pixel counts of rows, columns and horizontal lines of the image of the picture are made as described and claimed in copending U.S. application Ser. No. 355,287, filed Mar. 5, 1982. The computations are made as set out in FIGS. 29c, 29d and 29e.

In this manner, a part can be identified and its orientation is established so that a proper user frame is established for action with the particular part by the articulated robot.

Figure 29F:
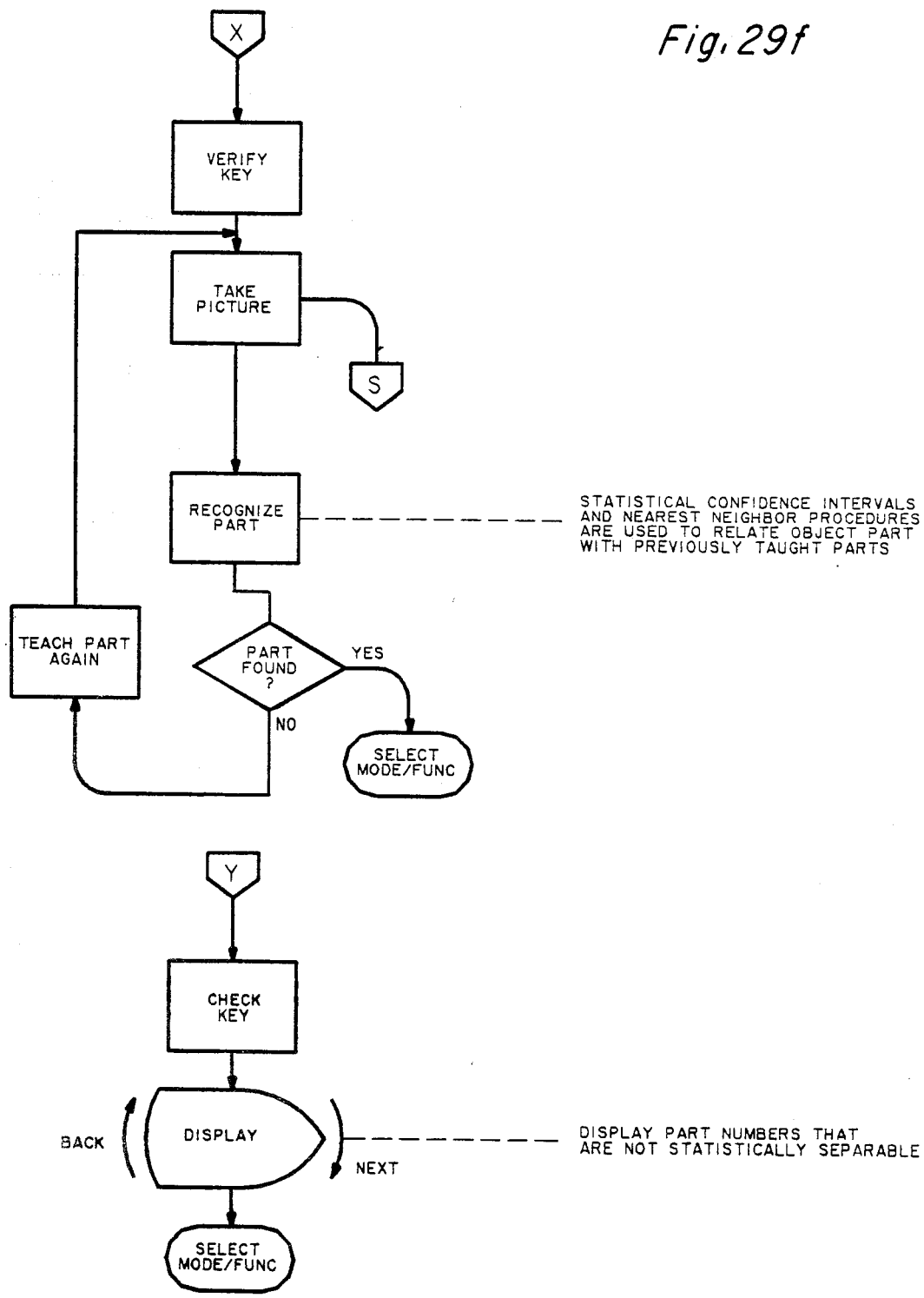

FIG. 29f illustrates the flowchart for verifying that a particular part is indeed the part recognized. The verify key is depressed, the picture is taken and the part is recognized or not. This recognition is found in a known statistical manner and if not found, the part is taught again. Finally, at entry "Y", if it cannot be found again, the check key is depressed and the particular parts that are not statistically separable are displayed.

FIG. 30 simply illustrates that programs entered through the application module may ultimately be saved, in this preferred embodiment, on tape. Any appropriate secondary storage could, of course, be made.

The specific circuits and flowcharts shown herein are illustrative of the general idea of this invention. Other circuits and flowcharts are contemplated and the invention is limited only by the appended claims.

What is claimed is:

1. A hand-held application module, for directing the operation of a programmable manipulator having a plurality of segments movable with respect to each other, controlled by digital computing means employing a robot programming language, including actuating means, the programmable manipulator having an end effector and motive means, responsive to the actuating means for causing desired movement of the end effector, comprising:
    (a) programming mode means for enabling the entry of robot programming language statements and parameters wherein the program statements are translated into an internal code to represent the robot programming language employed;
    (b) automatic teaching mode means for enabling the entry of data to define any positions of desired points for the end effector;
    (c) entry means for receiving robot programming language statements and parameters, and data; and
    (d) interface means, for receiving program statements and parameters, and data from the entry means, for transmitting to the actuating means which is responsive to the robot programming language statements and parameters, and to the data, to activate the motive means to cause the end effector to move between desired points defined by the teaching mode means.

2. The module of claim 1 wherein the teaching mode means comprises means for operation of the module wherein data representing the displacement between adjacent segments of the manipulator, defining a desired point for the end effector, are transmitted to the digital computer means.

3. The module of claim 2 wherein the entry means comprises a keyboard.

4. The module of claim 3 wherein the interface means comprises a microprocessor for scanning the keyboard.

* * * * *